(12) United States Patent
Scandura

(10) Patent No.: US 8,750,782 B2
(45) Date of Patent: Jun. 10, 2014

(54) BUILDING AND DELIVERING HIGHLY ADAPTIVE AND CONFIGURABLE TUTORING SYSTEMS

(76) Inventor: Joseph M. Scandura, Narberth, PA (US)

( * ) Notice: Subject to any disclaimer, the term of this patent is extended or adjusted under 35 U.S.C. 154(b) by 363 days.

(21) Appl. No.: 12/925,456

(22) Filed: Oct. 21, 2010

(65) Prior Publication Data
US 2011/0066998 A1 Mar. 17, 2011

Related U.S. Application Data

(63) Continuation-in-part of application No. 10/249,355, filed on Apr. 2, 2003, now abandoned.

(51) Int. Cl.
*G09B 7/02* (2006.01)
(52) U.S. Cl.
USPC .......................................................... 434/350
(58) Field of Classification Search
USPC .................... 434/236–238, 322, 323, 350
See application file for complete search history.

(56) References Cited

U.S. PATENT DOCUMENTS

| | | | | |
|---|---|---|---|---|
| 5,262,761 A * | 11/1993 | Scandura et al. | ............ | 345/581 |
| 6,061,513 A * | 5/2000 | Scandura | ..................... | 717/142 |
| 6,275,976 B1 * | 8/2001 | Scandura | ..................... | 717/120 |

OTHER PUBLICATIONS

Scandura, Joseph M. "Structural Learning Theory: Current Status and New Perspectives. 1 Joseph M. Scandura". 2001, 29, 4, 311-336.*

Clark, Peter. "Learning Domain Theories using Abstract Background Knowledge." Proc. Sixth European Conference on Machine Learning (ECML-93), pp. 360-365.*

* cited by examiner

*Primary Examiner* — Robert J Utama

(57) ABSTRACT

This invention discloses a computer implemented method for authoring and delivering content in a highly adaptive and easily configurable manner. Given a problem domain, an authoring system, called AuthorIT preferred embodiment, is used to: a) construct abstract syntax tree (AST) based SLT rules representing to be acquired knowledge structures (KR) at multiple levels of abstraction, wherein said SLT rules are sufficient for solving problems in said domain, b) assign instruction, questions and feedback to nodes in said KR, c) represent problem schemas in an observable Blackboard medium enabling communication between an automated tutor and learners and d) set Options defining how diagnostic and instructional decisions are to be made based on what individual learners do and do not know relative to the to be learned knowledge structures. A computer implemented delivery system, called TutorIT preferred embodiment: a) receives authoring system output, optionally supplemented with information received from a user, b) generates specific problems and solutions by executing AST-based SLT rules, c) displays problems on a Blackboard interface, and d) interacts with learners receiving learner responses and presenting instruction and feedback, e) uses input from any given learner, structural relationships within ASTs and options to update the learner's model relative to said AST-based SLT rules and to decide on what diagnostic and instructional steps to take next.

21 Claims, 30 Drawing Sheets

Figure 1:
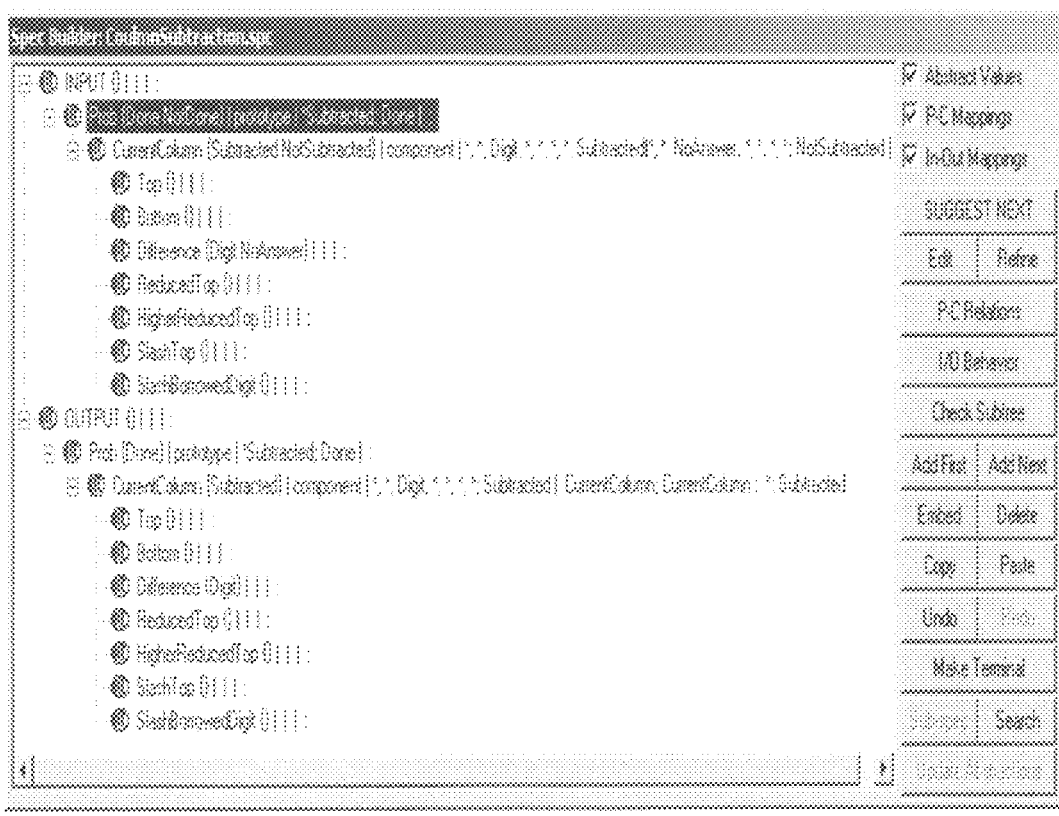

Scandura
Method for Building Highly Adaptive Instruction Based on the Structure of Knowledge Representations.

Scandura
Method for Building Highly Adaptive Instruction Based on the Structure of Knowledge Representations.

Scandura
Method for Building Highly Adaptive Instruction Based on the Structure of Knowledge Representations.

Scandura
Method for Building Highly Adaptive Instruction Based on the Structure of Knowledge Representations.

Scandura
Method for Building Highly Adaptive Instruction Based on the Structure of Knowledge Representations.

Scandura
Method for Building Highly Adaptive Instruction Based on the Structure of Knowledge Representations.

Scandura
Method for Building Highly Adaptive Instruction Based on the Structure of Knowledge Representations.

BUILDING AND DELIVERING HIGHLY ADAPTIVE AND CONFIGURABLE TUTORING SYSTEMS

CROSS-REFERENCE TO RELATED APPLICATIONS

This Patent application is a Continuation in part of patent application Ser. No. 10/249,355 entitled "Highly Adaptive Instruction Based on the Structure as Opposed to the Semantics of Knowledge Representations" and filed on Apr. 4, 2003. This application builds directly on U.S. Pat. No. 6,275,976, entitled "Automated Method for Building and Maintaining Software including Methods for Verifying that Systems are Internally Consistent and Correct Relative to their Specifications". In practice, the preferred embodiment also benefits directly from software technology based on a patent application Ser. No. 09/636,676 entitled: Method for Developing and Maintaining Distributed Systems via Plug and Play, submitted Jun. 4, 2000. It also builds on: Scandura, J. M. Structural Learning Theory in the Twenty First Century. *Journey of Structural Learning and Intelligent Systems*, 2001, 14, 4, 271-306, Scandura, J. M. Domain specific structural analysis for intelligent tutoring systems: automatable representation of declarative, procedural and model-based knowledge with relationships to software engineering. *Technology, Instruction, Cognition & Learning*, 2003, 1, 1, 7-58, Scandura, J. M. AuthorIT: Breakthrough in Authoring Adaptive and Configurable Tutoring Systems? *Tecnology, Instruction, Cognition & Learning (TICL)*, 2005, 2, 3, 185-230, Scandura, J. M. Structural Learning Theory, Structural Domain Analysis and Their Role in Building Teaching-Learning Systems. *Tecnology, Instruction, Cognition & Learning (TICL)*, 2007, 5, pp. 169-271, Scandura, J. M., Koedinger, K, Mitrovic, T, Ohlsson, S. & Paquette, G, Knowledge Representation, Associated Theories and Implications for instructional Systems: Dialog on Deep Infrastrcures, *Tecnology, Instruction, Cognition & Learning (TICL)*, 2009, 6. pp. 125-149.

REFERENCE TO A MICROFICHE APPENDIX

Not Applicable

BACKGROUND OF THE INVENTION

Major attention in computer assisted learning is being given to immersive, often game-like environments. Students are placed in various problem solving situations—and allowed to either explore on their own or with various kinds of hints (today typically called "scaffolding"). The big questions here are what kinds of hints/scaffolding will be of (most) help and when should it be given?

Other tools such as Texas Instrument's TI-Nspire tackle the problem from the other end. Rather than hints, calculators serve as tools students can use to facilitate problem solving. serve as prerequisites—as more or less comprehensive foundational skills on which learners may build.

Scaffolding and prerequisites both play a central role in all learning systems. The main problem is that good tutoring systems have been difficult and expensive to build. Moreover, their educational benefits have been difficult and expensive to evaluate. Determining effectiveness and efficiency invariably requires direct (and often expensive) empirical evaluation. The results are rarely if ever as good as what a human tutor can do, and comparisons with classroom instruction are often hard to evaluate.

Instructional design models help. Among other things they help identify what must be mastered for success and what can be assumed on entry. Computer Based Instruction (CBI) systems build on assumed prerequisites and are directed at what must be learned. After years of effort, beginning with Control Data's work (under the leadership of William Norris) in the early 1960s, the best CBI is limited to providing pretests to identify areas of weakness, providing instruction aimed at deficiencies and following up with post tests to determine how much has been learned.

ALEKS is one of the better commercially available CBI systems (a McGraw Hill company). In ALEKS and other advanced CBI systems (e.g., Paquette, 2007, 2009) to-be-acquired knowledge is represented in terms of relational models.

Intelligent Tutoring System (ITS) research goes further, attempting to duplicate or model what a good tutor can do—by adjusting diagnosis and remediation dynamically during instruction. ITS focus on modeling and diagnosing what is going on in learner minds (e.g., Anderson, 1993; cf. Koedinger et al, 1997; Scandura et al, 2009). Assumptions are made both about what knowledge might be in learner minds and learning mechanisms controlling the way those productions are used in producing behavior and learning.

Identifying the productions involved in any given domain is a difficult task. Specifying learning mechanisms is even harder. Recognizing these complexities Carnegie Learning credits Anderson's evolving ACT theories (compare Ohlsson, 2007 and Ohlsson &, Koedinger in Scandura et al, 2009), but has focused on integrating ITS with print materials to make them educationally palatable (i.e., more closely aligned with what goes on in classrooms).

The difficulties do not stop there. Ohlsson noted as early as 1987 that specifying remedial actions—what to teach is much harder than modeling and diagnosis. As in CBI, pedagogical decisions in ITS necessarily depend on the subject matter being taught—on semantics of the content. Each content domain requires its own unique set of pedagogical decisions. It is not surprising in this context that Ohlsson and Mitrovic found common cause in developing Constraint Based Modeling (CBM, 2007). CBM is a simplified alternative to ITS based on production systems in which the focus is on constraints that must be met during the course of instruction—not on the cognitive constructs (productions) responsible (for meeting those constraints).

From their inceptions, the Holy Grail in CBI and ITS is to duplicate what good teachers do. As shown by Bloom (1984) the best human tutors can improve mastery in comparison to normal instruction by 2 sigmas. This goal has been broadly influential but never achieved through automation. The limited success of CBI, combined with the complexities and cost inefficiencies of ITS have reduced effort and research support for both CBI and ITS.

This disclosure shows that these trends are premature. Advances in Structural Learning Theory (e.g., Scandura, 2007, Scandura et al, 2009, hereafter SLT) and AuthorIT and TutorIT technologies (Scandura, 2005) based thereon make it possible not only to duplicate human tutors in many areas but to do better. Today, for example, few doubt we can build tutoring systems that teach facts as well or better than humans. "Flash cards", for example, could easily be replaced by computers—with more efficiency and certain results.

This disclosure goes further. It shows:
a) How AuthorIT makes it possible to create and how TutorIT makes it possible to deliver highly adaptive and configurable tutoring systems that can guarantee learning on well-defined math skills (Scandura, 2005, 2007, 2009).

b) Why and in what sense TutorIT tutorials can guarantee mastery of such skills.

c) Why TutorIT tutorials can be developed cost effectively—at half the cost of traditional CBI development.

d) How TutorIT tutorials can be extended to support the development and delivery of higher as well as lower order knowledge.

e) Why TutorIT tutorials can be expected to produce as good or better learning than most human tutors.

More generally, the enormous potential of intelligent tutoring systems (ITS) has been recognized for decades (e.g., Anderson, 1988; Scandura, 1987). Explicit attention to knowledge representation, associated learning theories and decision making logic makes it possible to automate interactions between the learner, tutor and content to be acquired (commonly referred to as the expert module). In principle, ITSs may mimic or even exceed the behavior of the best teachers. This potential, however, has never been fully realized in practice.

The situation today remains much as it has (been). The central importance of the content domain, modeling the student and the interactions between them remain as before. Every automated instructional system consists of: a) one or more learners, human and/or automated, b) content to be acquired by the learners, also known as knowledge representation (KR), c) a communication or "display" system for representing how questions and information are to be presented to and received from learners, and d) a tutor capable of deciding what and when information is to be presented to the learner and how to react to feedback and/or questions from the learner.

A major bottleneck in the process has been representation of the content domain (expert model). As Psotka et al (1988, p. 279) put it, "The fundamental problem is organizing knowledge into a clear hierarchy to take best advantage of the redundancies in any particular domain. Without extensive experience in doing this, we are largely ignorant of the kind of links and predicates to use. We are still far from cataloging the kinds of links needed for these semantic hierarchies. The best predicates that might describe these knowledge structures simply, beyond ISA and PART OF hierarchies, still need to be defined. Too little work has been aimed at developing new representations for information and relationships." He goes on to mention the need to consider OO frameworks and/or structures containing objects, relationships and operations (pp. 279-280).

A variety of approaches to Knowledge Representation (KR) have been used in ITS development. Among the earliest are Anderson's ACT-R theory (e.g., 1988) based on productions systems and Scandura's (2001) Structural Learning Theory (SLT). The SLT provides a comprehensive and increasingly rigorous theoretical framework for explaining, predicting and controlling problem solving behavior, with particular attention to interactions between teachers and learners (e.g., Scandura, 1971, 1973, 1977, 2001a, 2003, contemporaneously updated and further refined in Scandura, 2005, 2007. 2009). Structural (Cognitive Task) Analysis (SA) comprises an essential part of the SLT used to construct higher and lower order SLT rules, each SLT rule being comprised of a hierarchical Abstract Syntax Tree (AST) representing procedural knowledge at multiple levels of abstraction, in which each node consists of an operation or decision operating on a data structure (defined as a structural declarative AST) on which the node operates (e.g., Scandura, 2003).

Because an SLT rule consists of both a procedural AST and the structural AST on which it operates, the terms SLT rules and ASTs or AST based knowledge representations are used interchangeably herein with the understanding that each unit of knowledge, each SLT rule, AST-based knowledge or just AST in the SLT involves a procedural AST operating on a corresponding structural AST (e.g., Scandura, 2001, 2003). and the closely associated method of Structural (Cognitive Task) Analysis (SA) (e.g., Scandura, 1971, 1973, 1977, 2001a, 2005, 2007). Both production systems and procedures in SLT are fully operational in the sense that they can be directly interpreted and executed on a computer. Other popular approaches are based on semantic/relational networks of one sort or another (e.g., knowledge spaces, conceptual graphs). Semantic networks represent structural knowledge hierarchically in terms of nodes and links between them. Semantic networks have the benefit of representing knowledge in an intuitive fashion. Unlike production systems and SLT procedures, however, they are not easily interpreted (executed on a computer). In effect, each type of representation has important advantages and limitations: Production systems are operational but do not directly reflect structural characteristics of the knowledge they represent. Networks represent the structure but are not directly operational. It also is worth noting that most approaches to KR make a sharp distinction in the way they treat declarative and procedural knowledge, on the one hand, and domain specific and domain independent knowledge, on the other.

Given the complexity of current approaches, a variety of tools have been proposed to assist in the process. Most of these are tailored toward one kind of content or another. Merrill's ID2 authoring software (1994), for example, offers various kinds of instructional transactions, each tailored to a specific kind of knowledge (e.g., facts, concepts or procedures). Such systems facilitate the development of instructional software but they are limited to prescribed kinds of knowledge. In particular, they are inadequate for delivering instruction where the to-be-acquired knowledge involves more than one type, as normally is the case in the real world.

Such tools can facilitate the process. However, the problem remains that there have been no clear, unambiguous, universally applicable and internally consistent methods for representing content (expert knowledge). In the absence of a generalizable solution to this problem, ITS development depends on subject matter semantics. The way tutor modules interact with student models as well as the human interface through which the learner and tutor communicate have been heavily dependent on the content in question. The widespread use of production systems (e.g., Anderson, 1988) for this purpose is a case in point. Production systems have the theoretical appeal of a simple uniform (condition-action) structure. This uniformity, however, means that all content domains have essentially the same structure—that of a simple list (of productions). In this context it is hard to imagine a general-purpose tutor that might work even reasonably (let alone equally well) with different kinds of content. Without a formalism that more directly represents essential features, it is even harder to see how production systems might be used to automate construction of the human interface.

Representations focused on OO inheritance are limited in its emphasis on objects, with operations subordinate to those objects. Representing rooms, car and clean operations, for example, involves talking about such things as room and car objects cleaning themselves, rather than more naturally about operations cleaning rooms and cars (e.g., Scandura, 2001b).

Consequently, ITSs have either been developed de novo for each content domain, or built using authoring tools of one sort or another designed to reduce the effort required (e.g., by providing alternative prototypes, Warren, 2002). Whereas various industry standards (e.g., SCORM) are being developed to facilitate reuse of learning objects (e.g., diagnostic assessments and instructional units) in different learning environments, such standards are designed by committees to represent broad-based consensus. Cohesiveness (internal consistency) and simplicity are at best secondary goals. Specifically, such standards may or may not allow the possibility of building general-purpose tutors that can intelligently guide testing (diagnosis) and instruction based solely on the structure of a KR without reference to semantics specific to the domain in question. They do not, however, offer a solution to the problem.

A recent article on the Structural Learning Theory (SLT) outlines an approach to this problem (Scandura, 2001a).[1] SLT was designed from its inceptions explicitly to address interactions between the learner and some external agent (e.g., observer or tutor), with emphasis on the relativistic nature of knowledge (e.g., Scandura, 1971, 1988). The former articles (i.e., Scandura 2001a,b) summarize the rationale and update essential steps in carrying out a process called Structural (cognitive task) Analysis (SA). In addition to defining the key elements in problem domains, and the behavior and knowledge associated with such domains, special attention is given to the hierarchical nature of Structural Analysis, and its applicability to ill-defined as well as well-defined content.[2] Among other things, higher order (domain independent) knowledge is shown to play an essential role in ill-defined domains. SA also makes explicit provision for diagnostic testing and a clear distinction between novice, neophyte and expert knowledge. While broad, however, this overview omits essential features as well as the precision necessary to allow unambiguous automation on a computer.

[1] The SLT has evolved over a period of several decades beginning in the 1960's. Scandura (2001a) summarizes the current status and new developments in SLT. Appendix A in Scandura (2001a) provides a useful overview of major developments and related publications over the years. Some key characteristics of SLT are listed here for the reader's convenience: a) the central importance of structural (cognitive task) analysis, b) distinctions between lower and higher order knowledge (used to distinguish between domain specific and domain independent knowledge), c) the representation of knowledge at different levels of abstraction (used to distinguish between levels of expertise, make testing more efficient and/or to guide the learner and/or instruction), d) explicit processes for assessing what a learner does and does not know relative to a given body of content (i.e., the learner model), e) a universal control mechanism (playing a central role in problem solving, being implementable in a manner that is totally independent of higher as well as lower order knowledge), and f) assumed fundamental capacities such as processing capacity and processing speed). More directly related characteristics are detailed for the first time in this series.

[2] The process of structural analysis has a long history. Most of the earlier work through the early 1980s concentrated on the identification of (domain independent) higher order knowledge as well as lower order (domain specific) knowledge. The use of ASTs to represent knowledge, however, came largely as a result of later work in software engineering.

Although incomplete from the standpoint of ITS, parallel research in software engineering provides the necessary rigor as far as it goes. This research makes very explicit what has until recently been an informal process (of SA). SA has evolved to the point where it is automatable on a computer (U.S. Pat. No. 6,275,976, Scandura, 2001b) and sufficient for representing the knowledge not only associated with domain specific content but also with domain independent knowledge and ill-defined domains.

A recent article by Scandura (2003) extends this analysis to domain specific systems of interacting components and shows how the above disclosure ((U.S. Pat. No. 6,275,976) provides an explicit basis for representing both declarative and procedural knowledge within the same KR. While abstract syntax tree (ASTs) are used for this purpose in the preferred embodiment it is clear to anyone skilled in the art, that any number of formal equivalent embodiments might be used for similar purposes. ASTs, for example, are just one kind of representation of what is commonly referred to as Knowledge Representation (KR).

Programming is inherently a bottom-up process: the process of representing data structures and/or processes (a/k/a to be learned content) in terms of elements in a predetermined set of executable components. These components include functions and operations in procedural programming and objects in OO programming. Software design, on the other hand, is typically a top-down process. Instead of emphasizing the assembly of components to achieve desired ends, the emphasis is on representing what must be learned (or executed in software engineering) at progressive levels of detail.

Like structured analysis[3] and OO design in software engineering, SA is a top-down method. However, it is top-down with a big difference: Each level of representation is designed to be behaviorally equivalent to all other levels. The realization of SA in AutoBuilder also supports complementary bottom-up automation. Not only does the process lend itself to automation, but it also guarantees that the identified competence is sufficient to produce the desired (i.e., specified) behavior.[4]

[3] Whereas processes and data are refined independently in structured analysis and in OO design, both are refined in parallel in structural analysis (SA).
[4] See Scandura (2001a, 2005, 2007; Scandura et al, 2009) for updated information on a General Purpose Intelligent Tutor, which working in conjunction with content represented in this manner, can guarantee specified learning in a minimum time (e.g., with the fewest possible test and/or instructional interactions between tutor and learner).

The present disclosure is based on the commonly made assumption that any instructional system consists of one or more learners, a human and/or automated tutor, and a representation of the content to be taught. The latter represents the knowledge structure or structures to be acquired by the learners and may be represented in any number of ways. Also assumed is an electronic blackboard or other means of presenting information to and receiving responses from learners. Either the learner or an automated tutor must decide what and when information is to be presented to the learner and/or how to react to feedback from the learner.

Whereas processes and data are refined independently in structured analysis and in OO design, both are refined in parallel in structural analysis (SA).

See Scandura (2001a, 2005, 2007; Scandura et al, 2009) for updated information on a General Purpose Intelligent Tutor, which working in conjunction with content represented in this manner, can guarantee specified learning in a minimum time (e.g., with the fewest possible test and/or instructional interactions between tutor and learner).

Further Background.—In the 1960s, there was a disconnect in educational research and research in subject matter (math) education. Educational research focused on behavioral variables: exposition vs. discovery, example vs. didactic, demonstration vs. discussion, text vs. pictures, aptitude-treatment interactions, etc. (cf. Scandura, 1963, 1964a,b). Subject matter variables were either ignored or limited to such things as simple, moderate, difficult. Little attention was given to what makes content simple, moderate or difficult. Conversely, research in subject matter (e.g., math) education, focused primarily on content (reading, writing, arithmetic skills, algebraic equations, proof, etc.).

In same time period, instructional design focused on what was to be learned and prerequisites for same. Task analysis focused initially on behavior—on what learners need to do (Miller, 1959; Gagne, 1966). In my own work, this focus morphed into cognitive task analysis—on what learners must learn for success (e.g., Scandura, 1970, 1971, Durnin &

Scandura, 1973). My parallel work in experimental psychology (Greeno & Scandura, 1966; Scandura & Roughead, 1967) in the mid 1960s added the critical dimension of behavior to the equation.

Structural Learning grew out of this disconnect, with the goal of integrating content structure with human cognition and behavior. Structural Learning Theory (SLT) was first introduced as a unified theory in 1970 (published in Scandura 1971a). SLT's focus from day one (and the decade of research on problem solving and rule learning which preceded it) was on what must be learned for success in complex domains, ranging from early studies of problem solving and rule learning (Roughead & Scandura, 1968; Scandura, 1963, 1964a,b, 1973, 1977) to Piagetian conservation (Scandura & Scandura, 1980), constructions with straight edge and compass, mathematical proofs and critical reading (e.g., Scandura, 1977).

This research was focused on the following four basic questions [with their evolution from 1970 through the present, Now]:
  Content: What does it mean to know something? And how can one represent knowledge in a way that has behavioral relevance?
    [1970: Directed graphs (flowcharts)→Now: Abstract Syntax Trees (ASTs) & Structural Analysis (SA)]
  Cognition: How do learners use and acquire knowledge? Why is it that some people can solve problems whereas others cannot?
    [1970: Goal switching→Now: Universal Control Mechanism (UCM)]
  Assessing Behavior: How can one determine what an individual does and does not know?
    [1970: Which paths are known→Now: which nodes in AST are known (+), -, ?]
  Instruction: How does knowledge change over time as a result of interacting with an external environment?
    [1970: Single level diagnosis & remediation→Now: Multi-level inferences about what is known and what needs to be learned]

Higher order and lower order knowledge played a central role in this research from its inceptions—with emphasis on the central role of higher order knowledge in problem solving (Scandura, 1971, 1973, 1977). Early SLT research also focused heavily on identifying what individual learners do and do not know relative to what needed to be learned (e.g., Durnin & Scandura, 1974; Scandura, 1971, 1973, 1977).

Deterministic theorizing was a major distinguishing feature of this research (Scandura, 1971). I was focused, even obsessed with understanding, predicting and (in so far as education is concerned) controlling how individuals solve problems. Despite considerable training in statistics and having conducted a good deal of traditional experimental research (e.g., Greeno & Scandura, 1966; Scandura & Roughead, 1967; Scandura, 1967), I found unsatisfying comparisons based on averaging behavior over multiple subjects. I wanted something better—more akin to what had been accomplished in physics centuries earlier (cf. Scandura, 1974a).[5]

[5] The deterministic philosophy I am proposing represents a major departure in thinking about how to evaluate instruction—in particular, it calls into question the usual measures used in controlled experiments. After understanding how TutorIT works, please see my concluding comments on this subject.

SLT was unique when introduced, and raised considerable interest both in the US and internationally (Scandura, 1971a, 1973, 1977). Literally hundreds of CBI programs based on SLT were developed later in the 1970s and early 1980s, and many sold for decades.

Nonetheless, ITS largely ignored this research and focused on later work in cognitive psychology (Anderson et at, 1990, 1993) and especially the Carnegie school of artificial intelligence based on production systems (esp. Newell & Simon, 1972).

By the mid-1970s, cognitive psychology also discovered the importance of content, often equating theory with alternative ways of representing knowledge. Research focused largely on what (productions or relationships) might be in learner minds and comparing fit with observable behavior. Experimental studies followed the traditional statistical paradigm.

Similarly, most CBI development was heavily influenced by Gagne's work in instructional design (1965), along with that of Merrill and his students, 1994). The restricted focus of Reigeluth's (1983, 1987) influential books on Instructional Design largely eliminated or obscured some of SLT's most Important features, most notably its focus on precise diagnosis and higher order learning and problem solving. With essential differences requiring significant study, the long and short of it is that other than our own early tutorials (which made small publisher Queue one of Inc Magazine's 100 fastest growing small businesses), SLT failed to significantly inform on-going research in either CBI or ITS. After the interdisciplinary doctoral program in structural learning I developed at Penn was eliminated in the early-mid 1970s, SLT became a little understood historical curiosity.

With recent publications in TICL, depth of understanding in ITS, CBI and SLT has increased in recent years (Mitrovic & Ohlsson, 2007; Paquette, 2007; Scandura, 2007), including their respective advantages and limitations (Scandura, Koedinger, Mitrovic & Ohlsson, Paquette, 2009). Advances in the way knowledge is represented in SLT has the potential of revolutionizing the way tutoring systems are developed, both now and in the future. SLT rules[6] were originally represented as directed graphs (e.g., Scandura, 1971a, 1973). Directed graphs (equivalent to Flowcharts) make it possible to assess individual knowledge. They have the disadvantage, however, of forcing one to make a priori judgments about level of analysis. They also make it difficult to identify subsets of problems associated with various paths in those graphs.

[6] I used the term "rule" rather extensively in behavioral research during the 1960s. Adopting the term "production" from the logician Post in the 1930s, Newell & Simon (1972) introduced the term "production rule" in their influential book on problem solving. Anderson later used of the term "rule" in ITS as synonymous with "production rule" (in production systems). Accordingly, it ultimately seemed best to introduce the term "SLT rule" to distinguish the two. Distinctive characteristics of SLT rules became even more important with my introduction of ASTs into SLT. In this context, ASTs represent a long sought solution to my early attempts at formalization in SLT (see Scandura, 1973, Chapter 3). The importance of ASTs in SLT, however, only gradually became clear to me after using the concept for some time in developing our software engineering tools—despite the fact that ASTs had played a central role for years in compiler theory.

Having spent two decades in software engineering (e.g., Scandura, 1991, 1994 1995, 1999, 2001), it became increasingly apparent that a specific form of Abstract Syntax trees (ASTs) offered a long sought solution. ASTs are a precise formalism derived from compiler theory and that are widely used in software engineering. To date, ASTs have had almost no impact on knowledge representation, ITS or CBI. However, we will see that they do indeed have very significant advantages in SLT.

An up to date version of SLT and its relationship to other recent approaches to automated instructional systems has been documented in (Scandura, 2007; Scandura, Koedinger, Mitrovic & Ohlsson and Paquette, 2009).

This disclosure focuses on what is most unique about knowledge representation in SLT along with why and how it offers major advantages in developing adaptive tutoring systems. To avoid misunderstanding, it is helpful to distinguish the current approach is fundamentally different from others based on statistical analyses e.g., Sheehan, U.S. Pat. No. 6,144,838). The present disclosure is based on a priori identification of the underlying proficiency model, what an expert in the area believes should be learned for success. In contrast, the Sheehan disclosure explicitly assumes that the true proficiency model is not known a priori. The Sheehan method uses regression, Bayesian decision theory and other statistical methods to model ways in which required skills interact with different item features to produce differences in item difficulty. In contrast, the present disclosure has a deterministic foundation (i.e., that a true proficiency model IS known a priori). In short, the main thing they have in common is that both disclosures share the word "tree-based".

There have been three fundamental advances in SLT in recent years. First is in the way knowledge is represented. SLT rules were originally represented as directed graphs (Flowcharts). They are now represented in terms of Abstract Syntax Trees (ASTs). Second is formalization of a key step in Structural (domain) Analysis (SA), enabling the systematic identification of higher order SLT rules that must be learned for success in ill-defined domains. Third is the complete separation of SLT's control mechanism from higher order knowledge. These advances distinguish knowledge representation in SLT from all others, and have fundamental implications for building adaptive tutoring systems.

BRIEF DESCRIPTION OF THE SEVERAL VIEWS OF THE DISCLOSURE

FIG. 1. AST Tree view representing the declarative, herein also called structural, knowledge associated with input-output behavior. In addition to the minus sign and an underline, the column subtraction problem (represented as Prob) is defined as a set (any number) of columns, each with seven components. In addition to type of refinement (e.g., Prototype, Component), this tree view distinguishes those values having relevance to learning (i.e., abstract values such as 'Done, NotDone and Subtracted, NotSubtracted). For example, Prob can be 'Done' or 'NotDone and CurrentColumn can be 'Subtracted' or 'Not Subtracted'. This tree view also includes information under INPUT pertaining to Parent-Child mappings and under Output to Input-Output mappings. For example, the Parent-Child mapping <*Subtracted; Done> means that the parent 'Prob' is 'Done' when all of the columns have been 'Subtracted'. Similarly, the INPUT value of 'Prob' may be 'Done' or 'NotDone' but the OUTPUT must be 'Done'.

Figure 2:
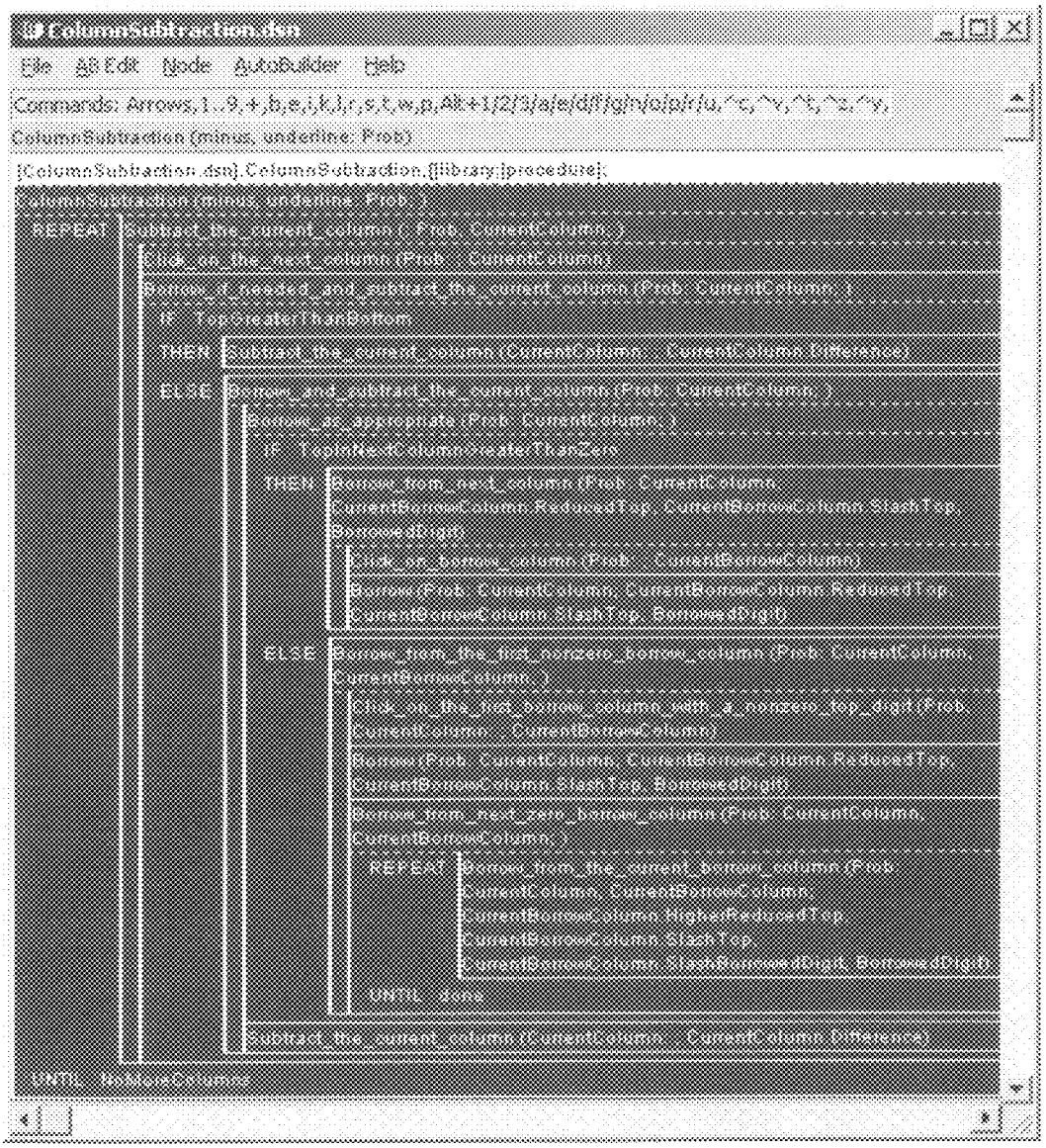

FIG. 2. A Flexform knowledge AST representing all levels of abstraction of the process of column subtraction. Higher levels of abstraction in the Flexforms are separated from their children by dotted lines. Each node in the AST is assumed to be executable, either directly or in terms of lower level (e.g., terminal) nodes that are executable.

Figure 3:
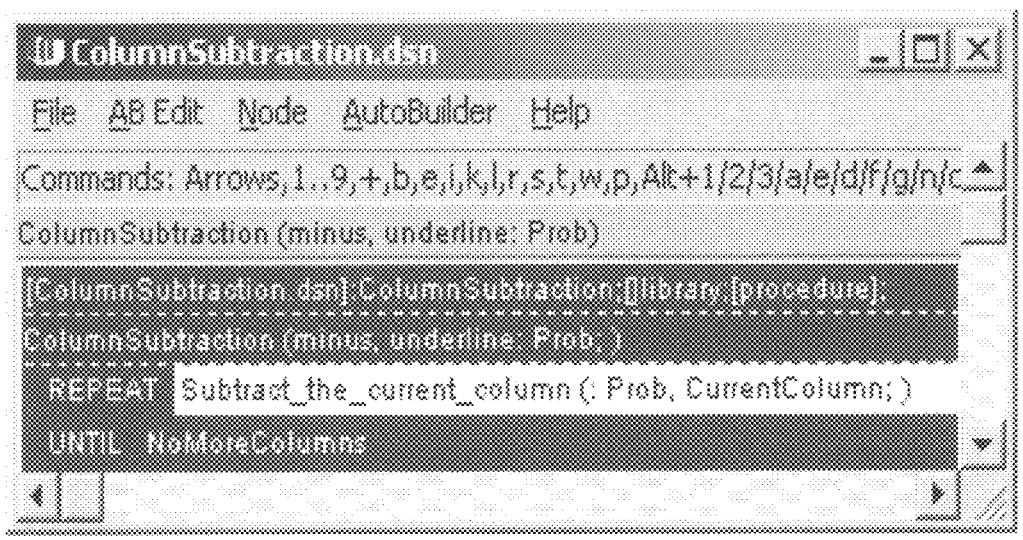

FIG. 3. The top two levels of the Flexform representing, respectively, ColumnSubtraction as a whole and the REPEAT . . . UNTIL loop in which each column is subtracted in turn.

Figure 4:
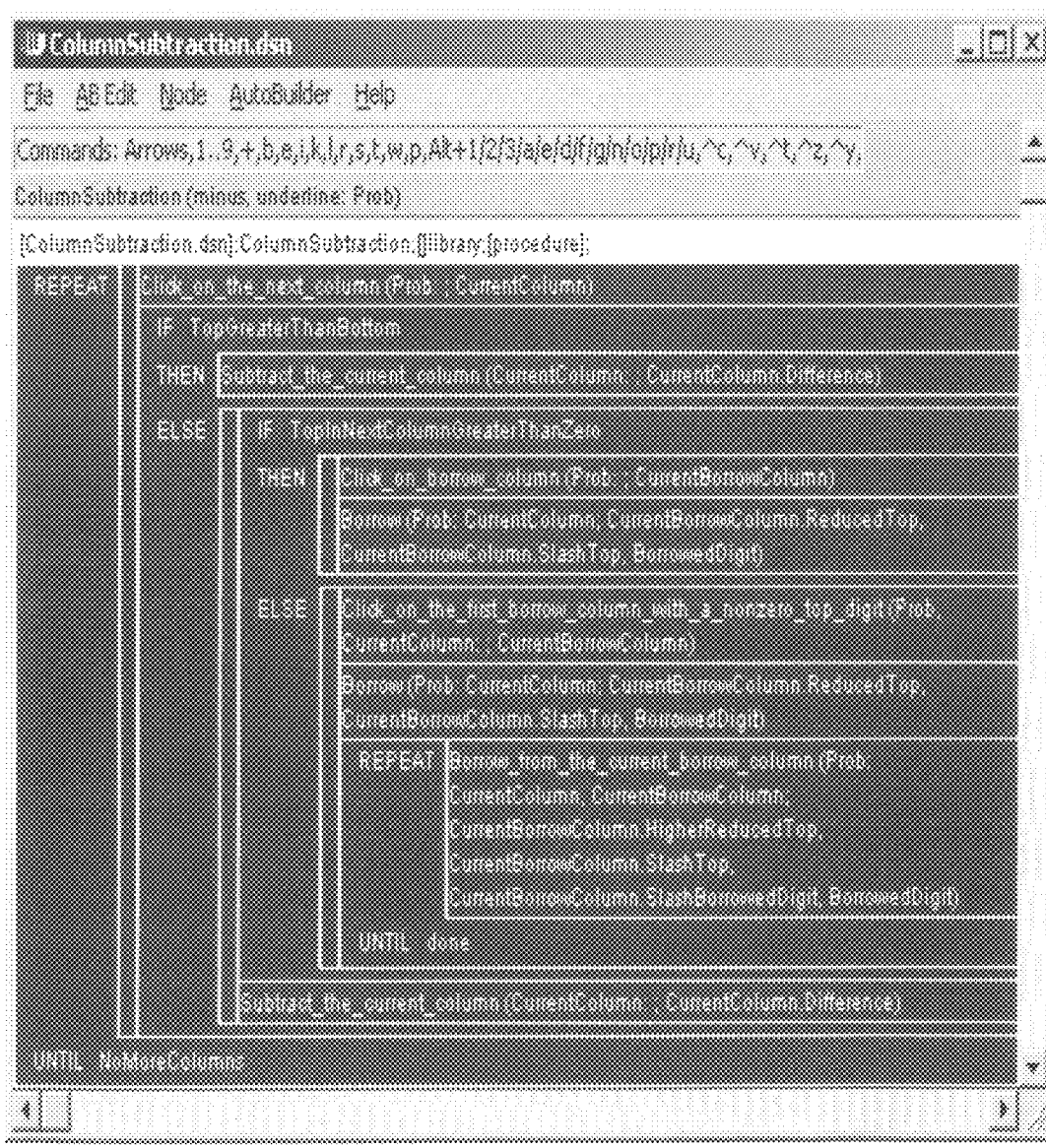

FIG. 4. Flexform showing terminal operations in the Flexform.

Figure 5:
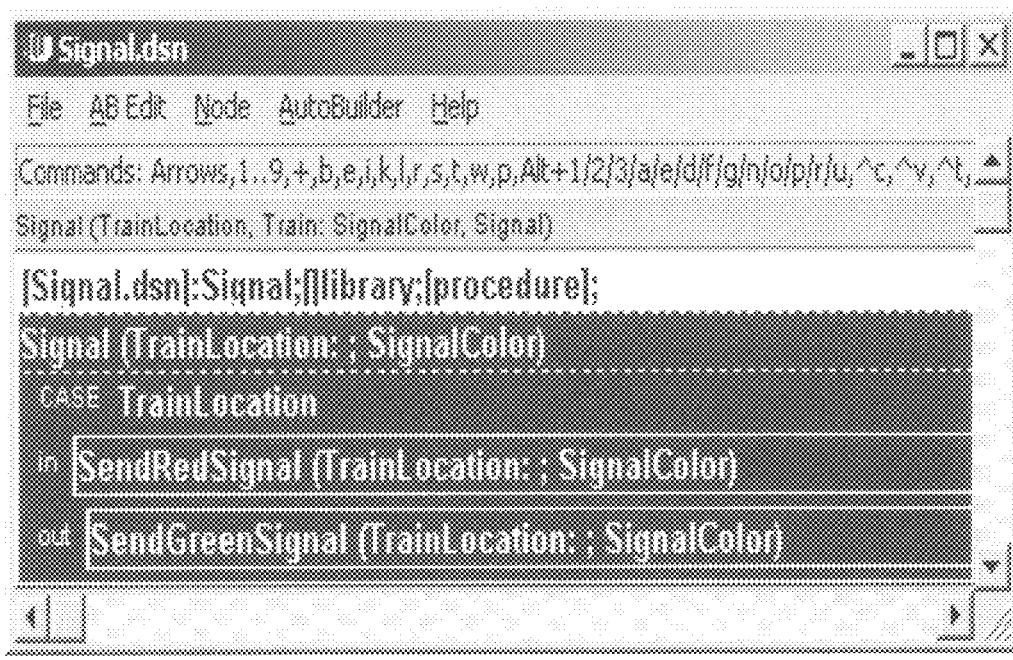

FIG. 5. Flexform AST representing the Signal component. It receives one of two events (train 'in' the crossing and train 'out' of crossing). In the former case it sends a 'red' signal to Gate; in the latter it sends a 'green' signal.

Figure 6:
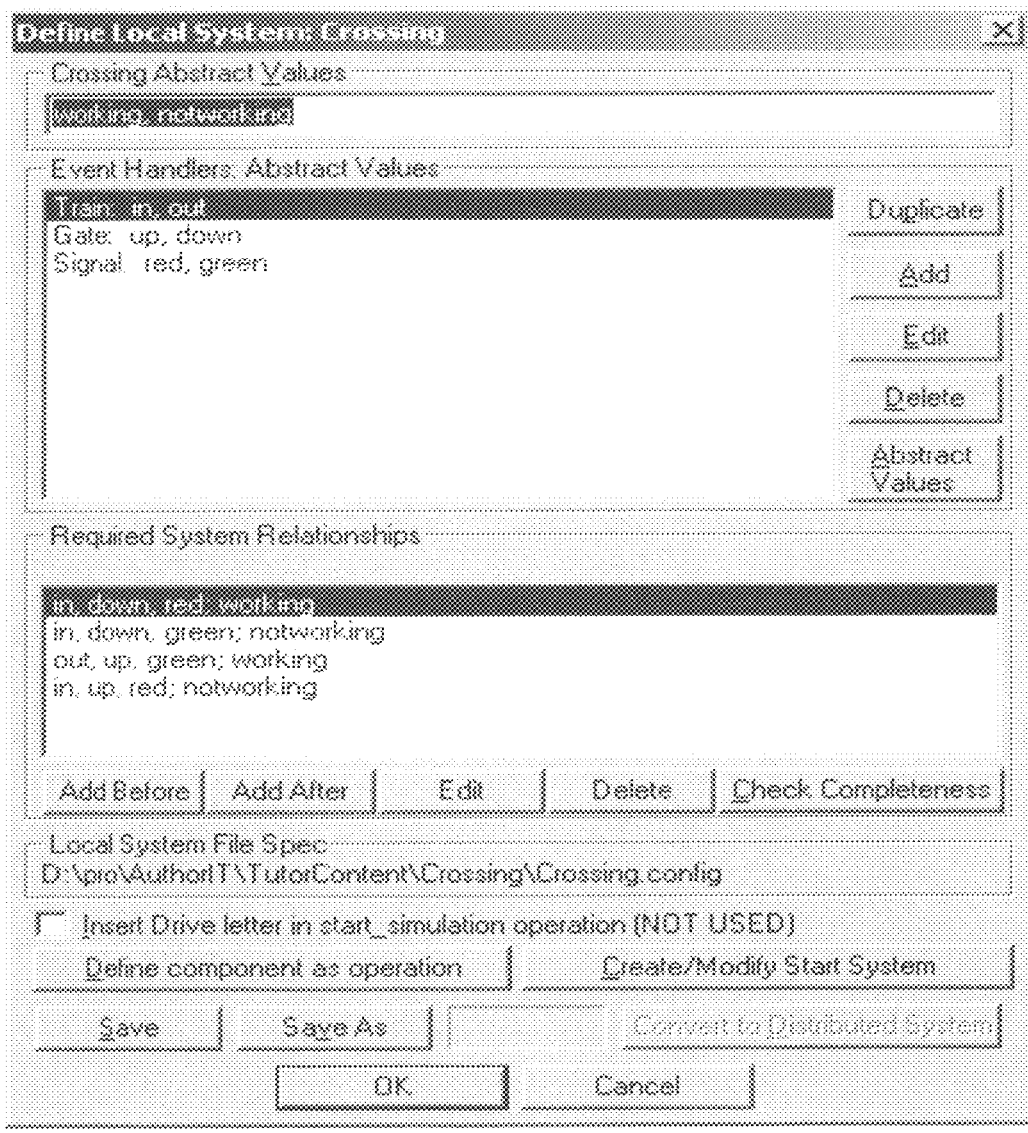

FIG. 6. Dialog box showing abstract values of a simulated Railroad Crossing system and the train, signal and gate components in this system and their abstract values. The dialog also shows portions of the declarative knowledge representing the relationships between the components and the system as a whole (e.g., a working system consisting of the train being in [the station], the signal being red and the gate being down).

Figure 7:
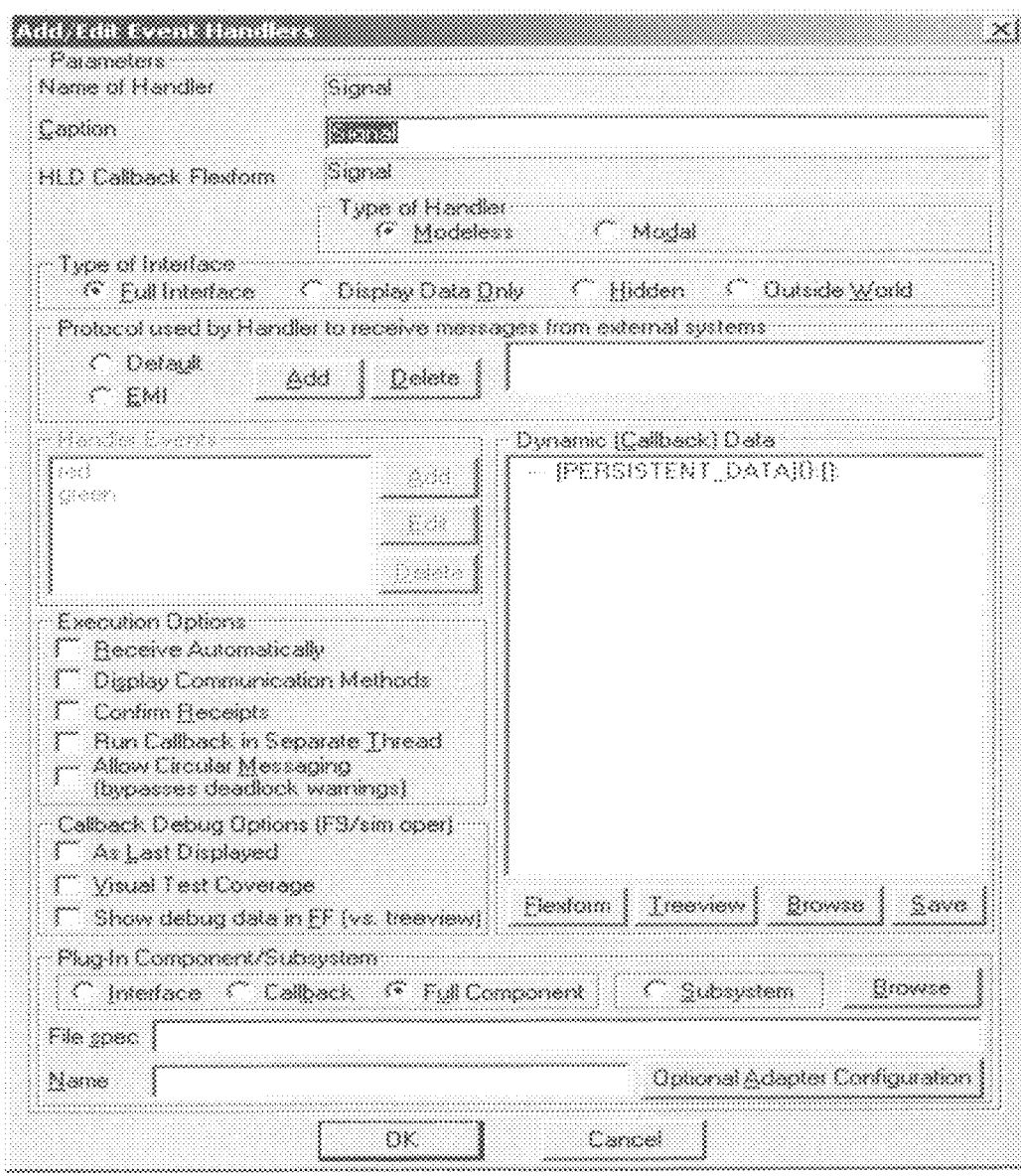

FIG. 7. Dialog box defining the kind of interface to be used for the Gate component. Dialog boxes are optional and used only where the system's behavior is to be simulated. In this case, the interface is the default dialog used in Scandura's SoftBuilder software, which represents essentials without any customization.

Figure 8:
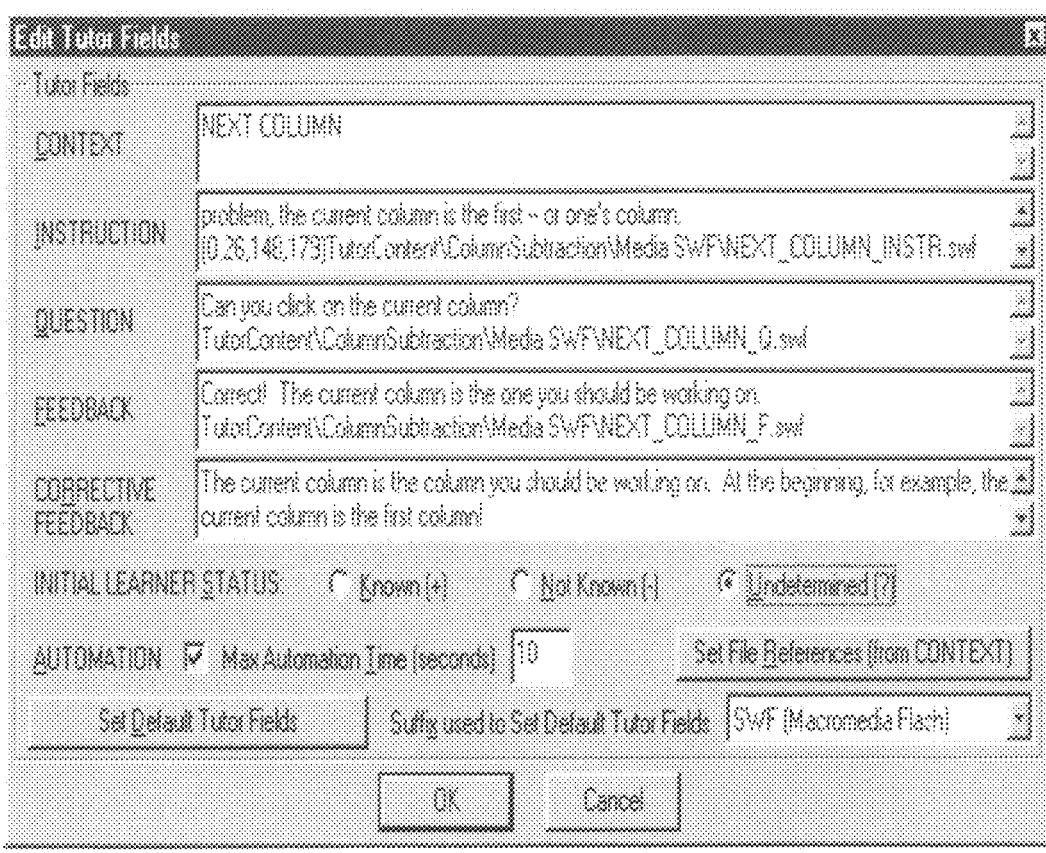

FIG. 8. Dialog box in the preferred embodiment showing sample semantic attributes assigned to AST nodes.

Figure 9:
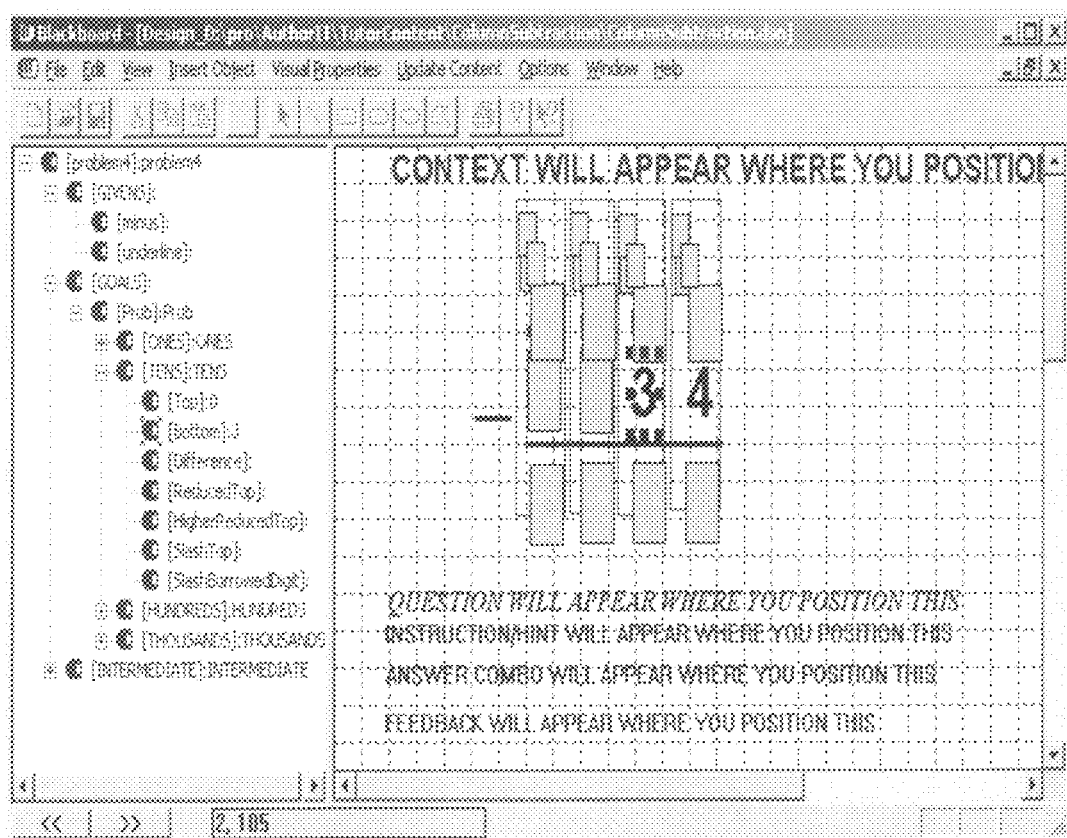

FIG. 9. Dialog box in the preferred embodiment showing layout of a column subtraction problem. The Bottom digit in the Tens column is highlighted both in the treeview on the left side and the Blackboard layout on the right.

Figure 10:
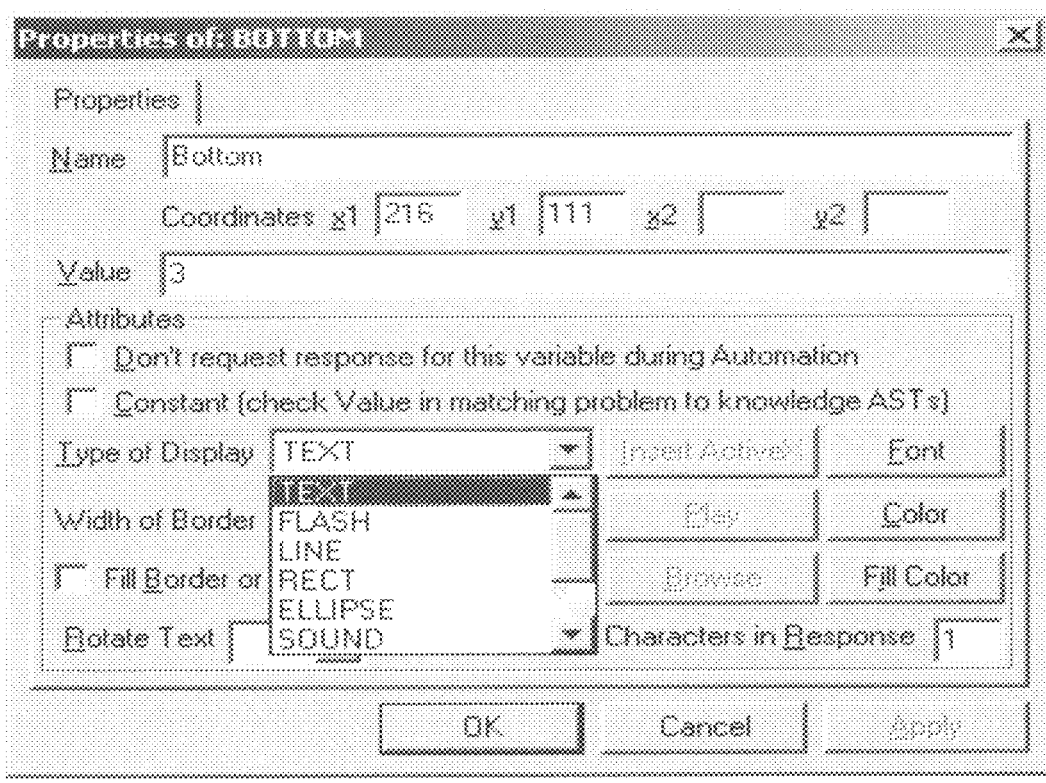

FIG. 10. Dialog box in the preferred embodiment showing how properties or semantic attributes are assigned to individual variables. The 'Bottom' node or variable in the position x=216, y=111 has been assigned the value 3. 'Path' replaces 'Value' when a file reference is required (e.g., Flash .swf, Sound .wav). Geometric displays, such as Line and Rect, have no Value, only coordinates. Text may be rotated and a specific No. of Characters may be assigned to textual (learner) responses. In addition to Display Properties, response nodes may be assigned different kinds of response and evaluation properties (i.e., semantic attributes). Semantic attributes representing QUESTIONS, INSTRUCTION, etc. (see FIG. 8) may be assigned properties in a similar manner. Other properties that may be assigned include: a) whether or not to ignore a variable when testing for automation (of the knowledge defined by a subtree containing that variable) and b) whether the named variable has a constant value meaning that its value (as well as its name) should be taken into account in determining whether or not an SLT rule (knowledge AST) applies to the problem in which the constant variable is a part.

Figure 11:
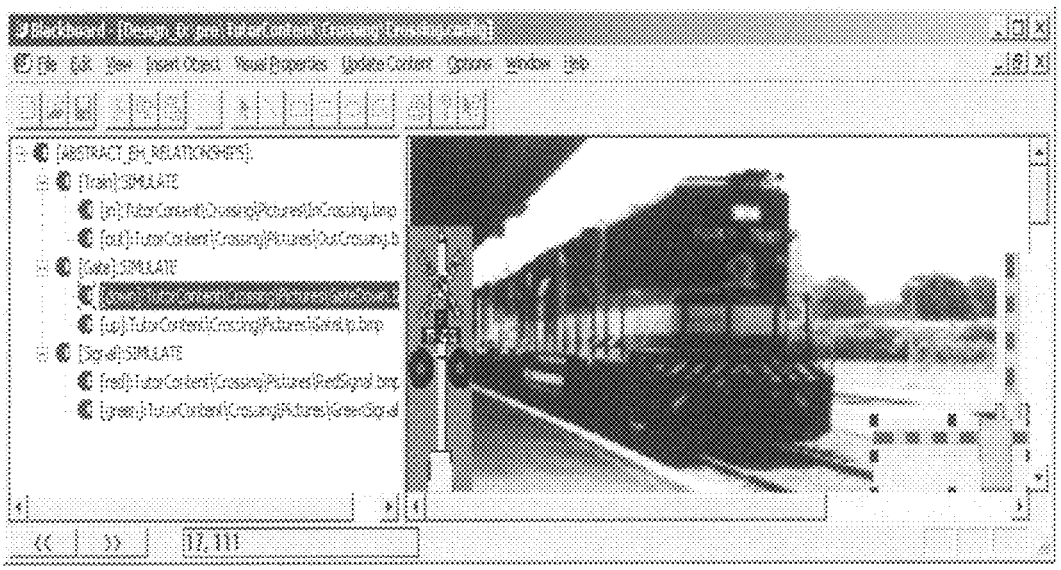

FIG. 11. Pictures (.bmp files) associated with abstract values of child components in the crossing system. The tree view includes all combinations of these values. The Blackboard on the right side displays those pictures last selected in the tree view.

Figure 12:
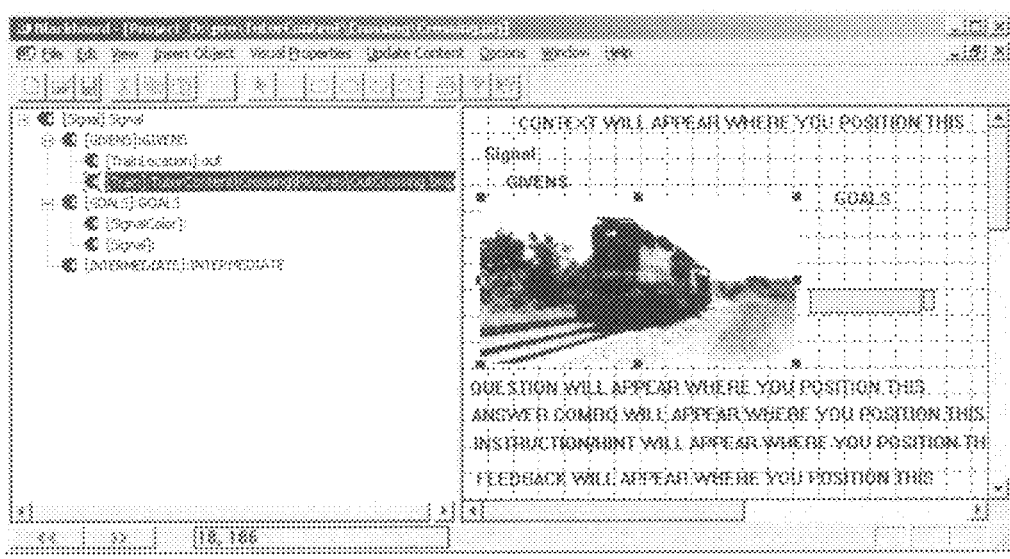

FIG. 12. Definition of a project level problem solvable using the Signal component in the Crossing system.

Figure 13:
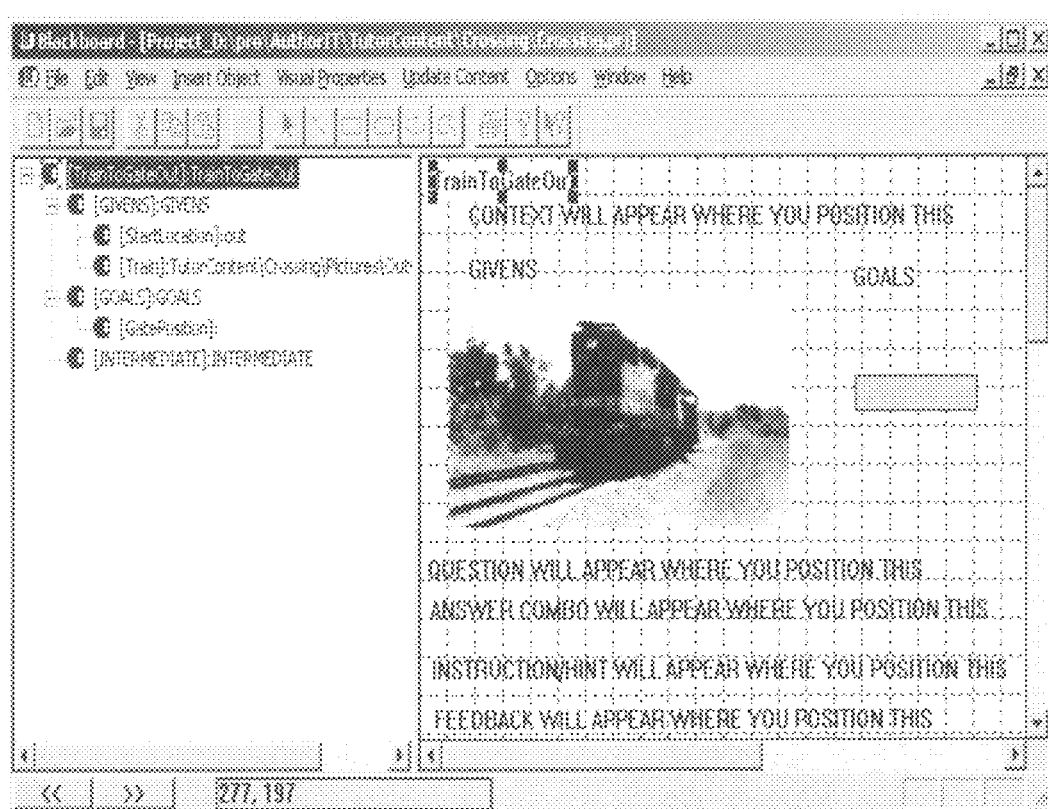

FIG. 13. Definition of a project level problem, whose solution requires all three components in the Crossing system.

Figure 14:
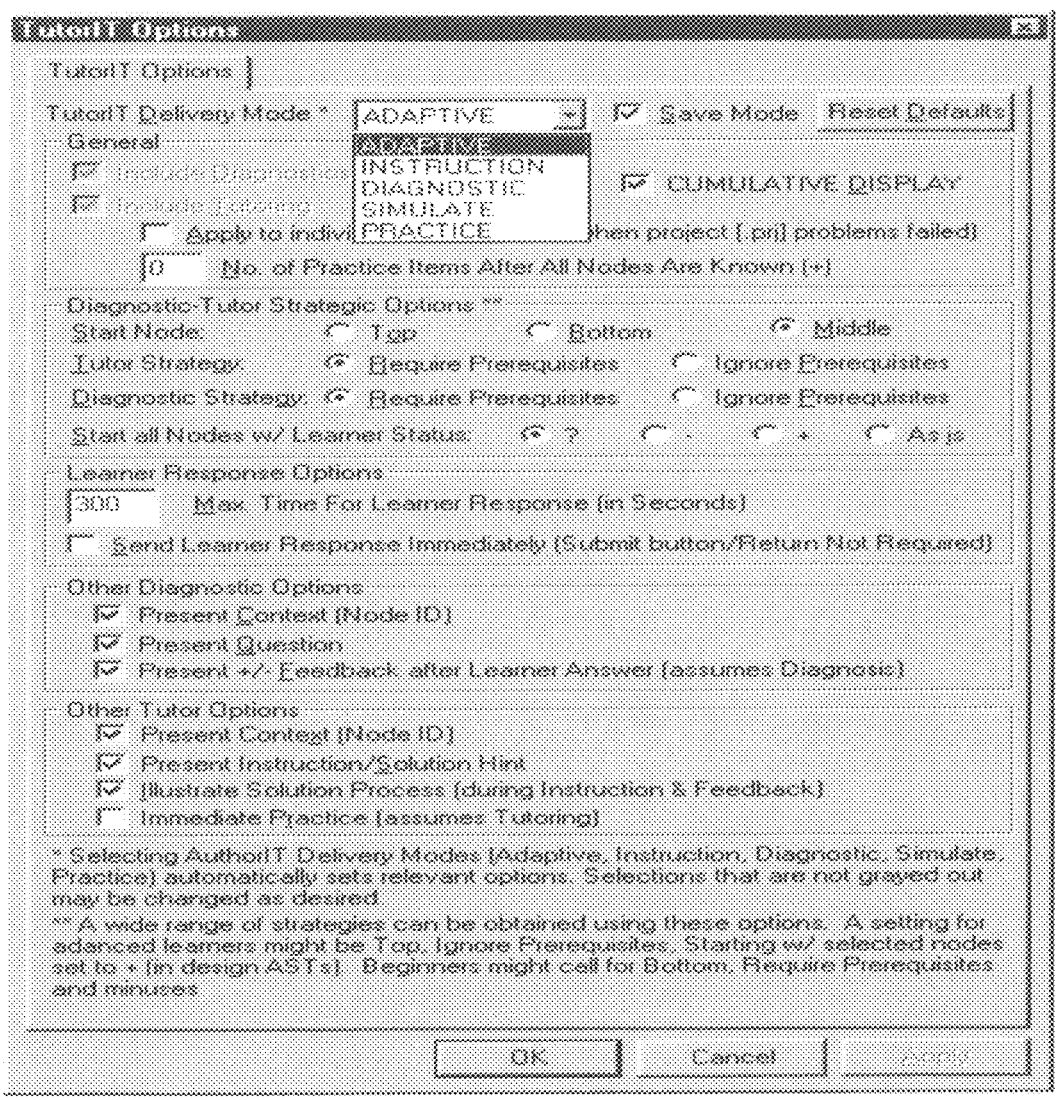

FIG. 14. Dialog box showing Tutor Options in the preferred embodiment. Each TutorIT Delivery Mode is defined by various combinations of the options below the delivery mode. For example, ADAPTIVE must include both diagnosis and tutoring. These as well as non-mandatory options may be set as desired and saved so they can later be used by the Universal Tutor (see below). Notes on Delivery Modes and Strategies at the bottom of the figure illustrates the wide range of possibilities.

Figure 15:
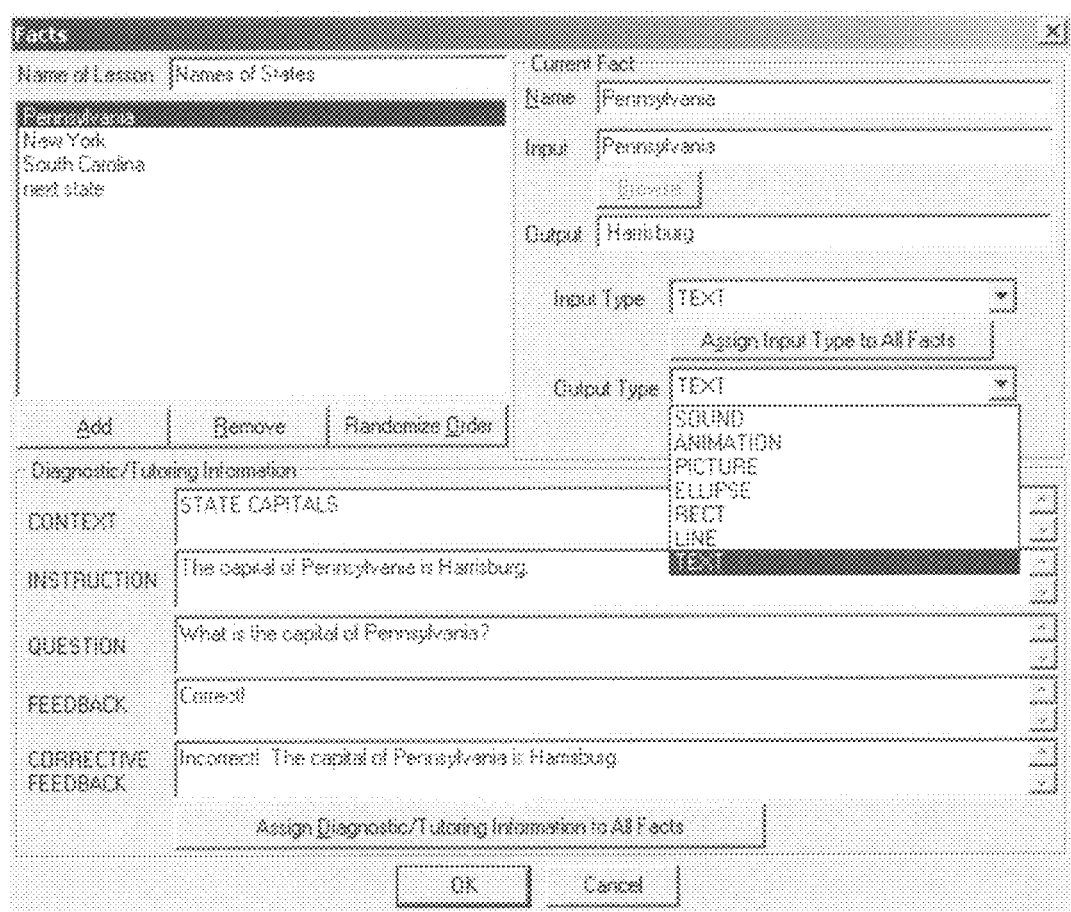

FIG. 15. Dialog box showing the information necessary to construct a representation of factual knowledge of state capitals in the USA. This dialog box illustrates how display (Input Type) and response (Output Type) types are assigned to nodes. Corresponding Evaluation Types in this case are automatically assigned to Output nodes.

Figure 16:
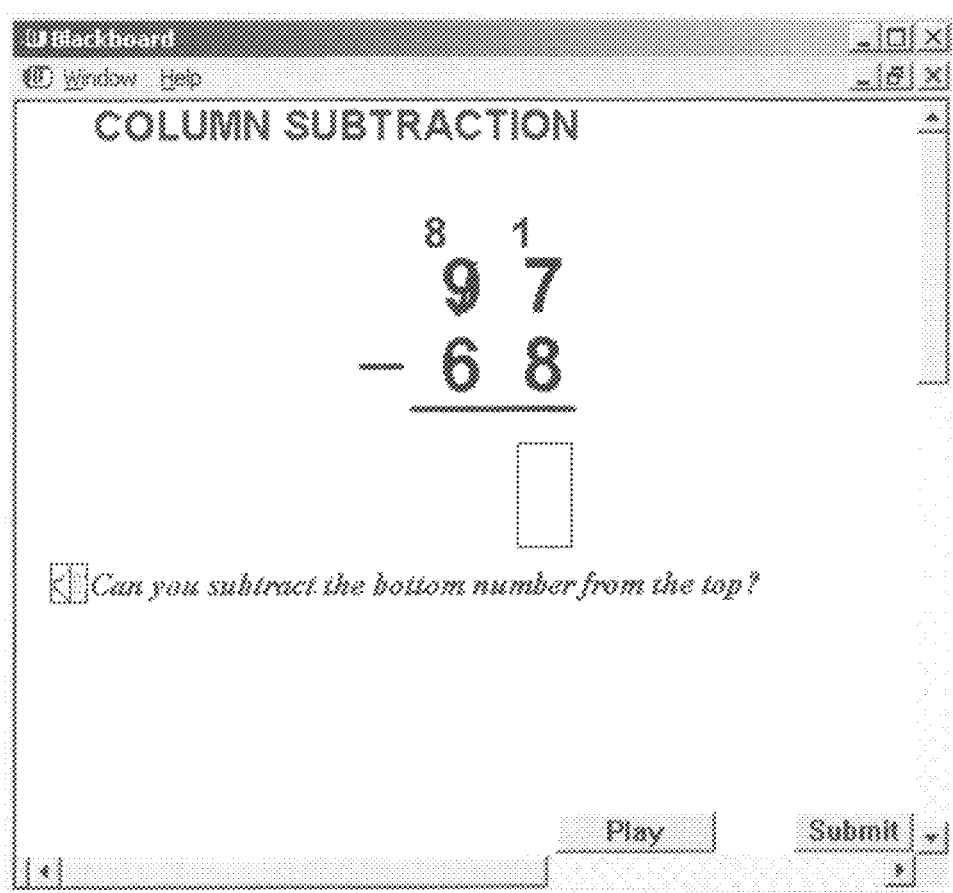

FIG. 16. A specific column subtraction problem derived from the original problem type such as that shown in FIG. 9.

Figure 17:
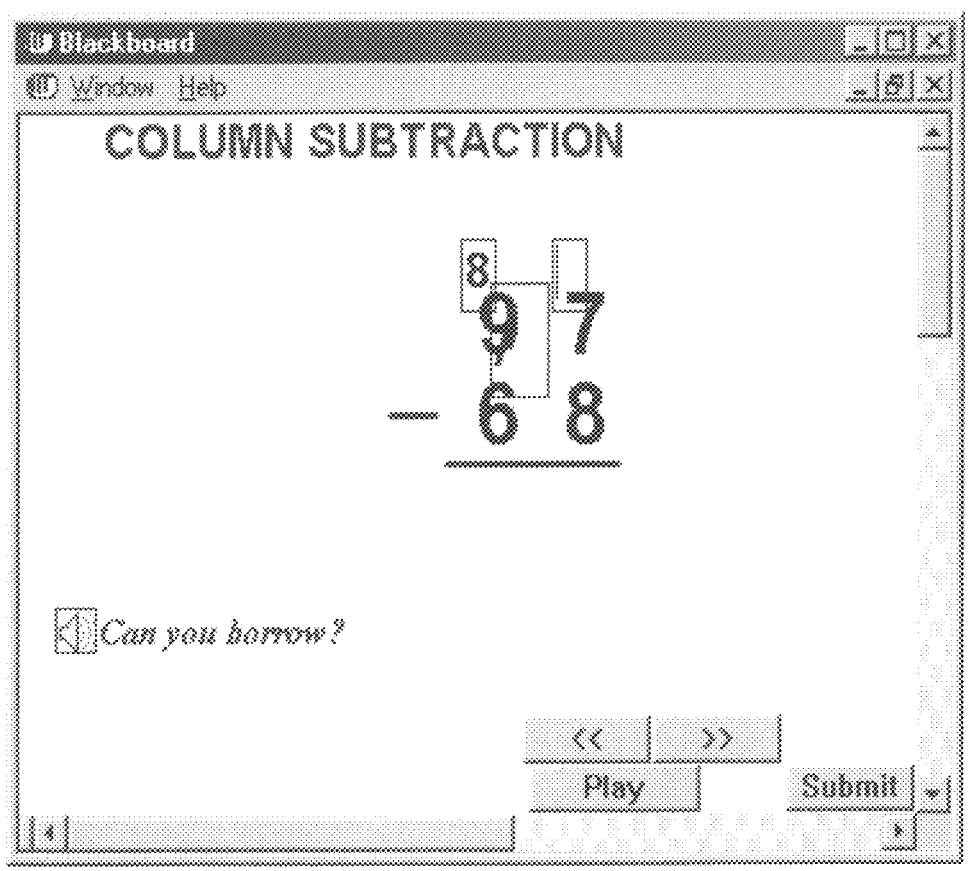

FIG. 17. A column subtraction problem derived from a non-terminal node the original problem type such as that shown in FIG. 9. Specifically, the node involves borrowing, and involves executing three distinct terminal nodes: crossing out, entering the reduced top digit and adding one ten to the top digit in the one's column.

Figure 18:
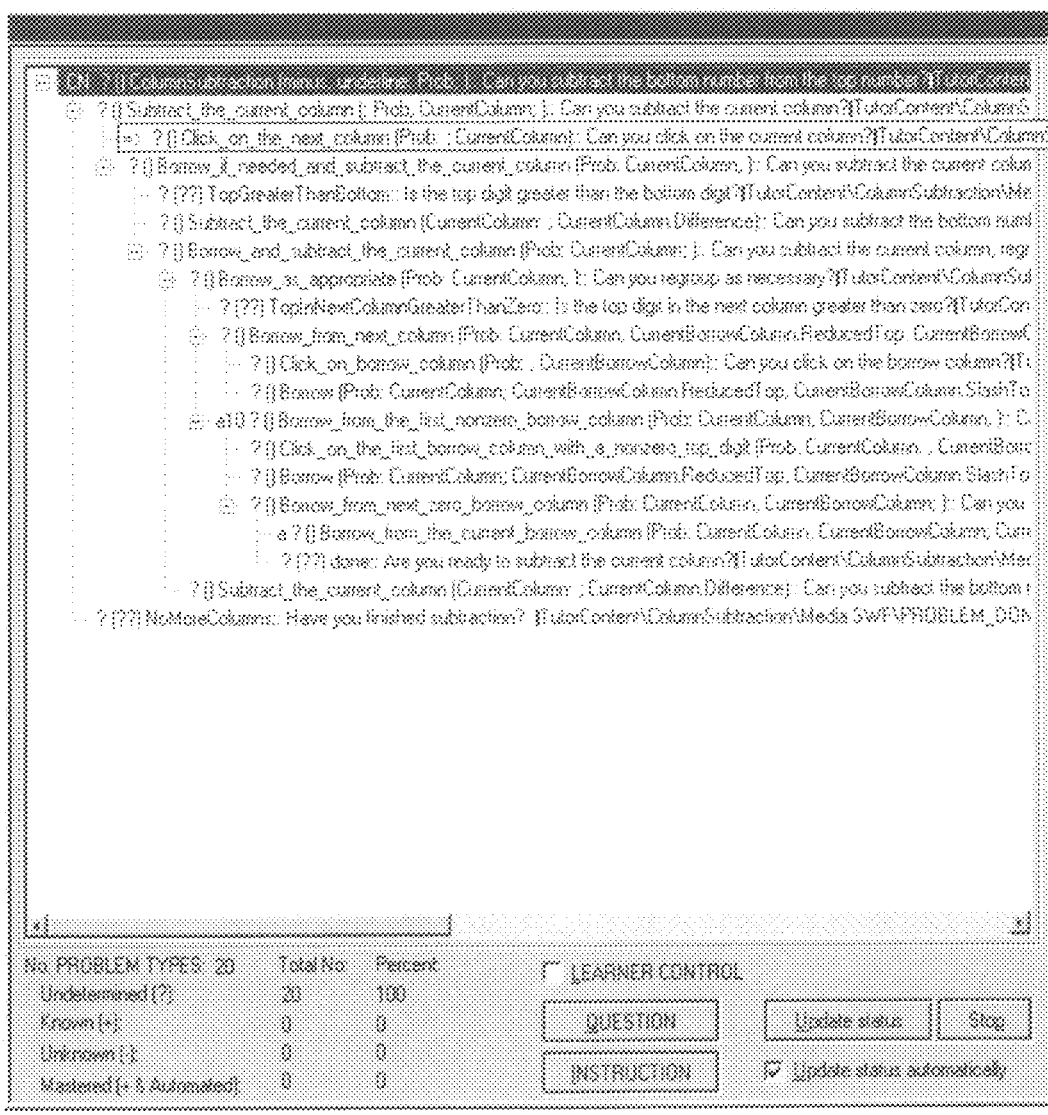

FIG. 18. A tree view representation of the procedural AST (Flexform) for Column Subtraction. Assigning known (+), unknown (−) and yet to be determined (?) to individual nodes in such a tree view represents a Learner Model, the status of an individual learner at a given point in time.

Figure 19:
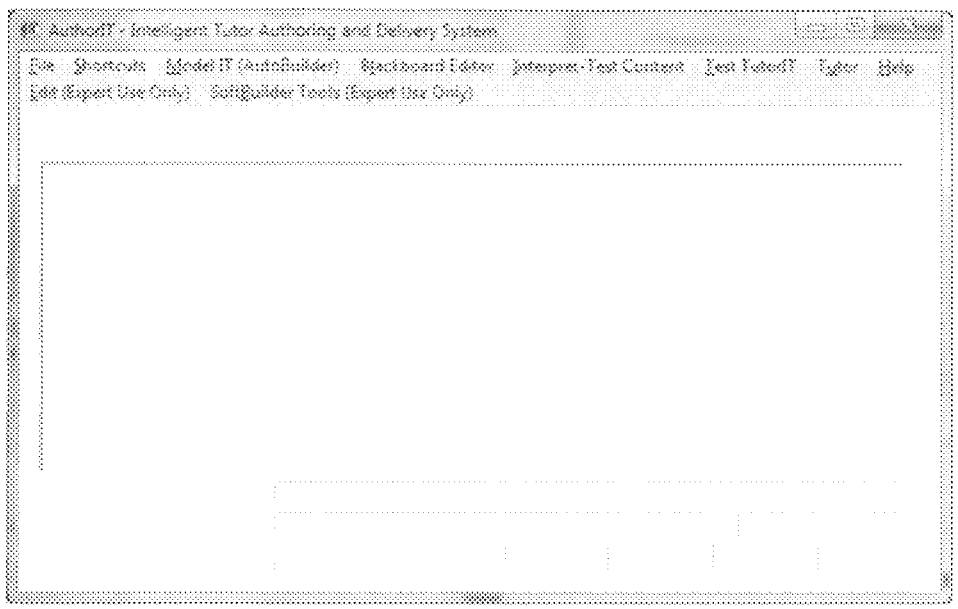

FIG. 19. Sample AuthorIT interface showing AutoBuilder (Model IT), Blackboard Editor, and the Text Tutor pull down, which includes two options, one to set the Options Tool and transfer its settings in a form usable by TutorIT and a second to run/test TutorIT on selected content.

Figure 20:
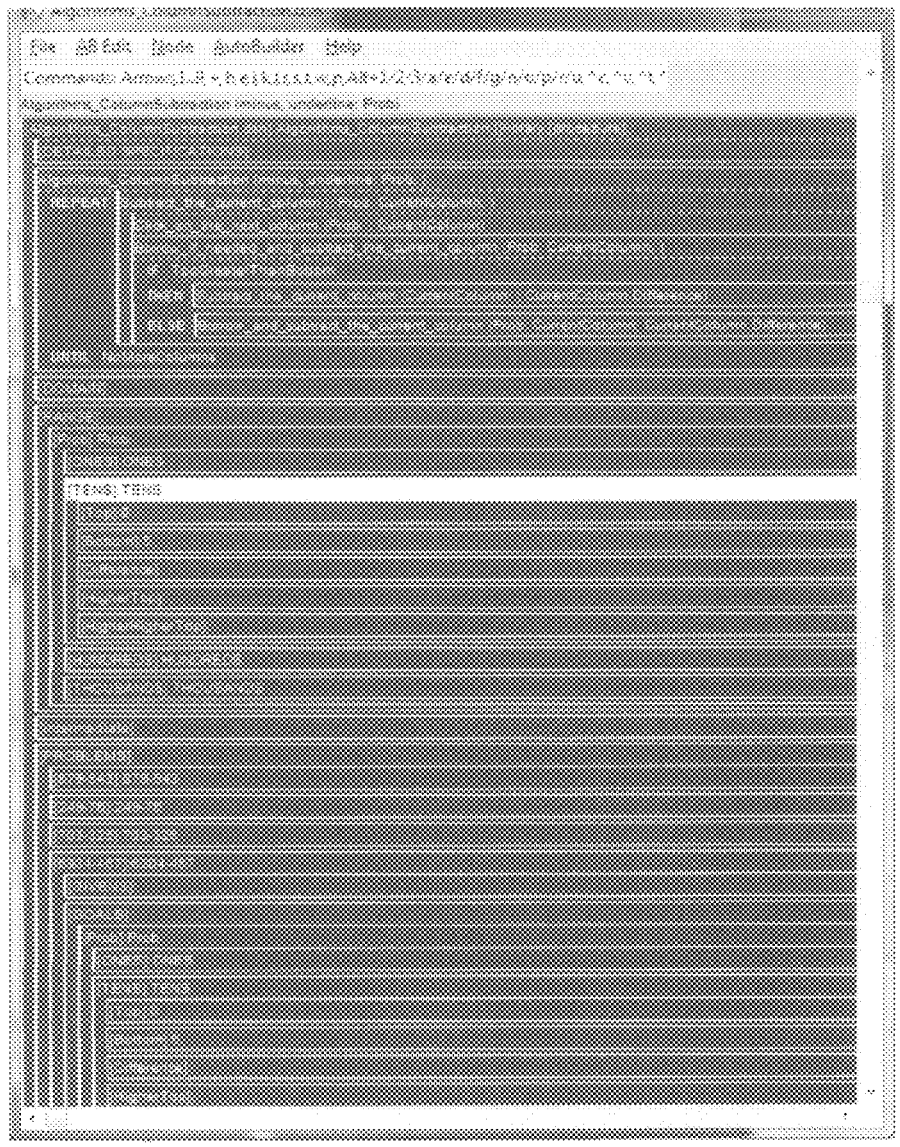

FIG. 20. In the preferred embodiment, Flexforms serve as a common data base. They represent knowledge, including all abstraction levels in both procedures and associated data structure, along with subtraction problems that can be solved using that knowledge. Flexforms also include layout and other needed information. More generally, Flexforms contain all information necessary for TutorIT to provide highly individualized tutoring.

Figure 21A:
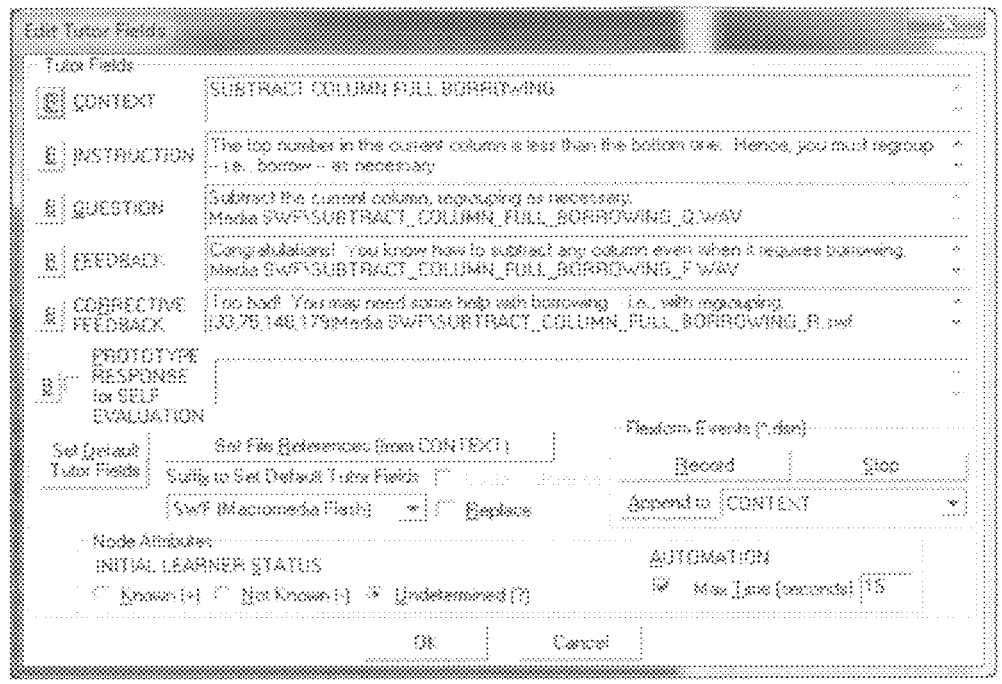
Figure 21B:
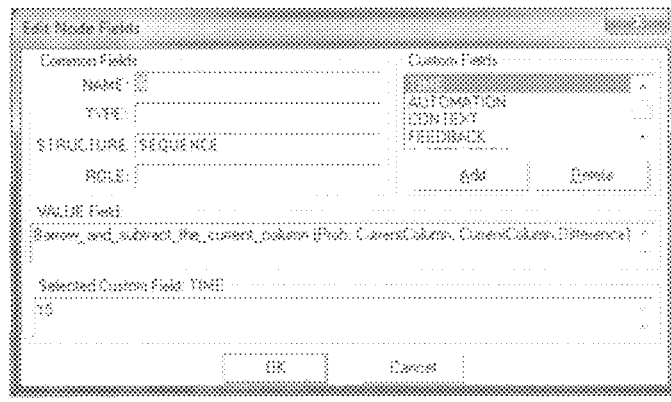

FIGS. 21A and 21B. Illustrate how supporting information may be assigned to individual nodes in a Flexform. FIG. 21A shows how instruction, questions, feedback and corrective feedback and other information, including associate media may be assigned to such individual nodes. FIG. 21B shows how other properties, such as response times and other constraints or information may be assigned to nodes.

Figure 22:
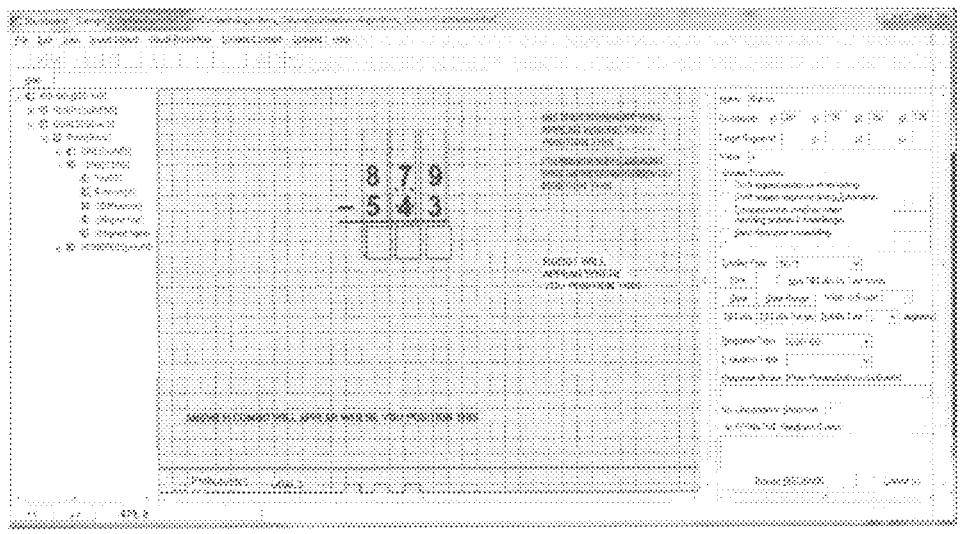

FIG. 22. Shows the Blackboard Editor used during the authoring process to define problem layouts. Problem data structures are shown in left panel, problem layout in the middle and attributes of individual nodes in the representation. These attributes may include but are not limited to such things as position and display, response and evaluation types associated with individual nodes.

Figure 23:
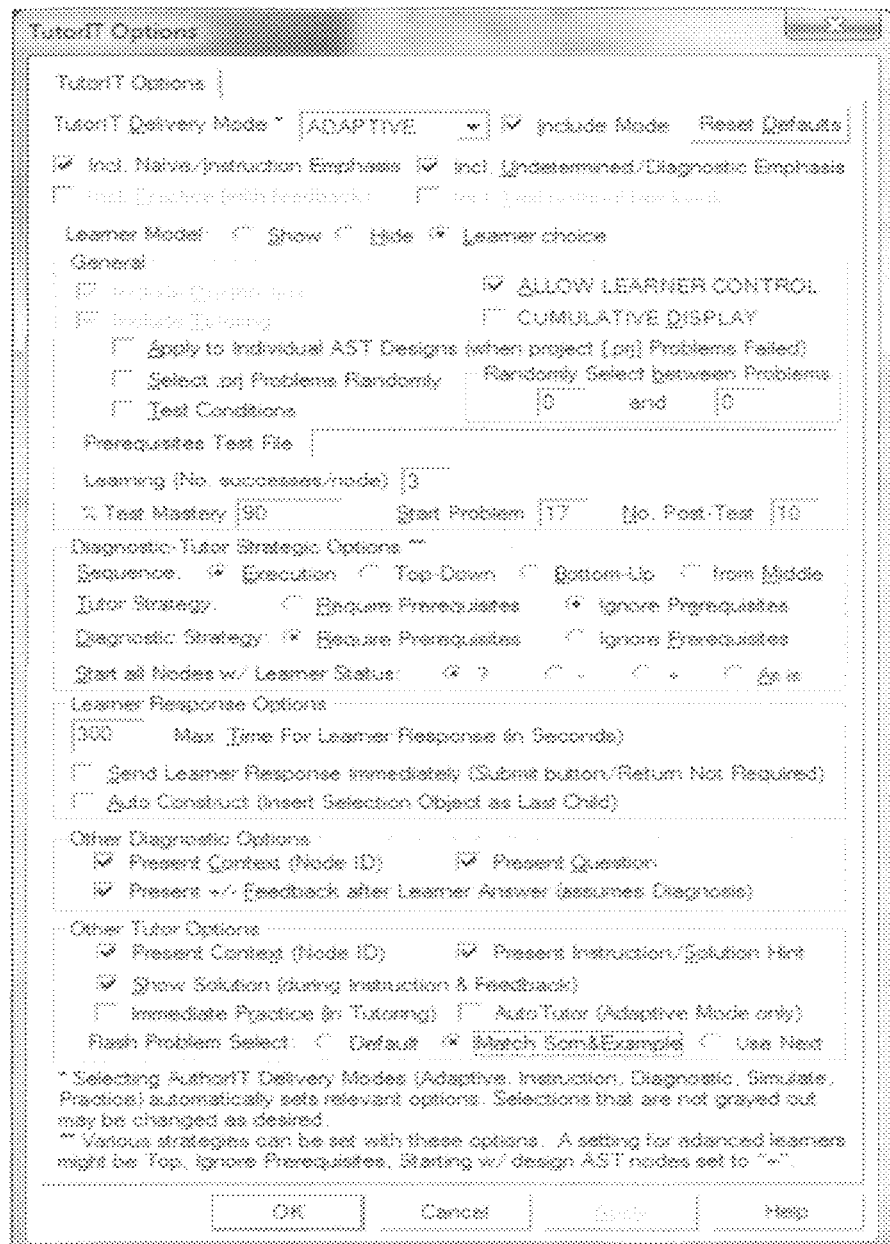

FIG. 23. Shows a more recent set of options set in AuthorIT's Option Tool. As described in the text, these options define the way TutorIT is to deliver the content to learners.

Figure 24A:
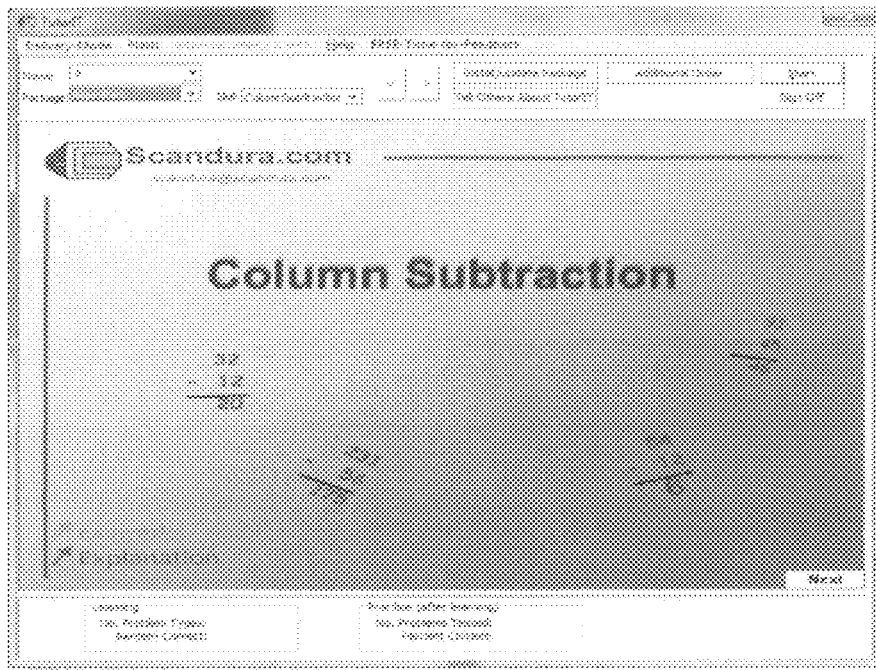
Figure 24B:
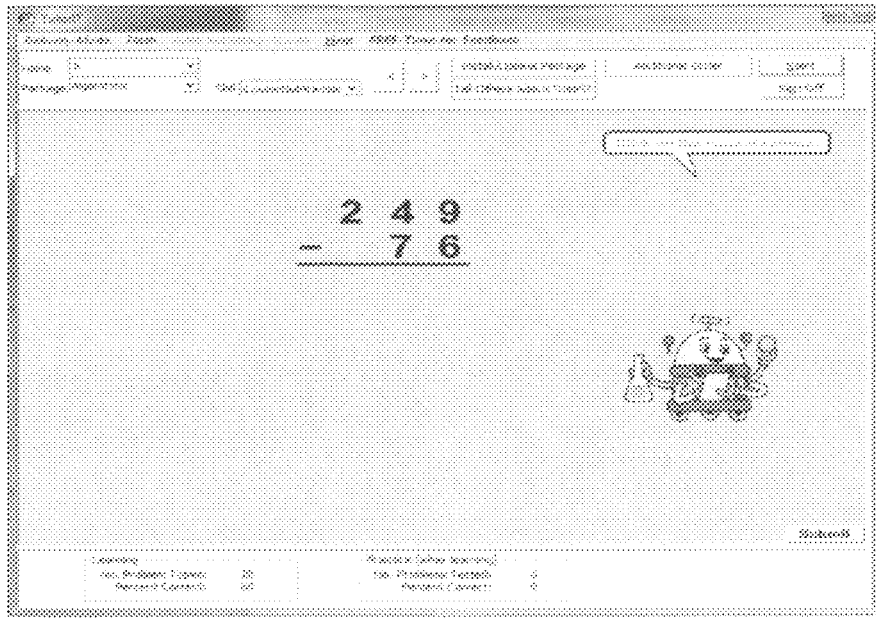

FIGS. 24A and 24B. Shows a sample title screen, in this case for Column Subtraction. In the preferred embodiment, each Package contains a number of skills. The "Delivery Mode" pull down allows learners or supervisory adults to select from among the delivery options the author chooses to make available. These options include LEARNER CONTROL, and various options allowing the student and/or supervisory to further customize the delivery. Other buttons control such things as installation, ordering, etc. FIG. 24B shows a sample question as the learner normally sees it.

Figure 25A:
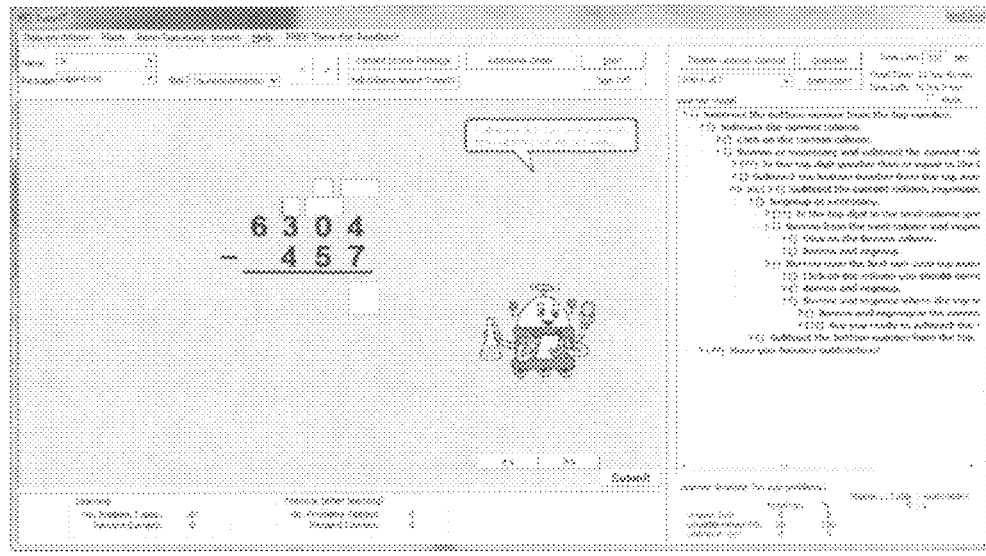
Figure 25B:
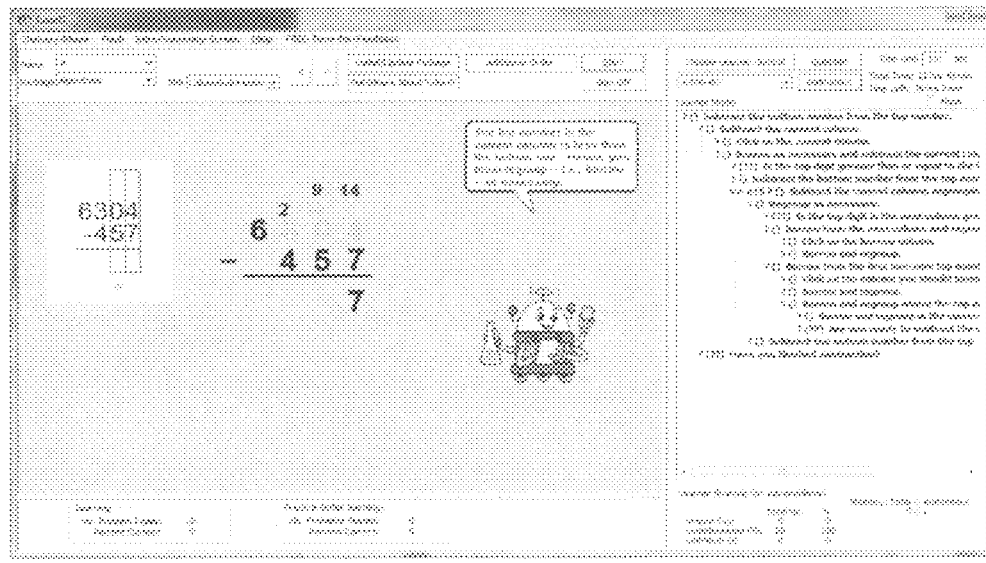

FIGS. 25A and 25B. These figures show sample question and instructional Screens, respectively. It should be noted in addition to simple text that author's have the option of specifying text to speech, graphics, sound files, or animations as in this case using Flash files. These figures also show the Learner Model which detail what TutorIT knows about the learner's status on each node. When TutorIT knows (by testing) that a learner knows that part of a skill corresponding to a given node, TutorIT marks the node "+". When a student's behavior indicates that he or she has not know a sub skill, that node is marked "−". When the status of a node is unknown to TutorIT, the node is marked "?".

Figure 26A:
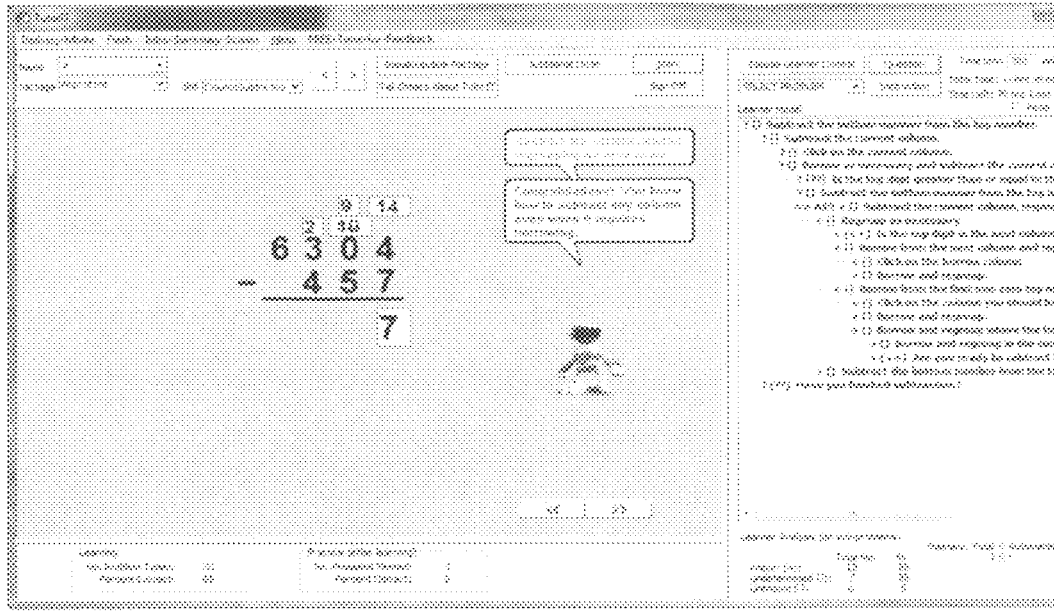
Figure 26B:
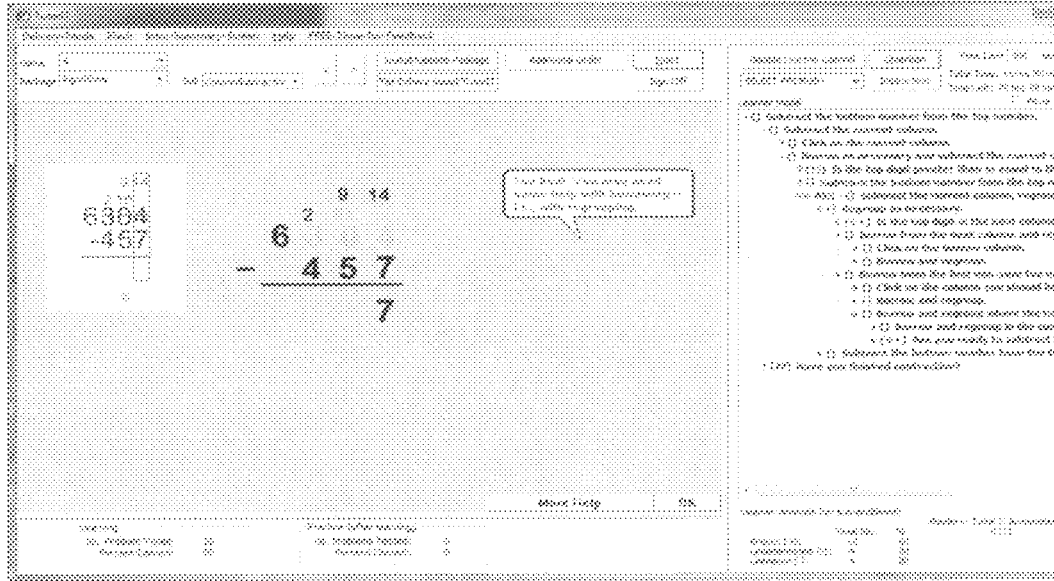

FIGS. 26A and 26B. These figures show illustrate positive and corrective feedback screens, which have similar flexibility.

Figure 27:
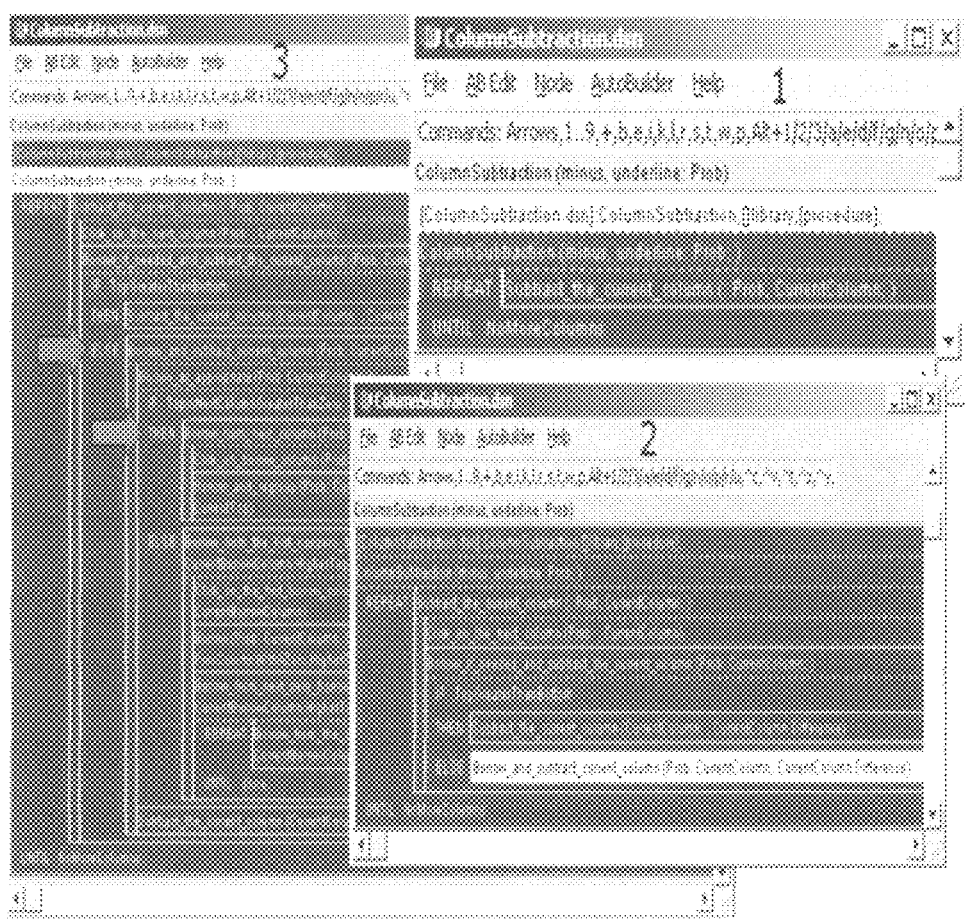

FIG. 27 shows successive levels of procedural refinement in Column Subtraction. This Flexform shows all levels refinement, from the highest levels of abstraction to the point where terminal nodes correspond to presumed prerequisites. In column subtraction these prerequisites include basic subtraction facts, ability to compare numbers as to size, etc. Students are tested on entry to ensure that they have mastered these prerequisites.

Figure 28:
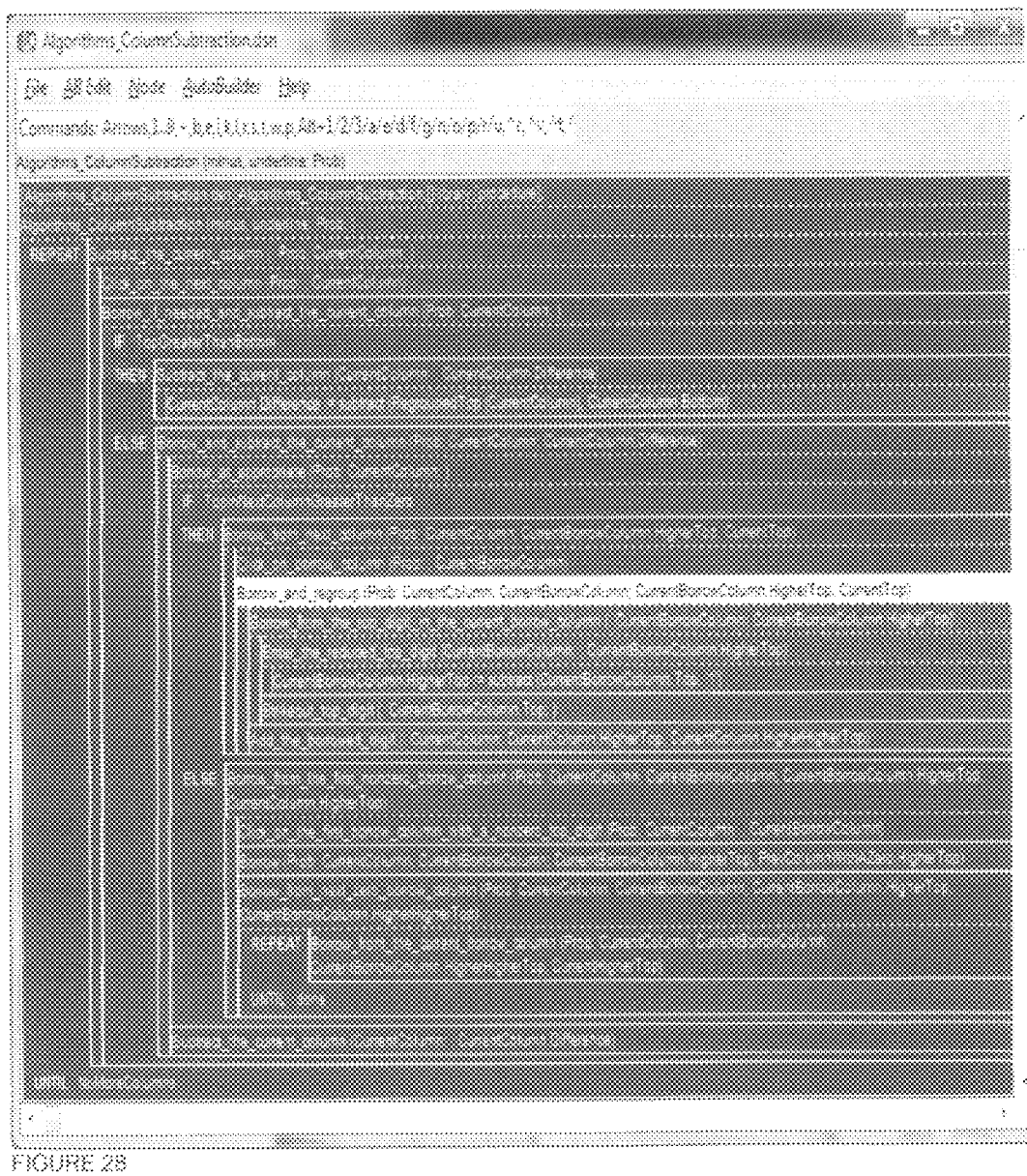

FIG. 28 shows how Terminal nodes in a Flexform used to represent the most elementary operations and conditions are made executable on a computer in the preferred embodiment. The green nodes below the blue terminal nodes are used for this purpose. The figure shows two examples. The highlighted node requires a number of HLD statements, ultimately refined into terminals written in AutoBuilder/Softbuilder's High Level Design (HLD) language. The single green (lighter color) node above corresponding to the terminal THEN condition illustrates that many (blue, educationally relevant) nodes can easily be implemented in the Softbuilder's HLD language.

Figure 29:
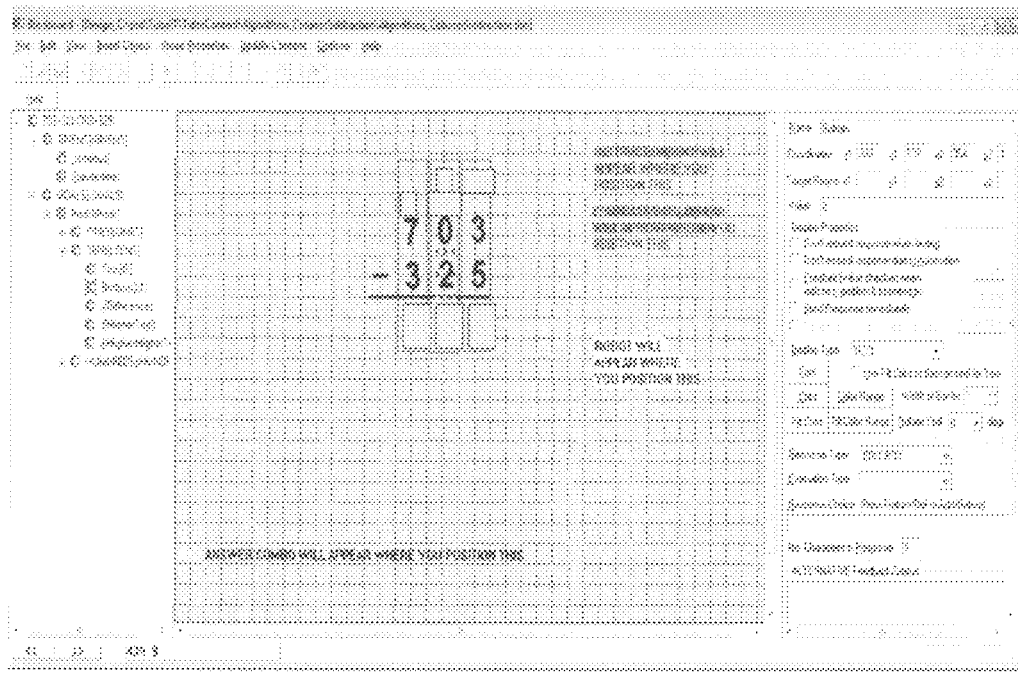

FIG. 29. The left panel in AuthorIT's Blackboard Editor (BB) Editor is used to define individual problems. The center pane is used to layout the interface through which TutorIT and the learner are to interact. It also shows where instruction, questions, positive and corrective feedback are to appear (some appear in the same position, but not at the same time). The right panel is used to assign attributes to individual nodes (elements) in the problem. These attributes include Display types (e.g., Text, Flash, Animation, Sound, Picture, OLE), Response types (Edit Box, Click, Combo Box, Construction) and corresponding Evaluation types (Match_text, Within_region, Structure, Debug).

Figure 30:
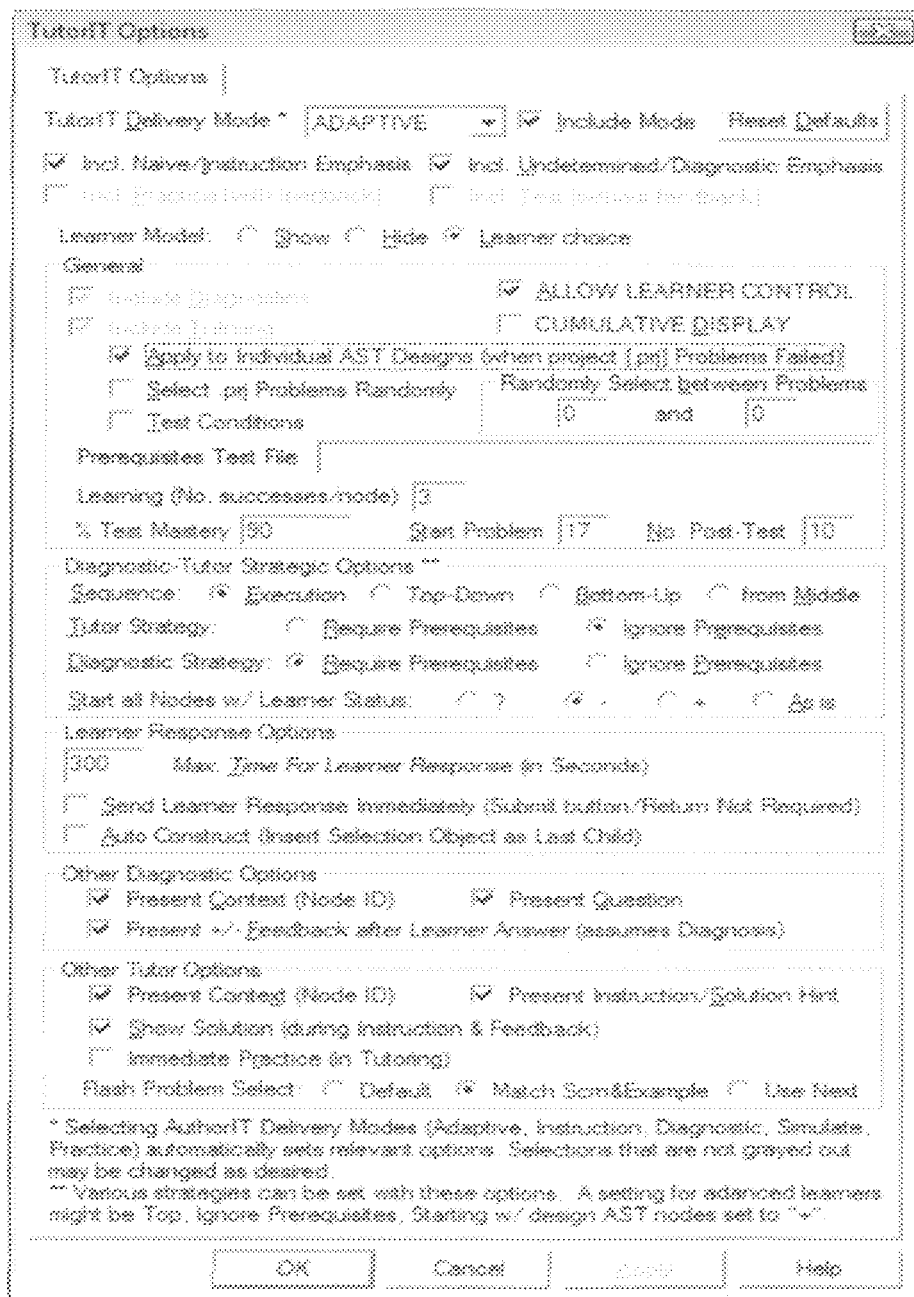

FIG. 30. TutorIT Options Tool used by authors to define/configure alternative learning modes. Currently set to ADAPTIVE mode. Other choices allow for further customization.

Figure 31:
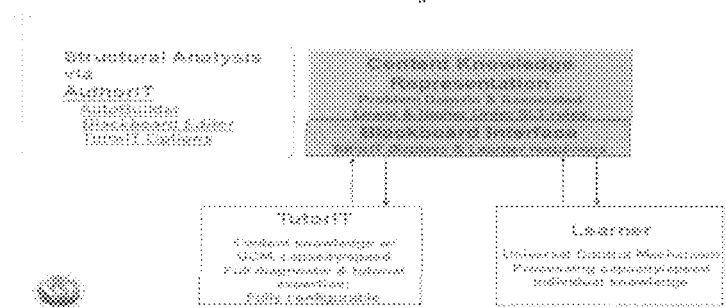

FIG. 31. shows a general overview of how the authoring process using AuthorIT and how TutorIT interacts with learners during delivery using a representation of the content to be learned as a reference point.

BRIEF SUMMARY OF THE INVENTION

The disclosed methods provide a new more efficient and reliable way to develop and deliver a broad range of computer based learning systems, ranging from simple practice to highly adaptive intelligent tutoring systems, with essentially any content.

Instructional systems are assumed to include one or more learners, human and/or automated, content, means of presenting information to and receiving responses from learners, and an automated tutor capable of deciding what and when information is to be presented to the learner and how to react to feedback from the learner.

This invention discloses methods for representing and making observable essentially any kind of to-be-acquired knowledge and methods. These methods make it possible to deliver to-be-learned knowledge to learners based entirely on the structure of that knowledge, independently of content semantics). The authoring system in the preferred embodiment is referred to as AuthorIT. AuthorIT has four major components, an knowledge construction component called AutoBuilder, a Blackboard Editor for defining and lying out problems, an Options Tool for defining delivery options. A fourth component, called TutorIT in the preferred embodiment, takes the output of the first three components and controls the delivery of that content to learners. Specifically, these methods reveal:

1. How to model behavior and associated knowledge, knowledge that experts believe to be necessary and/or sufficient for generating that behavior. More specifically, given domain of problems, these methods show how to formally represent both: a) to-be-solved problems in the domain and b) the to-be-acquired knowledge necessary and/or sufficient for success. Problems and knowledge are both represented at multiple levels of abstraction, the latter representing knowledge in the domain appropriate for all levels of expertise ranging from naïve to expert and all levels in between. Problems to be solved represent to be acquired behavior (e.g., used to test each learner's ability to solve problems). Problems include the inputs and outputs represented as hierarchical ASTs along with the various AST problem states associated with their solution. Aside from the formal, hierarchical AST structures used to represent problems, they serve a role roughly analogous to that of problem data in a computer program, The knowledge (making it possible to solve such problems) similarly is roughly analogous to that of one or more programs operating on problem data. The major difference here is that unlike a program, each unit of knowledge, called an SLT rule in the preferred embodiment, is represented as hierarchical set of equivalent programs at multiple levels of both data and process abstraction. Each such program produces equivalent results, but the inputs, outputs and the operation defined on them are specified in varying degrees of detail. In effect, knowledge in SLT is represented as one or more SLT rules, each including a procedure represented at multiple levels of abstraction as an executable Abstract Syntax Tree (AST). SLT rules operate on AST-based data structures, wherein some SLT rules, referred to as higher order SLT rules, may operate on other SLT rules serving as data. SLT rules in the preferred embodiment are constructed and represented as Flexforms.

AST-based SLT rules have two essential advantages that distinguish them from both production systems and from relational networks: Like production systems, SLT rules are fully operational; they produce observable behavior. Like networks, SLT rules directly reflect structural characteristics of the knowledge they represent. Attributes assigned to nodes in said ASTs (sometimes referred to as "semantic attributes") include text, sound and/or other media (e.g., Flash files). These attributes serve as supplemental information used to construct diagnostic questions, instruction, along with positive and corrective feedback.

Attributes assigned to nodes in the procedures of SLT rules also make it possible to define the learner model, indicating what individual learners do and do not know both initially and at any subsequent point in time.

In the preferred embodiment, both SLT rules, including AST procedural hierarchies and AST data structures on which they operate, and problem data itself, are represented hierarchically using AuthorIT's Flexforms. That is, procedures and the data structures in SLT rules as well as the problem data on which they operate are represented as hierarchical Flexforms.

2. Display properties assigned to nodes in problem ASTs define how information is to be represented in an observable interface to learners, how to receive responses from learners and how learner responses are to be evaluated relative to outputs generated by SLT rules. Display attributes also may be assigned to nodes in knowledge ASTs, which in turn may serve as data for other SLT rules (referred to as higher order SLT rules in the preferred embodiment). Problem structures, their layout on an observable interface, and attributes associated with nodes in problems are laid out and assigned in the preferred embodiment in AuthorIT's Blackboard Editor.

3. In the preferred embodiment, a wide variety of diagnostic and tutoring options may be used to define and/or provide constraints on tutor-learner interactions. AuthorIT's Options Tool is used in the preferred embodiment to define various kinds of automated tutor control of the learning environment. These options include basic delivery modes, including adaptive, diagnostic, instructional, simulation and practice or testing modes and wide variety of variations on each mode, including learner control. Each of these modes can be further customized to provide a high degree of control over TutorIT's learning environment, such as the strategies used in selecting nodes for testing and or instruction, giving students more latitude in responding and/or refining TutorIT's decision making to further adjust step size for faster and slower learners.

4. TutorIT serves as a general purpose delivery system in the preferred embodiment. The above information, including the knowledge to be acquired, the way information is to be displayed and otherwise conveyed in interacting with learners, and options defining how knowledge is to be delivered to students (i.e., how TutorIT is to interact with students), is provided in the preferred embodiment as input to TutorIT. TutorIT takes this information, including one or more AST representations of problems to be solved, the knowledge to be acquired, the problem layouts and sets of allowed delivery options, as input and makes all learning and tutoring decisions (e.g., sequencing, generation of specific problems) automatically based solely on the learner model and structural characteristics of ASTs. TutorIT is capable of but is not restricted to making all such decisions automatically based entirely on the structure of the knowledge to be acquired, represented as SLT rules, without reference to the semantics of specific content (e.g., specific nodes in SLT rules). Various choices as to diagnosis, instruction, simulation and practice, including learner and/or automated tutor control, may be authorized within TutorIT itself, as well as in the Options Tools, and imported into TutorIT. TutorIT logic applies to all kinds of knowledge, declarative as well as procedural and domain specific as well as domain independent. TutorIT also supports different levels of learning, ranging from highly automated knowledge to the ability to use acquired knowledge to generate new SLT solution rules for solving new problems. The generation of new SLT solution rules in the preferred embodiment is determined in accordance with SLT's Universal Control Mechanism (UCM).

Although others skilled in the art will find alternative ways to utilize these methods, the preferred embodiment is in accordance with the inventor's Structural Learning Theory (e.g., Scandura, 2001a), Structural (Cognitive Task) Analysis (e.g., Scandura, 2003), U.S. Pat. No. 6,275,976 (Scandura, 2001a) and Scandura's AutoBuilder and TutorIT software (2005, 2007, 2009).

DETAILED DESCRIPTION OF THE INVENTION

Part 1

1. Theoretical Advances: Well-Defined Knowledge

As above, there have been three fundamental advances in SLT in recent years. First is in the way knowledge is represented. SLT rules were originally represented as directed graphs (Flowcharts). They are now represented in terms of Abstract Syntax Trees (ASTs). Second is formalization of a key step in Structural (domain) Analysis (SA), enabling the systematic identification of higher order SLT rules that must be learned for success in ill-defined domains. Third is the complete separation of SLT's control mechanism from higher order knowledge. These advances distinguish knowledge representation in SLT from all others, and have fundamental implications for building adaptive tutoring systems.

In this section we consider the first advance: SLT rules have long been used to represent to-be-acquired knowledge in well-defined domains. While retaining the advantages of directed graphs, representing SLT rules in terms of Abstract Syntax Trees (ASTs) offers a number of critically important benefits.

Not only do they offer a way to assess individual knowledge (as did directed graphs), but AST-based SLT rules also provide a perfectly general way to automatically both generate test problems and the solutions to those test problems. As we shall see, they also make it possible to simultaneously represent knowledge at any number of levels of analysis.

Precision.—The major reason adaptive tutoring systems have been so difficult and expensive to develop is that pedagogical decision making has been so time consuming and expensive. This is equally true whether tutoring systems are based on traditional CBI (cf. Paquette, 2007) or ITS (cf. Mitrovic & Ohlsson, 2007).

In CBI the focus is on what must be learned. Better CBI systems invariably are based on some combination of hierarchical and/or relational analysis. Hierarchical representations have an important advantage: Hierarchies inherently arrange content in the order in which content must be learned. Content higher in a hierarchy necessarily incorporates lower order content, a fact that has direct and important implications for both testing and teaching.

The problem is twofold:
(1) not everything can be represented hierarchically using current decomposition methods (Scandura, 2007) and
(2) informal hierarchical representation is not sufficiently precise to automate decision making without direct attention to the meaning of the content.

There is no need to repeat here what has already been published. On the other hand, attention must be called to one key idea, an idea that makes it possible to develop adaptive tutoring systems that can both: a) be developed at lower cost and b) guarantee learning.

Specifically, Structural (domain) Analysis (e.g., Scandura, 2007) makes it possible not only to represent all behavior hierarchically, but to do so precisely that inherent relationships are exposed.

It is well know known that many ideas can be refined into components or categories. Components and categories are fundamental: Component refinements involve breaking sets into to their elements. Category refinements involve breaking sets into subsets. For example, the set of animals can be refined into elements—individual animals in the set. The set of animals also can be refined into categories: dogs, cats, whales, etc.

Consider column subtraction: We begin with a subtraction problem. Subtraction problems typically are refined first into elements, the columns that make up a subtraction problem. (Because the number of columns in a subtraction problem may vary, I have called this variation a "prototype" refinement, wherein each prototype, or column, has the same structure.) Columns, in turn, may be refined into categories, columns where the top number is greater than or equal to the bottom number and columns where the top number is less than the bottom number.

The same idea applies generally: Consider a "house". Houses consist of sets of rooms, room elements. Rooms in turn can be categorized by their size, or their use, or by any number of other distinctions.

As detailed below, component and category refinements have direct counterparts in corresponding solution procedures. Again, consider column subtraction. Here, the initial procedural refinement is a Repeat-Until loop. Loops in procedures correspond precisely to Prototype refinements in data: Compute the answer to each column in turn until there are no more columns. The next procedural refinement is an IF . . . THEN selection. Selection refinements in procedures correspond to Category refinements in data. In subtraction, different processes are required when the top number is greater than or equal to the bottom number and when this is not the case.

Unfortunately, component and category refinements are not sufficient. Other kinds of "refinements" involve (more general) relationships—for example, whether the top digit is greater than or equal to the bottom digit. Mating involves a relationship between two animals—male and female.

Simple relationships are fine when they are immediately understandable and unambiguous. In many cases, however, they are not. None of us, for example, would any problem writing the numeral "5". Ask most four or five year olds, however, and the story is likely to be very different. Writing the numeral "5" requires a precise set of constructions involving straight and curved line segments.

Relational models can easily represent the relationships between such line segments. Indeed, everything can be represented in terms of relationships. The problem is twofold. The number of relationships increases rapidly as domains become increasingly complex. In complex domains, relationships on relationships can extend geometrically without bound.

Relational representations suffer from an additional problem (beyond the sheer number of relationships). Whereas component and category refinements may be repeated indefinitely, this is not possible with (non-unary) relationships. Every relationship (relational refinement) must be considered anew. There is no systematic way to represent given (non-unary) relationships in terms of simpler elements.

Knowledge representation using ASTs solves this problem. There is a fundamental mathematical equivalence between relations and functions. Each and every relationship can be represented by at least one function, or procedure, having its own inputs and outputs. For example, relationships between straight and curved line segments comprising the numeral "5" can be viewed as a procedure operating on such segments. These procedures in turn can be refined as the originals.

Why is this important? Consider the following. If we subject Column Subtraction to Structural Analysis, we are going to end up with terminal elements requiring such things as the child's ability to write the numeral "5" (and "0", "1", "2", . . . ). No matter what is being learned there will always be things that learners must know on entry. Young children, for example, learn early on to do such things as write the numeral "5". What is being learned here is not a relationship. Rather, it is an SLT rule that takes line segments as input and generates the numeral "5".

Prerequisite SLT rules, in turn, can be refined as any other. The refinement process can be repeated indefinitely. No matter how complex the subject matter, or how naïve the target population, it is always possible to represent the knowledge necessary for success in hierarchical form. The introduction of what I have called "dynamic" refinements, along with component and category refinements, closes the loop. It is now possible to represent what needs to be learned in any domain in whatever detail may be necessary (and desirable).

NOTE 1: It is worth noting incidentally that representing relationships as functions is equivalent in software engineering to introducing the notion of a "callback". Just as one may introduce functions operating on parameters in a dialog box, one can introduce functions generating outputs from inputs in a relationship.

NOTE 2: It might appear that arbitrary refinement may be as, if not more demanding than knowledge engineering in ITS. Identifying possible (correct and/or error) productions, however, not to mention learning mechanisms, can be very challenging and open ended. On the other hand, the process of Structural Analysis (SA, is highly systematic with a definitive end point. In addition to learning how to perform SA using AuthorIT's AutoBuilder component (see below), the main requirements for an author are the ability to perform the skill in question and reasonable insight into what must be learned for success. Working under my direction a single programmer familiar with AuthorIT and TutorIT has been making TutorIT tutorials ready for field testing at a rate of at least one per month. Only a small portion of this time has involved representing to-be-acquired knowledge. Most has been devoted to laying out interfaces and associated media.

For those not mathematically inclined, all this may seem like a technical truism with little practical significance. In fact, however, this technical truism has fundamental practical significance. AST hierarchies provide a perfectly general way to define pedagogical decisions. All pedagogical decisions in SLT can be based entirely on the structure of to-be-learned SLT rules. This can all be done independently of content semantics.

Indefinite refinement makes it possible to define what needs to be learned with whatever precision may be necessary to make contact with knowledge available to any population of learners, no matter how naïve they might be initially.

Full hierarchical representation makes it possible to quickly determine the status of any individual's knowledge at each point in time (relative to a SLT rule hierarchy), and to provide the instruction necessary to advance. Given full analysis, empirical research (e.g., Scandura, 1970, 1971, 1973, 1974a, 1977' Dumin & Scandura, 1973) demonstrates that testing on a single test item is sufficient to determine whether a learner has mastered any given sub tree in an SLT rule.

It is not always feasible, however, nor necessary to undertake complete analysis. Nonetheless, even incomplete hierarchical analysis is better than none. Incomplete hierarchies provide a beginning—a starting point that can be improved incrementally as time, resources and the importance of any particular tutoring system demands.

NOTE: Curriculum standards specifying prerequisites, concepts to be learned and the order in which they should be acquired may serve as a starting point. Generally speaking, however, our experience is that they do not normally go nearly far enough in identifying what must be learned for success.

It is always possible to build effective tutoring systems by introducing a safety factor (Scandura, 2005)—as engineers do in designing a bridge. Instead of requiring a single success corresponding to any terminal node (in an SLT rule hierarchy) one can require any number of successes. This makes it possible in principle to guarantee learning.

Efficiency of Development.—A major limitation of adaptive tutoring systems is that they have been hard to build. Identifying knowledge is only one part of the process. Defining (and implementing) pedagogical decisions in traditional ITS—what to test or teach and when—is the most expensive, time consuming and error prone tasks required (Mitrovic & Ohlsson, 2007; Koedinger & Ohlsson, 2009). This perhaps is the primary reason so few truly adaptive tutoring systems exist despite many years of university and federal support.

By way of contrast, the present disclosure shows how TutorIT makes all pedagogical decisions automatically—based entirely on the hierarchical structure of SLT rules representing what is to be learned.

Hierarchical representation has a further not inconsequential benefit. It is easy to define any number of pedagogical theories as to how best to promote learning. Specifically, we have revealed herein how TutorIT can easily be configured to deliver instruction in accordance with a variety of pedagogical philosophies. In all cases, TutorIT effectively eliminates the need to program pedagogical decisions (Scandura 2005, 2007, 2009). Cost savings have been estimated at between 40 and 60% (cf. Foshay & Preese, 2005, 2006; Scandura, 2006a, b). In short, guaranteed results at lower cost—a combination that should be hard to resist.

TutorIT: Guaranteed Learning and Lower Cost

AuthorIT authoring and TutorIT delivery systems currently support the development and delivery of well defined knowledge (Scandura, 2005). We reveal herein, however, how both may be generalized so as to realize the full potential of SLT. See FIG. 31 for a general overview of how the authoring process using AuthorIT and how TutorIT interacts with learners during delivery using a representation of the content to be learned as a reference point.

A. Given a well defined problem domain, AuthorIT includes the following:
 1. AutoBuilder, a tool for systematically representing knowledge as an SLT rule, including both the procedural Abstract Syntax Tree (AST) and the AST data structure on which it operates. Procedural ASTs in AutoBuilder are visually represented as Flexforms (below). Each node in a Flexform represents a specific part of the to-be-acquired knowledge.
 2. Blackboard Editor, a tool for creating and laying out schemas representing problems in the domain. Blackboard serves as the interface through which learners and TutorIT interact.
 3. AutoBuilder also is used to assign instruction, questions, positive feedback and corrective feedback to individual nodes in the Flexform. This information may include text, graphics, sound and/or other supporting media.
 4. Options, a dialog (tool) used to define how TutorIT is to interact with learners. Options include variations on delivery modes ranging from highly adaptive to diagnostic, to simulation to practice.

B. TutorIT takes the above produced with AuthorIT and interacts with learners as prescribed in the Options Tool. We reveal how TutorIT's adaptive mode works below. But, first we review the development process. FIGS. 24A and 24B, respectfully, show an entry screen and an initial TutorIT screen (asking a question) in the preferred embodiment.

Representing Well defined Knowledge.—TutorIT development begins by representing to be learned knowledge as an SLT rule. As required by SLT (Scandura, 2005), AutoBuilder makes it possible to represent knowledge with arbitrary degrees of precision.

FIG. 27 shows three successive levels of procedural refinement in Column Subtraction. This Flexform shows all levels refinement, from the highest levels of abstraction to the point where terminal nodes correspond to presumed prerequisites. In column subtraction these prerequisites include basic subtraction facts, ability to compare numbers as to size, etc. Students are tested on entry to ensure that they have mastered these prerequisites.

Each node in the Flexform represents to-be-acquired knowledge at a specific level of abstraction. For example, A. "Borrow_and_subtract_the_current_column" (to the right of the first "ELSE" in FIG. 1 represents the knowledge necessary for computing the difference in any column when the top digit is less than the bottom digit.

B. Subordinate nodes like "Borrow_from_next_column" provide increasingly more specific information.

Parameters of these operations representing data on which these operations act also are arranged hierarchically. Operation A, for example, operates on "Prob" and "CurrentColumn". "Prob" represents an entire subtraction problem. "CurrentColumn" represents columns in such problems. Operation B also includes "Reduced Top" "Slashtop", "CurrentBorrowColumn" and "BorrowedDigit".

In this context, AuthorIT's AutoBuilder component imposes consistency requirements on successive refinements. These requirements are designed to ensure that the behavior of children in each refinement is equivalent to the behavior of the parent. Operation A, for example, operates on each current column without a computed difference and generates the current column with the correct difference. The nodes immediately below Operation A provide more detail as to the intermediate steps and decisions. Otherwise, however, they produce the same result. The behavior is equivalent.

In general, higher level nodes may operate on more highly structured parameters. For example, CurrentColumn represents entire columns, including the column itself and the top, bottom, difference and borrow digits in that column. Corresponding lower level child nodes operate on simpler parameters, like BorrowedDigit. The behavior of higher and lower level operations (i.e., nodes), however, is expected to be equivalent (to produce equivalent results). The process of refinement is detailed in PART 2, as well as in Scandura (2005, 2007). Scandura (2003) and does not need to be repeated here. Essentially, constructing the AST data structure and the AST procedure in any given SLT rule involves:

a) defining the input-output behavior said SLT rule is to account for, wherein said behavior may be defined by selecting a name for each input and each output variable of said procedure, wherein said variables comprise the top level in said SLT rule's AST data structure, b) Selecting a name for the top-level operation in said SLT rule that generates said input-output behavior, wherein said operation comprises the top level in said SLT rule's procedure AST, c) Refining an input variable in said AST data structure into one of a component refinement and a category refinement and a dynamic refinement and a terminal refinement, wherein said terminal refinement has no child nodes, d) Refining a operation in the procedural AST of said SLT rule into one of a sequence refinement, a parallel refinement, a selection refinement, a loop refinement and an interaction refinement, wherein each said procedural refinement consists of said operation and one or more child operations, e) When an input variable in said AST data structure is the parent in a component refinement, refining said operation acting on said input variable in said procedure AST into a one of a parallel refinement and a sequence refinement, f) When said component refinement has a variable number of child variables, wherein each said child variable has the same structure, said component refinement in the preferred embodiment is called a prototype refinement, g) When an input variable in said AST structure is the parent in a prototype refinement, refining said operation acting on said input variable in said procedure AST into a loop refinement, h) When an input variable in said AST structure is the parent in a category refinement, refining said operation in said procedure AST into one of a selection refinement and an abstract operation refinement, i) When an input variable in said AST structure is the parent in a dynamic refinement, wherein said input variable is operated on by a terminal operation in said SLT rule, refining said operation consists of creating a new SLT rule corresponding to said input variable, wherein said new SLT rule interacts with said operation by changing values of said operation's parameters and j) Repeating said steps c) through h) until all children in said AST data structure are terminal and all terminal operations in said procedure AST of said SLT rule are judged by said author to be sufficiently precise for instructional purposes.

Terminal nodes in a Flexform represent the most elementary levels of analysis. They correspond to the simplest operations and decisions that are assumed to be known in advance in order to master the knowledge represented by the Flexform. In the absence of further analysis, it is assumed that each terminal is either known in advance or can be learned directly via instruction on the given terminal. As with higher level nodes, these terminal nodes are shown in blue (the darker color) in the Flexform shown in FIG. 28.

Each of these terminal nodes must be made executable on a computer. Execution in the preferred embodiment is enabled by TutorIT's built in interpreter. Making knowledge Flexforms executable enables TutorIT to generate solutions to given problems. TutorIT, in turn, uses these solutions to evaluate learner responses. Nodes below the blue terminal nodes is used for this purpose, wherein terminals in green/implementation nodes in FIG. 28 shows two examples. The highlighted node requires a number of HLD statements, ultimately refined into terminals written in AutoBuilder/Softbuilder's High Level Design (HLD) language. The single green (lighter color) node above corresponding to the terminal THEN condition illustrates that many (blue, educationally relevant) nodes can easily be implemented in the Softbuilder's HLD language.

PART 2 illustrates how Flexforms can represent essentially any knowledge, ranging from the simplest facts and concepts (simple decisions) to arbitrarily complex procedures. Again, all Flexforms can be represented at multiple levels of abstraction, wherein higher levels in procedural ASTs operate on relatively complex data structures, representing higher levels of expertise, with operations at lower levels of a procedural hierarchy operating on simpler data structures and representing lesser levels of knowledge. In short, higher levels of abstraction represent relatively automated knowledge, Defining Problem.—Once the Flexform has been fully implemented (and tested using AuthorIT's build in Interpreter/Visual Debugger), the next major step is to define problems (sometimes called problem schemas because individual nodes in any given schema may take different values) that collectively exercise all nodes in the Flexform. For example, a subtraction problem with all top digits greater than or equal to the bottom ones will not exercise Flexform nodes involving regrouping (or borrowing).

Problem schemas (problems whose input values can easily be modified) are defined and laid out in AuthorIT's Blackboard Editor as shown in FIGS. 22 and 29. The left panel in AuthorIT's Blackboard Editor (BB) Editor is used to define individual problems. The center pane is used to layout the interface through which TutorIT and the learner are to interact. It also shows where instruction, questions, positive and corrective feedback are to appear (some appear in the same position, but not at the same time). The right panel is used to assign attributes to individual nodes (elements) in the problem. These attributes include Display types (e.g., Text, Flash, Animation, Sound, Picture, OLE), Response types (Edit Box, Click, Combo Box, Construction) and corresponding Evaluation types (Match_text, Within_region, Structure, Debug).

In most cases, the nodes in AST Data Structure in the corresponding SLT rule are identical to nodes in corresponding problems—with one exception. Prototype refinements serve as place holders for any number of refinements having the same structure. For example, the Ones, Tens and Hundreds columns in Column Subtraction all have the same structure—the structure defined by the prototype. When one constructs a specific problem (the data on which the SLT operates), the number of such structures will vary depending on the number of columns (maximum place value) in the problem. In short, specific problems will have the same form as the AST data structure from which they are derived, but they will not be identical.

TutorIT Options Tool.—The Tutor Options Tool, currently a dialog in AuthorIT, is used by authors to define/configure alternative learning modes. The first decision an author must make is to decide which of the basic TutorIT Delivery Modes to include: ADAPTIVE, INSTRUCTION, DIAGNOSTIC, SIMULATION or PRACTICE. The Options Tool in FIG. 30 is set to ADAPTIVE mode. Authors also can make DIAGNOSTIC, INSTRUCTION, SIMULATION, and PRACTICE modes available in TutorIT by selecting desired modes for TutorIT Delivery Mode in the dialog. ALLOW LEARNER CONTROL also is an option. In short, TutorIT makes it possible to compare different pedagogies on even terms.

FIG. 30 shows the TutorIT Options Tool used by authors in the preferred embodiment to define/configure alternative learning modes. Options are currently set to ADAPTIVE mode. Other choices allow for further customization. Among other things, an author can assign desired mastery levels, whether or not to provide feedback, certainty of mastery (requiring multiple successes on individual nodes), the expected initial status of learners on individual nodes, assumed innate abilities to more quickly master more advanced materials (e.g., don't require demonstrated mastery of prerequisites before providing instruction) and the order in which nodes are selected for testing or instruction.

TutorIT.—TutorIT receives the output of AuthorIT as input. The Flexform associated with a skill represents what is to be learned in an arbitrarily precise manner. The Flexform design (in blue) also includes HLD code (in green) which is interpretable by TutorIT. The design Flexform acts like a structured database, including all information needed by TutorIT to provide a wide variety of delivery modes. In addition to to-be-learned operations and decisions, Flexforms include: a) a modular executable implementation of each terminal (FIG. 28), b) questions, instruction, feedback and corrective feedback associated with specific nodes in the Flexform (FIG. 21A),c) problem schemas (which serve as input to the Flexform) problem schemas laying out the kinds of problems to solved (FIG. 22), and d) TutorIT options specifying how TutorIT is to make its decisions (FIG. 23).

TutorIT selects problems one by one as specified. It executes the received Flexform (which is executable on a computer) on that problem. It generates a problem by executing, normally but not necessarily in a top-down manner, up to the selected node. This generates the input to the problem as well as problem nodes that are not yet determined. The latter become outputs or goal nodes. This is the information presented on the screen to the student.

Execution continues through the sub-tree defined by the selected node. This execution thereby generates the solution to the subproblem defined by the selected node. The generated sub-problem is displayed on TutorIT's Blackboard as specified by the values and attributes assigned to nodes in the problem in the Blackboard Editor during authoring. In FIGS. 24A, 25A and 25 B, for example the "problem" is presented as a Question. In 25B it is presented as instruction, in this case accompanied by a supporting Flash file.

The way TutorIT operates depends in any one application or instance depends on how it is configured in the Options Tool. I concentrate here primarily on Adaptive mode. Other options, such as Diagnostic and Instruction, are special cases or restrictions. TutorIT in Adaptive mode automatically selects nodes that quickly pinpoint what a learner does and does not know at each stage of learning.

Learner Model.—TutorIT takes the above Flexform files as input and first creates a Learner Model representing what the learner initially knows or is assumed to know about the to-be-learned Skill. Normally, the Learner Model shown on the left of FIGS. 25A/B and 26A/B is not shown to the student (see FIG. 24B). To see it the user must explicitly choose one of the pull down options. The Learner Model plays a fundamental role in TutorIT's decision making. TutorIT marks each leaf in the Learner Model treeview, which corresponds node by node with (blue or actionable) nodes in the corresponding Flexform, with a "+", "−" or "?". Anyone skilled in the art will recognize that other statuses, such as automated behavior, indicating higher levels of mastery, may also be introduced.

The left side in FIGS. 25A/B & 26A/B shows the Blackboard interface through which TutorIT interacts with the learner. The Learner Model showing the precise status of the student is shown on the right side of each figure.

TutorIT Operation.—Although anyone skilled in the art may come up alternative modes of operation, TutorIT takes the above information as input, and operates as follows. All decisions can be made based entirely on the structure of the content to be learned, independently of content semantics.

1. TutorIT selects a problem.
2. TutorIT then selects a (blue) node in the Flexform (or Learner Model). Only nodes that are exercised by the selected problem are eligible for selection. Selections otherwise are made according to priorities set in TutorIT's Options Tool (FIG. 5).
3. TutorIT executes the Flexform using its built in interpreter. The subtree defined by the selected node (in the Flexform) automatically generates a sub-problem of the problem schema and also its solution.
   (NOTE: As below, we want TutorIT also to support the case where TutorIT must generate (new) solution Flexforms from higher and lower order SLT rules. SLT's UCM will play a central role in this context. Currently, TutorIT only supports chaining two or more SLT rules as in current expert systems.).
4. TutorIT displays the sub-problem on TutorIT's blackboard (see the left side of FIG. 6).
5. If a node is marked "−", TutorIT provides instruction. If marked "?", TutorIT presents a question to determine its status. TutorIT skips nodes marked "+" unless the node is an automation node. Automation nodes require a faster response (higher level of expertise).

NOTE: These questions and instructions, as well as positive and corrective feedback, may consist of simple text, voice and/or media consisting of Flash, audio-visual or other files.

6. TutorIT compares the learner's response with the correct answer, which is automatically generated by TutorIT.
   a. If the status was "?" and the learner gets the correct answer, positive feedback is given and the node is marked correct (assigned a "+"). If incorrect, TutorIT provides corrective feedback and the node is marked with a minus ("−").
   b. If the status was "−", instruction is given and the node is marked "?". After instruction, it is impossible for TutorIT to know for sure that the learner has actually learned what was taught.
      NOTE: The learner must meet timing requirements if the node is an automation node requiring a higher level of skill.
7. In addition to determining the learner's status on individual nodes, TutorIT also infers what the leaner knows with respect to nodes dependent on the current one:
   a. If the learner gives an incorrect response, TutorIT reliably assumes that any (higher level) node dependent on it also should be marked unknown. TutorIT marks such nodes accordingly.
   b. Conversely, if the learner gives the correct response, TutorIT reasonably assumes that the learner also knows those lower level nodes on which it depends. In short, TutorIT not only compares learner responses on sub-problems corresponding to individual nodes but also quickly infers what the learner knows about nodes dependent on it.

TutorIT can be configured with various "safety factors" to ensure learning. For example, one can set the Options Tool to require learners to demonstrate mastery on every node, not just once but any specified number of times (see "Learning (No. successes/node"). After learning, TutorIT can be set to require any specified level of success on practice problems.

TutorIT tutorials have been developed for Column Addition, Column Subtraction, Column Multiplication and Long and Short Division along with five levels for each of the Basic Facts: Addition, Subtraction, Multiplication and Division. Packages for Fractions, Signed Numbers and Complex Expressions are also available and others are in progress.

In each case, TutorIT takes problem schemas as laid out in the Blackboard Editor as input. It automatically generates problems, actually sub-problems, as needed for diagnosis and remediation. Nodes are selected so as to enable TutorIT to quickly, pinpoint what each individual does and does not know at each point in time, and to provide precisely the information (instruction) needed when needed to progress in optimal fashion.

All this is done dynamically during the course of instruction as might a human tutor. The main difference is that TutorIT does this in a highly disciplined manner. All decision making is done automatically based entirely on the structure of the to-be-acquired knowledge. Semantic independence dramatically reduces the effort required to create adaptive tutoring systems.

The hierarchical representation of knowledge (in Flexforms) has important implications for both efficiency and effectiveness. As above, TutorIT makes direct inferences not only with respect to individual nodes but to dependent nodes as well. For example, if a student gets a problem associated with one node correct, then TutorIT can reliably assume that the student also knows all of the lower level nodes on which it depends. For example, if a child can subtract columns involving borrowing or regrouping, one can reasonably assume that the child can also subtract successfully when there is no regrouping. On the other hand, if a child cannot subtract a column that does not involve regrouping, one can be quite certain, he or she cannot subtract when regrouping is required. In short, success on a node implies success on all subordinate nodes. Failure implies failure on all superordinate nodes. The result is very efficient diagnosis and instruction.

Unlike most teachers, TutorIT can be unusually effective because it benefits from careful pre-analysis. We have put a considerably amount of effort into our TutorIT Math skill tutorials—far more than what goes into writing a text book for example. The level of analysis in our current prototypes can and will be further improved as a result of field testing. Even in their current state, however, TutorIT Math skill tutors benefit from considerably more analysis than most teachers are capable. And, this analysis can further be improved incrementally.

On the other hand, a good human tutor generally may be more attuned to incidental factors, such as motivational. We expect TutorIT tutorials to get better and better over time as a result of feedback. Nonetheless, they are designed for specific purposes and may never achieve the flexibility of a good human tutor who has spent years both learning math and how to motivate children to learn in a wide variety of real world situations. In short, there likely will always be some things that a good human tutor may do better than TutorIT—as well as the converse. Having said this, the choice is not one of either or. Rather it is a question of how best to use both to maximize learning.

Importance of Prerequisites.—One might argue that just because a student solves one subproblem (associated with a given node) does not necessarily imply that he or she can do this with all such subproblems. Indeed, this is correct. As pointed out earlier (Scandura, 2005) a single test will only be sufficient in TutorIT when analysis is complete—when all terminal nodes are "atomic". Success on one instance in this case implies success on all instances of the same type with unusually high degrees of reliability (cf. Scandura, 1971a, 1973, 1977). Having said this, just as a good bridge designer builds in a safety factor, an author can easily do the same with TutorIT. TutorIT can be required to demand a higher level of performance by simply changing a setting in the Options Tool to require any number of successes on each node (before mastery is assumed).

Criteria may be set so as to actually guarantee learning to any given level of proficiency. Any learner who enters with pre-specified prerequisites, and who completes a given TutorIT tutorial will be definition have mastered the skill in question. There is no other way a student can complete a TutorIT tutorial. He or she must meet pre-specified criteria set by the author or TutorIT tutoring will continue until they are met.

Notice that prerequisites play an essential role in the process. Prerequisites correspond precisely to atomic or terminal nodes in Flexform knowledge representations. Some prerequisites are so simple that they can safely be assumed on entry. For example, the ability to read and write numerals. Entry with respect to other prerequisites, however, may be less certain. Any child presumed to be ready for long division would almost certainly have to know the multiplication tables and how to subtract. Similarly, no would want to teach column subtraction unless a child already knew how to count.

The basic question in this context is how one makes contact with learner's who have not mastered such prerequisites? For example, how to teach column subtraction to a child who cannot write or recognize numerals (e.g., "5", "3"). SLT support for indefinite refinement offers a unique solution to this problem. One is not forced to introduce non-decomposable relationships. Instead, each such prerequisite can be represented as an equivalent SLT rule with its own domain and range. As above, for example, the numeral "5" can be viewed as an SLT rule for constructing the numeral from more basic line segments. Most important, SLT rules representing prerequisites can be refined further just as any other.

One further point. This argument can be turned on its head. The difficulty of any task, or to be learned skill depends not on just the skill itself. Rather, it depends on the nature of the prerequisites that may be assumed available. For example, using sophisticated calculators enables learners to solve more complex problems than they might otherwise because use of a calculator makes more complex computations feasible (e.g., TI's Nspire family). Clearly, if one has a calculator, computational issues take a back seat. It is far easier to learn to evaluate arithmetic computations with a calculator than without.

NOTE: Along with most mathematics educators I would argue nonetheless that computational abilities are essential irrespective of the presence or absence of a calculator.

On the one hand mastering Nspire can be can subjected to the same kind of analysis we are talking about here. And, TutorIT could equally well be used to provide the necessary instruction. On the other side of the coin, one can start with the assumption that learners can already use of such tools as Nspire—as prerequisites on entry. In this context, to-be-analyzed problem domains will be very different.

Instead of computational skills, the focus is more likely to be on problem analysis. Given a description of a situation, for example, how can it be formulated in terms of mathematical expressions? Having created such an expression, one can plug in the numbers and click to get the solution. In a similar manner, the more comprehensive the skills one can assume the more sophisticated the knowledge one can teach. The general truism to be taken from this analysis is not whether basic skills are important but rather that the more basic skills one has mastered, the more one has to build one. This is true whether in mathematics or in any other subject.

NOTE: Representing reality in terms of mathematical expressions is one of six basic process abilities in mathematics. These were first introduced in Chapter 1 of my book on Mathematics: Concrete Behavioral Foundations (Scandura, 1971b, pp. 3-64). The six abilities were organized as three bidirectional pairs: Detecting regularities and its opposite of constructing examples of regularities, understanding mathematical representations (e.g., expressions) and its opposite of creating mathematical expressions and deduction and its opposite axiomatization.

Configuring TutorIT.—The ease with which TutorIT can be customized adds another important dimension. In addition to ADAPTIVE mode, the Options Tool also supports DIAGNOSTIC, INSTRUCTION, SIMULATION and PRACTICE modes. Authors may also allow Learner Control, in which case the learner may decide on which items to be questioned or to receive instruction. Other options may also be made available to learners, making it possible for example to further customize tutoring for faster or slower learners Each basic delivery mode comes with some mandatory settings. Other options enable authors to better control the way content is delivered.

At the most basic level, for example, a student might already have been exposed in varying degrees to the knowledge being taught. In this case, TutorIT cannot know what the learner knows on entry. In so far as TutorIT is concerned, the learner enters essentially as a blank slate. Conversely, if a student has had no exposure to the content, TutorIT might start with nodes marked "−" "−", or unknown. In this case, TutorIT will initially be biased toward instruction.

In this case, "Start all Nodes with the Learner Status" in AuthorIT's Options Tool (see FIG. 30) might be set to "?" or "−" depending on prior student exposure to the content. The author also has the choice of allowing teachers or students to make the choice for individual students or to require it for all.

In the undetermined state, TutorIT starts tutoring each child by marking each node in the Learner Model (see below) with a "?". This signifies that TutorIT does not (yet) know whether or not a learner has mastered the knowledge associated with that node. After the learner responds, TutorIT provides corrective or positive feedback as appropriate—and updates the Learner Model as above—"+" for success or "−" for failure.

Other options provide finer levels of control. For example, an author might require that instruction be given only when ALL prerequisite nodes have been mastered (marked "+"). Alternatively, the author might want to place more emphasis on self-discovery. Here, the author might choose the Ignore Prerequisites option for Tutor Strategy. In this case TutorIT will provide hints/scaffolding (i.e., instruction) even when the learner's status on lower level nodes is unknown.

More generally, the author has a wide variety of options making it possible to accommodate a wide variety of pedagogical biases—often called "instructional theories". Available options support a wide variety of instructional philosophies—ranging from highly directive instruction to open ended discovery including completely self directed learning.

Comparison and Benefits.—Like other ITS or CBI, TutorIT Math tutors are highly reliable. They never tire. They never make mistakes—excepting bugs one may have missed. Unlike other CBI (or ITS), however, TutorIT Math tutors are designed so that any learner who enters with pre-specified prerequisites and who completes a given tutorial will necessarily have mastered the skill in question.

Whether these results are realized with actual students depends on the following assumptions: a) that we have in fact identified an SLT rule for correctly performing a ranges of basic math skills with sufficient precision to have identified essential prerequisite skills (terminals in Flexform used to represent SLT rules), b) that learners demonstrate mastery of those prerequisites on entry and c) that students complete the TutorIT tutorial—the only way a student can do this is to have demonstrated mastery on the skill being taught to whatever criterion the author has prescribed (in the Options Tool).

In effect, what the student learns and whether or not a student who completes a tutorial actually learns the skill is not a question to be determined empirically. Rather, the proof will be in such things as how long it takes, whether students are sufficiently motivated to complete the tutorial, and generally what might be done to make the tutorial even better (e.g., more efficient and/or motivating for students, etc.). Given the way TutorIT tutorials are developed, improvement will occur incrementally as feedback suggests and as resources allow.

The AuthorIT/TutorIT system dramatically reduces development costs. As above, we have already developed a range of TutorIT tutorials at a fraction of the costs of ITS development. These tutorials focus on very specific identifiable skills. Guaranteed learning is restricted specifically to those skills. Nonetheless, TutorIT tutorials developed to date also include instruction pertaining to important incidental meaning. We refer here to the kinds of instruction commonly included in textbooks and classroom instruction.[7]

There is no guarantee having gone through a given TutorIT tutorial that students will necessarily also master this supplemental material—material that is normally included (but also not guaranteed) in classroom instruction. The question of whether and to what extent this supplemental instruction benefits students is an empirical one. Given TutorIT's focus on doing what it can do better and more efficiently than a human (or any other means of transmittal), this question also is of secondary importance. Current TutorIT tutorials are designed to support classroom instruction not to replace what a good teacher can (or should) do.[8]

How can that be—better results at lower cost? The answer lies in the very close relationship between knowledge representation, on the one hand, and diagnostic and remedial actions on the other. On the one hand, arbitrary refinement allows for indefinite precision. Tutoring can be guaranteed. Learners who enter with predetermined prerequisites and who complete a given TutorIT tutorial will by definition demonstrate mastery of defined skills.

The same structural relationships that make it possible to provide efficient, highly targeted adaptive instruction also eliminate the need to program pedagogical decisions. While estimates may be based on slightly different assumptions, the bottom line is that roughly half of all development costs can be eliminated (cf. Foshay & Preese, 2005, 2006; Scandura, 2006a,b). It is not necessary to independently program diagnostic and instructional logic as in developing other adaptive tutoring systems.

In comparison with other approaches, AuthorIT and TutorIT offer three major benefits:

a) Better results on well defined tasks than even human tutors due both to more complete analysis (than most humans are capable of) and to highly effective and efficient tutoring. The latter derives from TutorIT's optimized pedagogical decision making. More complete analysis and optimized decision make it possible under carefully prescribed conditions to actually guarantee learning. The way things are set up there is essentially no way a student can complete a TutorIT math tutorial without mastering the skill. The question is not learning as such but whether a student is motivated to complete a given tutorial, a very different question requiring a very different answer.

b) Greatly reduced development costs because all TutorIT decision making is predefined. All diagnosis and testing is automatic and based entirely on the structure of the to-be-learned knowledge. While we have not kept actual figures on development costs, they are by definition an order of magnitude less than that required in ITS development. TutorIT tutorials ready for field testing have been completed by myself with the assistance of approximately one full time person for a year. With an experienced team and further maturity of AuthorIT and TutorIT, development costs may be expected to go down gradually.

c) Furthermore, pedagogical decision making is fully configurable. TutorIT can easily be configured to provide adaptive tutoring customized for different learners both individually and by population. TutorIT also can be configured to provide highly adaptive diagnosis, to provide practice or to serve as a performance aid. Configuration consists entirely of making selections in an Options dialog—all without any programming or change in the knowledge representation.

NOTE: The notion of (content) domain independent instructional systems is not entirely new. It is not difficult, for example, to construct CBI systems that support specific categories of learning, such as those defined by Gagne (1985). The closest analog is probably Xaida (e.g., see Dijkstra, Schott, Seel & Tennyson, 1997). TutorIT takes a major step forward in this regard by providing tutoring support for ANY well defined content. This not only includes all Gagne's categories of learning, for example, but any combination thereof.

The bottom line is that TutorIT is another significant step forward in automation. TutorIT provides another case where computers can do things better than a human—this time in adaptive tutoring. As more and more tutorials are developed TutorIT can gradually taking over tasks previously done by humans—not just in math skills but ultimately with any well defined skill. TutorIT tutorials will gradually take over for one reason: Not because they are approaching what humans can do but because they can do some jobs better than humans.

TutorIT, of course, will not eliminate the need for good teachers any more that good computational tools have eliminated the need for people who use them. TutorIT tutorials will enable teachers to concentrate on things they can do better. TutorIT automation will be an on-going and continuing process.

4. Critical Advances in Current SLT Theory

Analyzing Complex Domains.—It might seem we are done! Given any domain, we can always use AuthorIT's AutoBuilder component to systematically identify what needs to be learned for success—with whatever degree of precision may be necessary or desired. The rest follows automatically. TutorIT takes the representation produced (including display layouts and associated media) as input and automatically delivers instruction as prescribed.

While theoretically possible, identifying what must be learned as an SLT rule is not necessarily easy. It can be very difficult, practically impossible to identify a single, integrated SLT rule that represents the knowledge needed to master complex domains. This is not simply having to compromise as regards completeness.

It would be impractical if not impossible to directly identify what must be learned to prove all known theorems in mathematics, or to specify how to write a beautiful poem (given some topic or idea). As those engaged in ITS development know, identifying what needs to be learned in high school algebra already poses a difficult task (Ritter, 2005).

By way of contrast, high level relational models are relatively easy to create (cf., Scandura, 1973; Hoz, 2008). Relational models, however, lack precision—and complexity increases rapidly. Both constraints place significant limits on effective tutoring. Equally important, pedagogical decisions based on relational models can be very difficult. Pedagogical decision making depends inextricably on content semantics, thereby increasing both development and evaluation costs.

In SLT, it might appear that one can avoid this problem by simply introducing a finite set of SLT rules. For example,

---

[7] It is not that one could not target meaning as such. It is simply that doing so would require further analysis. For example, TutorIT Column Subtraction is based on a detailed analysis of what must be learned to perform column subtraction—with learning guaranteed when a student completes the tutorial. This tutorial also includes instruction describing and graphically illustrating a concrete model of what is being done step by step (e.g., when one borrows during subtraction). The difference is that we have not undertaken a systematic analysis of what would need to be learned to ensure that a student is able to demonstrate the meaning associated with any given problem, or the reverse to construct a physical model corresponding to any given subtraction problem. We could! We just haven't, nor has any text book we know of as well. "Dienes blocks" developed in the 1960s by an old colleague of mine were designed precisely for this purpose.

[8] While TutorIT Math is not sufficiently complete to cover all that is in a typical textbook. Other than background reading and the like, it is an open question as to whether there are specific skills in a math textbook that could not be done as well (or better) in TutorIT.

instead of one SLT rule as above, why not simply add new SLT rules? Certainly, one can do this. Doing so, however, does not solve the fundamental problem. Given any nontrivial domain, it is impossible to directly identity everything a learner should know. This fact has been a central tenet in SLT from its inceptions (cf. Scandura, 1971a). It was the primary motivation for introducing higher order rules.

ITS systems approach this problem from a very different perspective. Beginning with Newell & Simon's (1972) influential work on problem solving, the focus has been on identifying sets of productions corresponding to what might be in human brains. ITS knowledge engineers work with subject matter experts to identify condition-action pairs, or productions representing relevant knowledge. Productions collectively are expected to be sufficient for solving arbitrary problems in a given domain.

Identifying productions, however, is not sufficient in itself. Give a computer a problem and a set of productions, and what happens? Nothing! As Newell & Simon (1972) recognized early on some kind of control mechanism is necessary to activate the productions.

From a theoretical perspective the fewer mechanisms needed the better. With this in mind, Newell & Simon (1972) originally proposed "means-ends" analysis as a universal control mechanism: Given a problem, select (and apply) productions that will reduce the difference between the goal and the current problem state. Mean-ends analysis seemed reasonable and gradually morphed into chaining (of productions). Empirical results later suggested that other mechanisms also are commonly involved in learning and problem solving: Variations on generalization, abstraction, analogy and other mechanisms have been proposed.

A further limitation of learning mechanisms, as used in production systems, is that they impose essential constraints on implementation. One can add or remove individual productions without fundamentally changing the operation of an ITS. Learning mechanisms, however, necessarily come "hard wired". They cannot be added or removed without fundamentally effecting operation of a production system.

Ohlsson (2009) suggested no end to the number of learning mechanisms that might be needed or desired. The impracticability of identifying all potentially relevant mechanisms is one of the reasons that he and Mitrovic introduced Constraint Based Modeling as a means of reducing complexity in ITS development (e.g., Mitrovic & Ohlsson, 2007).

Quite independently, Polya's (1960) early analyses of mathematical problem solving further suggest that learning mechanisms are, in fact, domain dependent. Polya identified a number of domain specific "heuristics" like the pattern of "two-loci" or "similar figures". Such heuristics are formally equivalent to learning mechanisms, but are more similar in nature to higher order rules in SLT (cf. Ehrenpreis & Scandura, 1974; Wulfeck & Scandura, Chapter 14 in Scandura, 1977). Higher order SLT rules are domain dependent and play a direct role in how new SLT rules are acquired and used.

NOTE: While influential in mathematics education, Polya's (1960) work is not widely known in TICL circles.

SLT Solutions.—SLT takes this analysis further. Existing SLT theory offers a detailed road map going forward, a road map that builds directly on current AuthorIT and TutorIT technologies.

Consider the second or third major advances mentioned earlier:

(2) The ability to systematically identify the higher as well as lower order SLT rules required for success in any given domain, no matter how complex.

(3) The ability to formulate SLT's Universal Control Mechanism (UCM) in a way that is completely independent of the rules and higher order rules necessary for success in any given domain.

I summarize each of these advances and their importance below. Then, I describe how AuthorIT and TutorIT can be extended to support each advance.

Structural (cognitive domain) Analysis (SA) of Complex Domains.—SA takes a fundamentally different approach to the problem. The focus here is on identifying both the higher and lower order SLT rules that must be learned for success. Unlike productions (condition-action pairs), SLT rules are not assumed to be in human minds—nor are higher order rules viewed as hard wired mechanisms. Rather, higher as well as lower order SLT rules (like relational models) are both operationally defined in terms of observable behavior with respect to criterion tasks.

All SLT rules represent what must be learned for success. They provide an explicit basis for both diagnosis and remediation. Historically, Structural (cognitive domain) Analysis (SA) has been used to systematically identify higher as well as lower order SLT rules. As detailed above, the use of ASTs to replace directed graphs has played an important role enabling automation in the development and delivery of adaptive tutoring systems (cf. Scandura, 1971a, 1973, 1977 where SLT rules are represented as directed graphs or flowcharts and Scandura, 2005, 2007 where SLT rules are represented in terms of ASTs). The process by which higher order SLT rules were constructed, however, was largely subjective.

The way higher order SLT rules were constructed was fine for paper and pencil courseware development (e.g., a workbook by Scandura et al, 1971c) and for experimental research (e.g., 1974a). But it was not sufficiently systematic or precise for automation. As SA was originally defined, the analyst, typically but not necessarily a subject matter expert or instructional designer, was asked to:

a. define a complex problem domain informally.
b. select a finite set of prototypic problems in that domain.
c. construct an SLT solution rule for solving each prototype problem, construct a higher order SLT rule operating on other SLT rules for constructing each SLT solution rule. (Notice that the SLT solution rule is an output in the range of the higher order SLT rule).
d. eliminate redundant SLT rules (which can be derived by application of higher order rules to others).
e. repeat the process as desired, each time resulting in a set of SLT rules that were at once simpler and collectively more powerful in generating power.

SA was continued until the SLT rules and higher order rules identified provide sufficient coverage of the domain (cf. Scandura et al 1974 and Wulfeck & Scandura, 1977).

Analysis of various complex domains (e.g., Scandura et al, 1974, Scandura, 1977, Scandura & Scandura, 1980) shows that as SA proceeds two things happen: The individual rules become simpler but the generating power of the rule set as a whole goes up dramatically, thereby expanding coverage in original domain (esp. see Scandura, et al, 1977; Wulfeck & Scandura, 1977).

NOTE: There is no loss of generality because domains can be incrementally expanded without loss by building successively on prior analyses. For details, see Scandura (2007) for the most complete coverage of the basic theory.

Choosing the appropriate level of analysis in Step c was originally ad hoc. This difficulty was solved as above by the introduction of ASTs. Each individual SLT rule can now be refined successively in whatever degree of precision may be necessary or desirable.

Step d of constructing higher order rules, however, was still a bottle neck—still too subjective. The key to solution was the following missing link between steps c and d: Convert each SLT solution rule in Step c into a higher order problem.

Once a higher order problem has been constructed, higher order SLT rules can be constructed in exactly the same way as all other SLT rules.

Given any problem domain, no matter how complex, the goal of Structural Analysis is to identify a finite set of higher and lower order SLT rules—rules that collectively make it possible to solve a sufficiently broad range of problems in the domain. Unlike production systems, where the focus is on identifying ingredients that might be in human brains, the focus in Structural Analysis is on identifying what must be learned for success.

Consider the following example of SA applied to a Number Series domain (adapted from Example 3 in Scandura (2007). I have selected this example because it illustrates not only higher order SLT rules that generate new SLT solution rules but also how higher order selection rules come into play. (See Appendix A in Scandura, 2007, for other examples.).

dant rules (as in Step e above). Alternatively, deciding which SLT rule to use is essentially what one must do in many design problems. The acquisition of multiple ways of solving any given problem and of knowing which to select when is a key characteristic of expertise.[9]

[9] The above is a form of what is commonly referred to as knowledge engineering. The main difference is that Structural (domain) Analysis is far more systematic with partially automated tools to support the process.

In our example, the selection process represents a still higher order problem (so SA is repeated as in the original Step f). The given in the higher order problem consists of the three alternative rules. The goal is to select exactly 1. One higher order SLT selection rule that works can be summarized as:

Case Type-of-Number Series:
   a) Starts with 1 with a common difference of 2→select rule $N^2$
   b) Common difference 4 select rule $N(A+L)/2$
   c) Else→select successive addition A more general but error-prone selection rule is to simply choose the simplest rule. Domain of applicability was largely ignored in early research. Defining the domain structures

---

Number Series Domain -- consisting of sums of whole numbers from 1 up. (Step a above)
1. SME Selects Prototypic Problems (one of potentially many) (Step b above)
   $1 + 3 + 5$   --   ?sum
2. Construct (multiple) SLT Solution Rules (2A, 2B, 2C) for Prototypic Problem (each rule can be refined where desired as above) (Step c above, but wherein each solution rule may systematically be refined as in FIG. 1 above)
   2A   $1 + 3 + 5$   →3×3→          9
   2B   $1 + 3 + 5$   →3×(1+5)/2→   9
   2C   $1 + 3 + 5$   →successive addition→   9
3. Convert each SLT Rule into a Higher Order Problem (This is a critical new Step in identifying higher order SLT rules)
  (Construct Goal & Given of Higher Order Problem)
   Higher Order Problem 3A:
     $1 + 3 + 5$               →3×3→    9
     $1 + 3 + 5 + 7 + \ldots$   →n×n→   Sum
   Higher Order Problem 3B:
     $1 + 3 + 5$               →3(1+5)/2→   9
     $a + a + d + \ldots + L = a + (n-1)d$   →n(a+L)/2→   Sum
   Higher Order Problem 3C:
     $1 + 3 + 5$                  →1+3+5→         9
     $a_1 + a_2 + a_3 + \ldots + a_n$   →successive addition→   Sum
  Notice that the Given in each example is simply one input in a higher order AST Data Structure of a higher order SLT rule., the next step outlines the top level in the corresponding procedural AST in the corresponding SLT rule.
4. Alternative SLT Higher Order Rules for Solving Higher Order Problems 3A, 3B, 3C (Step d above)
   Higher Order Rule 3A:   →fireplace 3 terms by n→
   Higher Order Rule 3B:   →replace 1 by a, 5 by I, 3 terms by n→
   Higher Order Rule 3C:   →replace each term by a variable, three terms by n→

---

The process of SA can be repeated (indefinitely). Step e (above) makes it possible (optionally) to eliminate redundant SLT rules—e.g., rules like 4×4, 5×5, . . . , 50×50 can be derived by applying higher order rule 3A, for example, to 3×3. Higher order rules make it possible to derive any number of new SLT rules from basic rules.

Notice that each alternative higher order SLT rule has a different domain of applicability. Higher order rule 3A is very efficient but only works with arithmetic series beginning with 1 and having a common difference of 2—for example, 1+3+ 5+ . . . +99→50×50→2500. Rule 3B is reasonably efficient and works with all arithmetic series. Rule 3C is relatively inefficient (especially with long series) but works with all number series, arithmetic or otherwise.

(NOTE: For Early Empirical Research on the Subject See Scandura, Woodward & Lee 1967; Scandura 1967.)

In effect, three higher order rules are applicable rules in this example. At this stage of SA, an analyst may eliminate redun- associated with higher order SLT rules is essential. Automatically perceived structures play a decisive role in determining which rules to use under what circumstances.

THEORETICAL NOTE FOR THOSE INTERESTED IN TRAINING EXPERTISE: For those who have read my recent monograph (Scandura, 2007) I would like to add one general remark: In that monograph I introduced the notion of higher order SLT automation rules as the mechanism by which more efficient (automated) rules are derived from other rules. Irrespective of how they are learned I suspect that most expertise is gained via the gradual acquisition of efficient, increasingly specialized solution rules. Apparently effortless expert behavior results when previously learned, more efficient SLT rules are selected (via higher order selection rules) for use in more and more situations. In accordance with SLT's Universal Control Mechanism (UCM), these more efficient rules are selected by applying higher order (selection) rules as in all other behavior. The result is increasingly efficient, apparently automated behavior.

The Need for Learning (often called Control) Mechanisms.—All knowledge in SLT is strictly relative: What a person knows is defined by that person's behavior relative to what must be learned for success. This relativistic view of knowledge holds whether the knowledge in question is of a higher or lower order. Whereas lower order SLT rules correspond to productions in expert systems, higher order SLT rules correspond to learning mechanisms.

The question then is what controls the use of SLT rules? History makes it clear that neither means-ends analysis, chaining, nor any other expert system mechanism is sufficient. Furthermore, experience with Structural Analysis makes two things clear a) All mechanisms that have been proposed MAY play a role in problem solving and b) Variations on all such rules can systematically be derived via Structural Analysis.

Any automated system capable of solving problems must include some kind of control mechanism. The system must know what SLT rule to use and when. Goal Switching was first proposed for this purpose in an invited talk where I first introduced SLT at AERA in 1970 (published in Scandura, 1971a). Unlike chaining and the like, SLT's goal switching was originally modeled on a very easy to state but very hard to implement truism: Given a problem for which no solution is immediately available, the problem solver must necessarily first derive a procedure for solving the problem. Indeed, this truism was so general, and so commonsensical that it took considerable convincing to get supporting experimental research on UCM published in the traditionally very rigorous Journal of Experimental Psychology (Scandura, 1974a).

Goal Switching obviously differed from Newell & Simon's (1972) means-ends analysis. Indeed, Newell served as a reviewer and proposed rejecting several of my articles during this time period, including to one above in the Journal of Experimental Psychology (Scandura 1974a) and another in Artificial Intelligence (Scandura et al, 1974). Fortunately, my counter arguments and other reviews led to their eventual publication.

In fact, however, a major limitation of Goal Switching had nothing to do with validity or relevance. A series of formal experiments (Scandura, 1967), as well as more informal pilot research with subjects as young as 4 years old, demonstrated its (near) universal availability to all learners. The difficulty was in attempts to formally implement Goal Switching in a way that was completely independent of ANY higher order rule (cf. Wulfeck & Scandura, 1977). This was finally accomplished with formalization of SLT's Universal Control Mechanism (UCM) in the early 2000s (see Scandura, 2007, U.S. Pat. No. 6,275,976). Again, I won't repeat here what is already in print (see Scandura, 2007, for specifics).

In retrospect, one can see why expert systems run into trouble. One reason is that knowledge engineering turned out to be very hard, slow and expensive and that experts couldn't always articulate what they were doing. We have seen above how Structural Analysis, while it certainly does trivialize the problem, at least makes it more tractable. More directly relevant in the present context, the original hope was that there were only a small number of basic learning mechanisms—preferably one. Alas, "means-ends analysis" as originally proposed by Newell & Simon (1972) turned out not to be that mechanism.

SLT's Universal Control Mechanism (UCM), on the other hand, serves this role in unique fashion (Scandura, 2007; cf. Scandura, 1971a, 1973, 1974a,b). UCM is completely independent of SLT rules and higher order rules. More important, and unlike means-ends analysis, chaining and other mechanisms proposed in the expert system world, UCM serves as a common denominator completely independent of any particular problem domain.

An overview of UCM follows (for details see Scandura 2007.):

Check available rules to see which SLT rules have structures that match the given problem Unless exactly one SLT Rule matches, control goes to a deeper level looking for rules whose ranges contain structures that match the given problem (a recursive process)

Once exactly one SLT rule is found, that rule is applied & a new rule generated

Control reverts to the previous level & the process continues with checking at the previous level of embedding Eventually, the process halts because the problem is solved or processing capacity is exceeded (alternatively a predetermined recursion limit may be set in automated systems)

Measuring knowledge relative to behavior in one form or another is not new. However, being able to explain and predict the behavior of individuals in specific instances distinguishes SLT. This is true even more so where a problem solver does not already know a solution procedure—but must derive one. UCM plays an essential role in the latter process.

NOTE: A historical analogy to Relativity Theory is interesting in this regard. Without assigning more significance than warranted, introduction of UCM in SLT plays a role analogous to constancy of the speed of light in Relativity Theory.

Measuring speed of an object relative to an observer was not especially new or interesting. Add in the constant speed of light, however, and the situation changes. As Einstein showed in 1905 funny things happen when one accounts for the time light takes to reach an observer.

Knowledge is strictly relative in a similar sense. What counts as knowledge is not absolute but necessarily relative to observable behavior.

Behavior with respect to complex domains may be explained via finite sets of higher and lower order SLT rules. But, these SLT rules depend on analyst.

UCM is what holds things together. Together with the SLT rules and higher order rules associated with any given domain, UCM allows explicit predications regarding problem solving behavior in specific instances (Scandura, 1974a).

5. AuthorIT and TutorIT Extensions

To date, AuthorIT/TutorIT tutorials have only been used to develop tutorials for well-defined math skills. TutorIT does, however, support "chaining" although this technologies has not been put to serious use. The only example to date involves a simple railroad crossing, where TutorIT is fed two simple rules: a) one for turning a signal red or green depending on the location of a train (near or out of a crossing) and b) one for raising or lowering a railroad crossing gate depending on the color of the signal (red-down and green-up). TutorIT is not explicitly told that the gate must go down when the train approaches the crossing and up when it is not.

TutorIT is able to generate correct answers by chaining known rules, where the output of one serves as input to the next as required to generate the correct answer. The answers TutorIT generates are used in turn to evaluate learner responses. Chaining is a small step forward and akin to what is done in contemporary ITS systems.

As outlined above (and detailed in Scandura, 2007; Scandura et al, 2009), however, SLT goes much further. Two objectives are on the near term agenda.

1. In order to teach higher order SLT rules we must be able to systematically identify and precisely represent them. The behavioral equivalent of all other learning mechanisms that have been proposed or used in Intelligent Tutoring Systems (ITS). or expert systems generally, can be represented as higher order SLT rules.[10] These higher order SLT rules are derived directly via Structural (domain) Analysis (SA) from the problem domain itself.

[10] The same is true in case based reasoning (CBR), wherein higher order rules involve analogical thinking. From a SLT perspective, CBR involves higher order rules that map solutions (SLT rules) for one kind of task into solutions for analogous ones (e.g., mapping counting up in addition to counting down in subtraction, or repeated addition in multiplication to repeated subtraction in division).

2. In order for TutorIT to generate solutions to ill-defined problems, we must also be able to formalize and implement SLT's Universal Control Mechanism (UCM).

Both AuthorIT and TutorIT will both have to be extended. First, AuthorIT must support the construction of SLT rules that operate on nodes that are themselves SLT rules.

This can already be done using AuthorIT's SoftBuilder component. SoftBuilder is a fully general development system. It supports the construction of any kind of SLT rule. Any SLT rule, whether of a higher or lower order, can be represented as a Flexform. While sufficient in principle, however, it is extremely complex to construct higher order SLT rules. The basic task is hard enough. But, there is no automated support for refining higher order operations (or data) as is currently the case with AutoBuilder.

SA in SLT does provide the necessary rigor. The major work needed is to add support for what are called dynamic structural refinements and corresponding interaction procedural refinements (e.g., see Scandura, 2007, esp. pp. 195-198). As detailed on pages 194-216, Structural Analysis so extended would make it possible to construct arbitrary higher order SLT rules as needed.

The second major improvement requires replacing TutorIT's current chaining mechanism with SLT's Universal Control Mechanism (UCM). Fortunately, the chaining mechanism is a separable module so its replacement and integration should be straight forward. Furthermore, the UCM design has been detailed in a recent patent. The main challenge is to implement, test and refine as necessary to ensure that all work as designed ready for prime time.

The extended form of Structural Analysis (SA) or the UCM has been detailed in (Scandura, 2007, for SA—esp. pp. 216-231 and UCM—esp. 216-231), U.S. Pat. No. 6,275,976).

What is important here is to understand two major things that extension of AuthorIT and TutorIT will do:

1) AuthorIT's AutoBuilder component will fully support Structural (domain) Analysis (SA), enabling it to identify and detail higher as well as lower order SLT rules associated with any given domain.

2) TutorIT enhanced with UCM will be able to solve novel problems in domains, even where it is not explicitly given a SLT solution rule.

Given a complex domain, extension of AutoBuilder will more fully support Structural (domain) Analysis (SA). In addition to arbitrary refinement, AutoBuilder will be able to systematically identify finite but sufficient sets of higher as well as lower order SLT rules. Sufficiency means that collectively these SLT rules will provide what the analyst considers to be "adequate coverage" of the given domain. By "adequate coverage" I mean that the rules collectively provide sufficient coverage in the domain—that solutions can be generated for sufficient numbers and varieties of problems in the domain.

Armed with the UCM and a sufficient set of higher (and lower) order SLT rules associated with a problem domain, TutorIT will be able to dynamically derive new solution rules as needed. TutorIT will also be able to provide systematic tutoring on all requisite higher as well as lower order SLT rules.

Given any domain, TutorIT's ability to generate solutions will depend on adequacy of requisite Structural Analysis (SA). In this context, it should be emphasized that SA can be applied iteratively. An analyst may build on the results of SA without starting over. SA is a strictly cumulative. The SLT rules deemed sufficient at one point in time may systematically be superseded later on.

Although TutorIT's interface may have to be enhanced, tutoring on higher order SLT rules will take place exactly as any other SLT rule. Knowledge will still be represented hierarchically, and TutorIT decision making will follow the same rules. Critically important from an implementation perspective, theoretical parsimony is matched by the current AuthorIT and TutorIT technologies. It would be fool hardy to underestimate the effort required, but we do not envision major unknowns.

The extended form of TutorIT will select and present problems. The learner will respond, and TutorIT will see if it is correct and provide feedback. If a response is incorrect, TutorIT will provide diagnostic and remediation as detailed above on each of the rules required to solve the problem.

In effect, in addition to identifying SLT rules, an author will start with an ill-defined domain and use an extended from of AuthorIT to:

a) Select a finite set of well-defined problem domains in the ill-defined problem domain.
b) Construct a SLT rule for solving problems in each said well-defined domain as before.
c) For each said SLT rule, construct a new well defined problem domain in which said SLT rule is an output, wherein said new well defined problem domain in the preferred embodiment is referred to as a higher order problem domain.
d) For each said well defined higher order problem domain, use the same method used with other well defined problem domains to construct a new SLT rule for solving problems in said new well defined higher order problem domain, wherein said new constructed SLT rule is referred to as a higher order SLT rule.
e) When said author desires to reduce the number of SLT rules associated with said ill-defined problem domain, he can optionally eliminate SLT rules that can be generated by applying said higher order SLT rule to other SLT rules, wherein such generated SLT rules are effectively redundant.

These steps can be repeated as desired with the goal of identifying a set of SLT rules and higher order SLT rules that are collectively sufficient to generate solutions to a said sufficiently large subset of problems in said ill-defined problem domain.

On receiving such an ill-defined domain, any author skilled in the art will be able to construct new AST based problems in said ill-defined problem domain that cannot be solved by any one SLT rule of either lower or higher order operating individually. In many cases, however, these SLT rules and higher order SLT rules may be used collectively to construct an SLT rule for solving new AST based problem—specifically, by applying higher order SLT rules to other SLT rules.

In this context, TutorIT operates as follows:

a) It receives an ill-defined problem domain, a set of SLT rules and higher order SLT rules, each of which has been made executable on a computer, and a set of problems, including problems that cannot be solved by any one said SLT rule, of higher or lower order, attributes for displaying problems on said Blackboard and mastery criteria and delivery options which apply one of generally to all SLT rules or to individual said SLT rules.
b) It selects one of the problems it receives.
c) When selected problem is solvable by one SLT rule, whether of higher or lower order, it do exactly what it does precisely what it does with any well defined problem domain.
d) When said problem is not solvable by one said SLT rule, TutorIT uses SLT's Universal Control Mechanism (UCM) to generate a new SLT rule and apply the new rule to solve the otherwise not solvable problem.
e) TutorIT then displays the problem on the Blackboard and receive a response from the learner.
f) It evaluates the learner's response by comparing his or her response with the generated solution.
g) When said learner response is correct, TutorIT provides the learner with positive feedback or not as specified in the Options Tool by the author.
h) When the learner's response is incorrect, it provides tutoring a usual on each said SLT rule used in conjunction with SLT's UCM to generate the erroneous solution.

Again, all steps are repeated until the learner has demonstrated a specified level of mastery on each said SLT used in conjunction with SLT's UCM and on problems not solvable by any one said SLT rule.

It is important to notice also that SLT's UCM may be replaced with any control (often called learning) mechanism, such as chaining, used in a traditional expert system. The main difference in the latter case would be that the resulting system will be more fragile and subject to constraints typical in such systems.

Notice the efficiencies. Suppose the learner is given a complex problem. Instead of having to pinpoint inadequacies in this complex context, it will be sufficient to identify the individual SLT rules and higher order rules necessary for success. Once this has been done, one can treat each individual SLT as before. All SLT rules, higher as well as lower order, have precisely the same formal structure. Hence, diagnosis and remediation can be carried out in modular fashion.

Comparison with ITS.—Given their dominance, comparison with ITS may be helpful to understand the significance of what all this means. AuthorIT can be used to identify what must be learned for success with arbitrary degrees of precision. No longer does one have to worry about individual learner models as such. The author need be concerned only with identifying what higher and lower order SLT rules must be learned for success. This may be done with arbitrary degrees of precision, either initially or in cumulative fashion as experience and development resources dictate. More important perhaps, AuthorIT is not limited in the same way by the complexity of the domain being analyzed. The sheer complexity of some domains makes them inaccessible to traditional ITS methodology. Traditional ITS development requires coming up de novo with: a) a sufficient set of productions, b) assumptions as to what learning mechanisms to use and c) finally data supporting validity of the analysis.

Structural Analysis does not have the same limitations. What one identifies is whatever an expert in the field believes is necessary and sufficient for success in that domain. Certainly, experts may differ as to what they believe should or might be learned. That is not the point. There is nothing to constrain SA to a single point of view. Complications in supporting multiple perspectives include introducing higher order selection rules for deciding which of the alternative solution rules to use under what conditions. In short, anything that can be done with production systems can be done more simply and with TutorIT in conjunction with higher and lower order SLT rules.

Given a representation of what needs to be learned, whether of just lower order as at present or including higher order knowledge as proposed, TutorIT can quickly and easily construct individual learner models, and maintain them dynamically during the course of tutoring. Most important, an extended TutorIT would be able to address diagnosis and remediation on each SLT rule in strictly modular fashion. The result would be orders of magnitude reduction in (pedagogical) decision making complexity. This is simply not possible in a production systems environment.

As above, TutorIT will work even in the face of incomplete analysis. Even a small amount of analysis is better than little or none. Given its complexity, ITS research can only go so far.

None of this means that we should give up on fundamentals. Most TICL research today is limited to general models or frameworks. Some even come with fancy names. I believe we can do more, however, than introduce acronyms in our research.

We need to concentrate more heavily on identifying what needs to be learned. Fifty years of basic and applied research in the field convinces me that the more precisely one understands what needs to be learned the better job one can do of teaching it. This holds whether one is talking about automated tutorials or human teachers. The only difference is that the former can be automated and are more readily subject to incremental improvement.[11]

[11] One might think that we already know what needs to be learned in school math. Although analyses in school math tend to be more complete than in other areas, the analyses we have undertaken show that those used for planning textbooks, lessons, CBI programs and even ITS are invariably incomplete. It is not sufficient to simply list the kinds of problems to be solved, to name the particular skills required or even to identify all of the productions that might be involved in solution. Complete analysis requires full systematic analysis of what needs to be learned at all meaningful levels of abstraction. Without full analysis, an automated tutorial will necessarily be incomplete, and cannot reliably guarantee mastery (at least not without including a lot of redundancy).

Comparison with Contemporary TICL Research.—Compare the above also with what is currently done in contemporary tutoring and simulation systems. In such systems, so-called scaffolding is typically indirect, or at best imprecise. We used to call them "Hints". Hints can certainly encourage, indeed require involvement of the learner. If successful, they may also exercise the learner's cognitive abilities.

The problem here is that existing systems of this type have never achieved results comparable to what a skilled human tutor might do. Given increasingly precise representations of what must be learned for success, on the other hand, TutorIT will be capable of providing arbitrarily precise instruction.

Encouraging learners to exercise whatever they may (or may not know) is a good thing. Nonetheless, two points need to be emphasized.
1. There is nothing that forces TutorIT to be as precise as may be possible.
2. There will inevitably learners for which typical scaffolding is insufficient.

AuthorIT's support for arbitrarily precise representation, extended to include higher order knowledge, will make it possible to reach those who are unable to succeed on their own. By design, the proposed extension of TutorIT would be capable of precise diagnosis and remediation on higher as well as lower order knowledge.

In this regard, we call attention to an early piece of research on math learning (e.g., Roughead & Scandura, 1968) in which it was possible to explicitly identify the higher order rules necessary for success in math problems solving (number series). Once identified, we found that students could be taught those higher order rules directly by exposition. Furthermore, it was impossible to tell the difference between those who were taught the higher order rules by exposition and those who discovered them on their own.

Student's who discover rules on that own and students who are taught those rules secondarily exercise and may learn additional skills. Students who discover higher order rules may in the process also exercise still higher level skills. Conversely, students who learn by exposition gain more experience understanding complex instruction. The essential point is that being able to identify such higher order knowledge (with arbitrary degrees of precision) inevitably makes it easier for more children to learn such higher order skills. Here, we have another example of where computers might eventually take over tasks that they can do better than humans.

One other point deserves emphasis. TutorIT's commitment to deterministic thinking (cf. Scandura, 1971, 2007) requires a significant change in how one goes about evaluating instruction. In particular, it calls into question the usual measures used in controlled experiments, and specifically, the need for controlled experiments focusing on how much is learned. Well designed and suitably refined TutorIT tutorials build on what students already know and automatically adapt to individual needs during the course of (individualized) tutoring. By its very nature, TutorIT requires learners to demonstrate mastery of what is being taught. IF a learner enters with the necessary prerequisites (which can systematically be identified) AND completes such a Mona, that learner will necessarily have demonstrated mastery of what is being taught. This may sound like a tautology, but it is not. Automated instruction that adapts to individual needs, as does TutorIT, requires a different focus. Rather than comparing what or how much various groups of students learn, the critical issues are whether or not a child is motivated to complete a given tutorial, how long it takes and how long the skill is remembered. Similarly, rather than comparing TutorIT with alternative treatments (e.g., classroom learning), one can easily control and compare alternative delivery (i.e., tutoring) modes without confounding content with methodologies.

Further Extensions.—Although discussion is beyond the current scope, it is worth noting that anyone skilled in the art will see that these ideas have implications far beyond tutoring systems. As discussed in Scandura (2007) essentially all expert systems are based on deriving implications from sets of productions governed by learning mechanisms of one sort or another. It would be interesting to compare results of expert systems based on productions+mechanisms versus SLT+ UCM. Similarly, it would be nice to compare benefits in automatic problem solving. For that matter, it would be interesting to apply the above approach based on KR in SLT and UCM in areas as diverse as robotics and manufacturing Where do we go from here? Supporting complex domains will not come without a price. Although this disclosure makes viability clear, the time and effort required with complex domains will almost certainly be greater than with wen-defined domains. Mastery in such domains requires the acquisition of higher as well as lower order knowledge. Identifying such knowledge is not always easy. But as early research demonstrates, this can be done (Roughead &Scandura, 1968; Scandura, 1974, 1977; Scandura et al, 1971c; Scandura & Scandura, 1980). Moreover, the processes revealed herein are now far more systematic and it is a task that is long overdue.

That said, we have already developed viability of the methods revealed herein. In a relatively short time, the revealed methods have been used successfully to develop a core of TutorIT math skill tutorials covering pre-algebra skills beginning with basic facts through fractions, signed numbers and complex expressions. These tutorials represent only a beginning, but point the way toward a whole new generation of automated (and highly adaptive) tutorials.

More generally, TutorIT technologies have the potential of revolutionizing the way adaptive tutorials are developed, delivered and evaluated. Not only can they be used to develop math skill tutors but highly adaptive tutorials in essentially any area: mathematics, reading, science or otherwise.

Part 2

Modeling Behavior and Associated Knowledge: The present disclosure assumes that problems in a problem domain can be used to define the behavior that a learner is to acquire. In turn, it is assumed that each such problem can be represented as an abstract syntax tree (ASTs) as illustrated in the left panels of FIGS. 6, 11, 12, 13 and 22 as an AST (e.g., Scandura (2003). As shown in these abstract syntax trees, associated behavior can be specified in terms of ASTs representing given and goal data structures in problems to be solved.

The knowledge necessary for solving such problems also can be represented in terms of ASTs. The major difference is that knowledge ASTs, called SLT rules in the preferred embodiment, include both a procedure AST and the data AST structure on which it operates. FIG. 1 illustrates a data AST. FIGS. 2, 3, 4 and 5 show procedural ASTs).

In the preferred embodiment, each terminal node in a procedural AST is assumed to be executable on a computer. Code in the lighter colored, nodes under the highlighted node in FIG. 27 are shown in green. The statements in these nodes are executable in AuthorIT's High Level Design (HLD) language interpreter. The first example, "Subtract_the_current_column" can be implemented in a single HLD statement as shown. The second only partially expanded under the highlighted node involves more. SLT rules operate on problem ASTs and generate solutions. Being executable makes it possible for SLT rules (as we shall see controlled by TutorIT) to automatically generate correct answers to any given problem in the given domain.

In effect, in the present disclosure the behavior a learner is to acquire is specified in terms of problem ASTs. Problems represent the behavior to be acquired, wherein said problems consist of initialized input (Given) and output (Goal) AST data structures. Each level in a problem hierarchy represents equivalent behavior at increasingly detailed levels of abstraction. Knowledge, on the other hand, consists of Given and Goal (corresponding to input-output) AST data structures and AST procedural hierarchies defining multiple abstraction levels of operations and decisions for generating outputs from the inputs. In the preferred embodiment, the operations represent procedural knowledge at multiple levels of abstraction. Any one level is behaviorally equivalent to every other level. The difference is that lower levels reveal increasing levels of detail as one descends the hierarchy. Given and Goal knowledge structures are like formal parameters in software, whereas problems represent the actual data on which knowledge operates. In the preferred embodiment, top (and more generally higher level nodes in the procedural AST) represent knowledge that is more declarative or structural in nature. Conversely, lower levels are more procedural in nature. In SLT, more generally, all to-be-acquired knowledge includes both structural and procedural components. Higher levels in the procedural hierarchy involve simpler operations and decisions on more complex structures. Individual knowledge at this level signifies knowledge that is more automated. Such knowledge corresponds to higher levels of mastery. Lower levels of learning are more procedural in nature. They operate on less complex structures.

There is a close relationship between Input and Output ASTs in Problems (sometimes loosely called Behavior ASTs) and Given and Goal data structure ASTs representing declarative or structural knowledge. However, they are not identical. The highlighted node in FIG. 1, for example, has a place holder for current_column. It is what is called in SLT a prototype in a prototype refinement (e.g., Scandura, 2005). Corresponding problem data, however, has a fixed number of columns. For example, actual problems contain a ones column, tens column, etc. The prototype in this case provides a general format from which any number of specific problems may be derived. In the preferred embodiment, this relationship is provides a convenient means of constructing problems from Given and Goal data structures.

Anyone skilled in the art will also recognize that SLT rules may themselves act as data for other SLT rules. In the preferred embodiment, higher order SLT rules, which is often domain independent, may act on and/or generate (new) SLT rules (e.g., U.S. Pat. No. 6,275,976, Scandura, 2001; Scandura, 2003, 2005, 2007).

Hierarchies and Atomicity.—As any one skilled in the art knows, AST hierarchies are formally or computationally equivalent to networks, production systems and any number of other formalisms. What separates SLT rules, and the AST formalisms on which they are based, from other formalisms, is that the structure of the representation itself makes it possible to make diagnostic and remedial decisions automatically, based entirely on the structure of the AST-based SLT rule knowledge representation itself, independently of the meaning attached to nodes in the knowledge representation. This is a fundamental distinction which separates SLT rules from others used in computer assisted learning.

In the preferred embodiment, ASTs are represented as hierarchies in which terminal nodes are atomic elements or operations. In the case of behavior, atomic elements represent observables that are assumed to be automatically and immediately available to the learner and tutor. In the case of knowledge, atomicity refers to prerequisite elements in a representation that may be assumed either to known by individuals in any given population of learners in their entirety or not at all. Atomicity is closely associated with the notion of abstract values (Scandura, 2003), and has long played a central role in instructional theory. In essence, atomic elements are those that make a difference in behavior and to-be-acquired knowledge.

Knowledge at each level in an AST-based SLT rule need not be identical, but it is important that each level generate equivalent behavior. Only relevant distinctions are important from a behavioral, learning and/or instructional perspective. For example, it is important to distinguish individual digits (0, 1, 2, . . . 9) in an SLT rule representing what must be learned to master the addition facts (e.g., 3+8=11). On the other hand, in the addition algorithm adding digits is an assumed prerequisite that has already been mastered. It is sufficient to consider adding individual digits as an atomic SLT rule, without distinguishing individual digits. Other important prerequisites assumed when mastering column addition include such things as knowing when to carry and when not. The ability to make distinctions corresponds to a partition on possible values, and in the literature has been called an abstract value. In general, abstract values represent important categories (equivalence classes) that are important from a behavioral perspective—to decisions that must be made in executing an SLT rule.

Structural Analysis.—A variety of knowledge engineering methods may be used to construct AST hierarchies that are executable on a computer. In the preferred embodiment, however, instructional designers and domain/subject matter experts use Structural (cognitive task) Analysis to represent to-be-acquired knowledge ASTs as Flexforms. Structural Analysis can be performed on essentially any task domain, including both well-defined and broader ill-defined domains (U.S. Pat. No. 6,275,976, Scandura, 2001; Scandura, 2003). Both input-output behavior and to be learned SLT rules are specified in a clear unambiguous manner. The basic method consists of representing the input-output behavior and/or procedural knowledge in question at a high level of abstraction and refining that input-output behavior and procedural knowledge progressively until some predetermined level of detail is obtained (see atomicity above).

The result of structural analysis is not necessarily executable directly—that is, representable in a language understandable to the computer.[12] What is essential is that the resulting AST represent what is essential for purposes of learning and instruction. Accordingly, the process of Structural Analysis results in an AST input-output data (behavior) hierarchy in which each level of abstraction in the AST represents equivalent behavior. In an AST procedural knowledge hierarchy, Structural Analysis similarly results an AST in which each level of abstraction in the AST represents equivalent knowledge. The only difference is the degree of abstraction at each level.

[12] Contrast this with software engineering, in which equivalence in a design hierarchy normally refers to actual behavior. While the operations in a program (e.g., in structured analysis) may be represented hierarchically, the operations at each level of abstraction in the design hierarchy normally operate on the same data. To say that the behavior is equivalent in this case is essentially a tautology. In software engineering, equivalence requires that each level in the hierarchy produces identical behavior. This means that behavior of the parent operation is identical to that of its children taken collectively. One may envision the hierarchy as being composed of progressively simpler subroutines in which the parent subroutine in each case produces the same behavior as its child subroutines. In general, it is extremely difficult to prove that the behavior of the parent in a refinement and that of its children is identical. There is no general solution to this problem: Each an every different refinement requires a separate proof and is quite impractical (e.g., see Scandura, 2003).

Scandura (U.S. Pat. No. 6,275,976; Scandura, 2003) has identified a small number of refinement types based on the fact that every refinement can be represented either as a category or as a relationship between elements. Table 1 is adapted from Scandura (2003) and lists variants of those basic refinement types that play an important role in representing input-output behavior and procedural knowledge (as well as software specifications and designs generally). Table 1 also indicates that each behavioral variant corresponds to a unique procedural variant, one guaranteeing that the children in a refinement generate the same behavior as the parent. In effect, the kind of process or procedural refinement necessary to assure equivalence depends on how the input-output data (associated with the parent) is refined.

For example, the parent in a Component refinement (where the input variable is refined into a set of independent elements) calls for a Parallel refinement, in which each child element may be operated on independently and still generate equivalent behavior. In this case, the parent variable is an input variable in the parent operation in the knowledge AST. The child operations necessarily operate on elements in the children in the component refinement.

Similarly, in a Prototype refinement a single child represents a number of elements having the same structure. The corresponding Knowledge representation in this case is a Loop (e.g., WHILE . . . DO, REPEAT . . . UNTIL) or Navigation Sequence (e.g., operate on the last element in a set). In effect, a loop is used when the number of child elements is variable and a Navigation Sequence when the number of child elements is fixed.

Category refinements, in turn, correspond to a selection (e.g., CASE or IF ... THEN) refinement when the children in the Category are terminal. When the children in a Category refinement are themselves structures (as in a class hierarchy), then the procedural refinement is an abstract operation operating on that class of objects. The affiliate mechanism used by abstract operations to generate behavior is defined in Scandura (2001b).

Dynamic refinements involve defining a parent variable as an operation having its own inputs and outputs. Consider the parent variable "clean", or any other action variable for that matter. The only way such a variable can be made more [precise (i.e., refine it) is by defining it as an operation with its own input and output variables. When such a variable is the parameter of parent operation, the child operation interacts with the parent. For example, 'callback' in the operation display_dialog(callback, persistent_variables)

is refined as an operation which interacts with the persistent_variables, which uses them as both input and output.

The special variants, component, category and dynamic, while not exhaustive, have simple procedural counterparts, which collectively are sufficient for automatically refining a broad variety of Input-Output behaviors. Remaining examples of relational refinements (i.e., Definition→varied procedural code) and category refinements (i.e., Terminal→Case) cover the remaining cases and make it possible to represent any given Input-Output behavior or procedure with any desired degree of precision. The essential is that each refinement must be internally consistent, wherein behavior associated with each parent (behavior or operation) is equivalent to that of its children.

TABLE 1

| Specification/Input-Output Behavior Refinement | Design/Procedural Refinement |
| --- | --- |
| *Definition [non-hierarchical relation] | *Sequence, Selection, Loop w/ operations determining the relation |
| Component [is an element of] | Parallel |
| Prototype (variable # components) | Loop (repeat-until, do-while) [introduces variable alias] |
| Prototype (fixed # components) | Navigation sequence [introduces fixed aliases] |
| Category [is a subset of] | Abstract Operation |
| Category (atomic sub-categories) [is a subset] | Selection (case/if-then, based on sub-categories) |
| Dynamic (variable refined into operation) | Interaction (e.g., dialog with callback) |
| *Terminal | *Case (based on abstract values) |

Abstract Equivalence.—Demanding exact equivalence of parent and child behavior is impractical (see footnote 7). In contrast, the methods revealed herein are quite practical because equivalence is based on abstractions, specifically on equivalence classes of values called abstract values (see Scandura, 2003, U.S. Pat. No. 6,275,976). Furthermore, rather than refining only data (as in data analysis) or process (as in structured analysis), both data and processes in the preferred embodiment are refined in parallel. More precisely, equivalence in a refinement is defined in terms of abstract behavior defined by the top and bottom paths in a refinement. A refinement is said to be abstractly consistent if starting from the inputs to the child operations, the abstract behavior generated by the top path (child-parent mapping followed by the parent's input-output behavior) is equivalent to the bottom path (abstract input-output behavior of the children followed by the parent-child mappings). An AST is said to be internally consistent if each refinement in the AST is equivalent.

To summarize, Structural Analysis results in rigorously defined, internally consistent Abstract Syntax Tree (AST) representations of to-be-learned Input-Output behavior and/or procedural knowledge. Input-Output behavior ASTs are internally consistent in the sense that the abstract behavior parent behavior in each refinement is equivalent to that of its children. Such equivalence is defined in terms of both input-output and parent-child mappings. Corresponding procedural knowledge ASTs are internally consistent because constraints imposed on each type of knowledge refinement (e.g., Parallel, Selection) guarantee that the abstract behavior defined by the parent and child operations is equivalent.

Procedural and Declarative Knowledge.—ASTs define two kinds of knowledge and corresponding behavior. Procedural knowledge and the associated behavior are defined in terms of input-output behavior. Declarative knowledge, on the other hand, is operationalized (made executable) in terms of parent-child mappings in Input-Output Knowledge ASTs. In effect, ASTs make it possible to detect both procedural and declarative knowledge—both result in observable behavior (e.g., Scandura, 2001).

Procedural knowledge, however, may be arbitrarily complex. In knowledge ASTs, each procedure node represents a separate operation, each with its own input and/or output variables. In contrast, declarative knowledge is direct. Declarative knowledge is defined by atomic parent-child mappings between parent nodes and their children.

In preferred embodiment, procedural knowledge (i.e., each operation in a procedural AST) is operationalized in terms of executable operations capable of generating Input-Output behavior. Correspondingly, declarative knowledge is operationalized in terms of executable Parent-Child mappings in Input-Output data structures (representing hierarchies of formal parameters). Both procedural and declarative knowledge can be represented as above at various levels of abstraction, with higher level operations defined in terms of (terminal) executables. In preferred embodiment, each level of abstraction is equivalent in the sense revealed in Scandura (U.S. Pat. No. 6,275,976, 2001; 2003).

As we shall see below, nodes in knowledge ASTs may be assigned semantic attributes pertaining to learning and tutoring processes. Such nodes also may be assigned display properties (see below) making them observable to learners.

Knowledge Structure and Executability.—Whereas anyone skilled in the art can devise any number of formally equivalent ways to represent ASTs, the above analysis establishes two essential facts: a) Said ASTs directly reflect structural characteristics of the knowledge they represent. b) Said ASTs are fully operational.

Like networks and conceptual frameworks, for example, ASTs clearly represent the structure of the knowledge they represent. Moreover, individual ASTs represent knowledge (as well as behavior) at all possible levels of abstraction. Production systems, on the other hand, consist of lists of unrelated condition-action pairs. Structural relationships in production systems are NOT directly represented. Relationships among the productions in a production system can only be determined as a result of execution. In effect, such relationships consist entirely of the orders in which they are executed in solving particular problems.

Like production systems, ASTs, in which nodes represent operations or conditions (functions) and/or in which parent-child mappings have been defined (e.g., in terms of abstract values), also are executable. Specifically, in the preferred embodiment, each node in said ASTs is an operation or condition (function), or an operational parent-child mapping.

The refinement process is continued until each terminal operation in an AST is atomic. Since atomicity does not always mean executable, said terminal operations ultimately must be implemented in some computer language. This issue is addressed in the preferred embodiment by use of a high level design language, which not only includes a broad array of relevant executables (e.g., operations and functions), but which also is easily extensible.

Consequently, said ASTs can be executed directly. Each node in said tree may be executed in turn by traversing nodes in each AST in a top-down depth-first manner (as is the case with most interpreters). During a traversal, individual, nodes may or may not be executed depending on constraints imposed on the traversal. For example, rather than executing behavior directly associated with a non-terminal node, one might execute all of the terminal nodes defined by the subtree defined by that non-terminal. Thus, borrowing in column subtraction involves comparing top and bottom digits, borrowing from the next column and adding the ungrouped ten in the current column (see FIG. 2). Similarly, one might decide whether or not to test or provide tutoring on a node, depending on the current state of the learner model (representing the learner's current knowledge). The options may vary widely, and in the preferred embodiment are available as options (see FIG. 14 for specifics in the preferred embodiment). FIG. 14 does not show an option for allowing learner control as to what node to choose and/or the kind of instruction. Nonetheless, learner control does play a key role in the preferred embodiment.

Parent-child mappings play an essential role in representing declarative knowledge in systems of interacting components (commonly called 'models'), specifically in representing relationships between the components (see Scandura, 2003 and section below on Model-based Behavior and Knowledge). In the preferred embodiment, which is based on the Structural Learning Theory (U.S. Pat. No. 6,275,976, Scandura, 2001), procedural ASTs may serve as data to higher order knowledge ASTs. In this case, Parent-Child mappings in procedural ASTs also may be used to represent declarative knowledge. For example, refining condition nodes (nodes representing conditions) in procedures (i.e., representing conditions more precisely) necessarily involves relationships. For example, in FIG. 2, the condition 'TopGreaterThanBottom' necessarily involves a relationship between top digit and bottom digit, namely 'top=bottom', or its negation 'not (top<bottom).

Similarly, knowing that 'Borrow if_needed_and_subtract_the_current_column" involves 'Borrow_as_appropriate' followed by 'Subtract_the_current_column' represents declarative knowledge. Parent-child mappings in this case are determined by consistency rules designed to insure that the parent and child operations produce the same or equivalent behavior (e.g., see U.S. Pat. No. 6,275,976, Scandura, 2003). Another example is knowing that 'Borrow_as_appropriate' in FIG. 2 involves checking to determine whether 'TopInNexteolumnisGreaterThanZero' followed by "Borrow_from_next_column' or Borrow_from_the_first_nonzero_borrow_column', depending on whether the answer is positive or negative. In short, when procedural ASTs serve as data (to higher order knowledge ASTs), parent-child relationships in those procedural ASTs represent declarative/relational knowledge in an operational way that can be tested—for example, by having a learner describe (or select) the parent given the children or vice versa.

Input-Output Data Structures in Knowledge ASTs.—FIG. 1 represents the input-output data structures associated with Column Subtraction. Abstract values in this figure represent essential differences before and after mastery (i.e., execution). For example, CurrentColumn may be Subtracted or NotSubtracted when it serves as INPUT but only Subtracted as OUTPUT. While those skilled in the art might devise any number of equivalent AST representations, FIG. 1 is a familiar tree-view. In addition to a minus sign and an underline, every column subtraction problem (represented as Prob) is defined as a set (any number) of columns, each with seven components. The refinement consisting of Prob and its child CurrentColumn is a 'prototype' refinement (U.S. Pat. No. 6,275,976; Scandura, 2003). In turn, CurrentColumn is refined into a Top digit, a Bottom digit, Difference digit and so on. The other components (e.g., ReducedTop, SlashTop) represent variables whose values must be determined in the course of solving a subtraction problem.

In addition to type of refinement, this tree view distinguishes those values having relevance to decision making during learning (i.e., abstract values). For example, Prob can be 'Done' or 'NotDone and CurrentColumn can be 'Subtracted' or 'Not Subtracted'. This tree view also includes information under INPUT pertaining to Parent-Child mappings and under OUTPUT to Input-Output mappings. For example, the Parent-Child mapping <*Subtracted; Done> means that the parent 'Prob' is 'Done' when all of the columns have been 'Subtracted'. Similarly, the INPUT value of 'Prob' may be 'Done' or 'NotDone' but the OUTPUT must be 'Done'.

These mappings insure that each level of abstraction in FIG. 1 represents the same or equivalent behavior. In column subtraction, the variables Top and Bottom (in each column) under INPUT would be assigned a specific digit (i.e., be a initialized variable). The goal would be to determine the corresponding values of Difference under OUTPUT (and in the process of solving the problem, the intermediate values of ReducedTop, HigherReducedTop, etc.). The only difference is the degree of abstraction at each level of refinement.

Procedures in Knowledge ASTs.—FIG. 2 is a Flexform AST representing the process of column subtraction at all levels of abstraction. Higher levels of abstraction in the Flexforms are separated from their children by dotted lines. FIG. 3, for example, shows only the top two levels: Respectively, these represent ColumnSubtraction as a whole and the REPEAT ... UNTIL loop in which each column is subtracted in turn.

FIG. 4 shows only terminal levels in the same Flexform. In this AST, all terminal operations (e.g., Subtract_the_current_column, Borrow) are assumed to be atomic. In particular, the terminal operation Subtract_the_current_column(CurrentColumn:; CurrentColumn.Difference)

is atomic implying that the learner has mastered (all of) the basic subtraction facts. Knowledge of these facts (like all terminal operations) is assumed to be all or none. In general, basing instruction on this representation assumes that the learner has mastered all of these (terminal) prerequisites. If an instructional designer were unwitting to make this assumption with respect to any given terminal operation, then he would be obliged to refine this operation further. Refinement would continue until all terminal operations may be assumed atomic with respect to the target learner population. In the case of Subtract_the_current_column, one possibility might be to distinguish "harder" facts (e.g., 17-9, 13-6) from simpler ones (e.g., 4-2, 5-3). Another would be to consider each separate fact atomic. In either case, terminal operations used in Flexform AST by definition constitute prerequisite knowledge, knowledge that is either known completely or not at all. A long series of empirical tests provide unusually strong support for this assumption, and its broad applicability (Scandura, 1971, 1977).

As above, consistency in a Behavioral (Input-Output data structure) AST depends on abstract equivalence of top and bottom paths. As first revealed in U.S. Pat. No. 6,275,976, abstract equivalence in procedural knowledge ASTs is based on consistency constraints (Scandura, 2001a, 2003). Equivalence in Knowledge ASTs can be used to represent essentially any kind of knowledge. These constraints are designed to insure that abstract behavior of the parent and child operations in a procedural Knowledge (aka design) AST will be equivalent if certain constraints are satisfied.

AST Factual and case-based knowledge, for example, are special cases of procedural knowledge. Factual knowledge, for example, can be represented in at least two ways. First, each fact (e.g., 11−6=?) can be represented as a problem to be solved with a common solution procedure for generating the answer to each [e.g., subtract (top, bottom:; difference)]. In this case, the facts represent desired behavior and the subtract operation, knowledge that might be used to generate that behavior. Second, each fact itself can be represented as a separate knowledge AST (e.g., 11−6=5), each fact defining its own problem/behavior (e.g., 11−6=?). The former embodiment more readily lends itself to representing more complex knowledge (see below) in which one or more Knowledge ASTs may be used to solve given problems.

The second method distinguishes the knowledge (ASTs) used for each factual behavior. This method is more convenient when one wants to teach each fact individually. Indeed, it is possible to gain the benefits of both methods by representing each problem and item of factual knowledge individually. In this case, individual problems are solved by selecting from available knowledge ASTs (i.e., the facts). This preferred embodiment is consistent with the inventor's Structural Learning Theory (e.g., Scandura, 2001a). Specifically, the control mechanism first formalized and revealed in U.S. Pat. No. 6,275,976 provides an automatable and universally applicable method for selecting knowledge ASTs. Given any problem, this mechanism tells what knowledge AST to use and when to use it—even when any number of knowledge ASTs may be required in the solution.

Case-based (conceptual) knowledge (e.g., distinguishing animals) is represented similarly. The main difference is that the each concept (e.g., cat, dog) corresponds to a selector in a CASE refinement.

Clearly, a broad range of behavior can be subsumed under procedural knowledge. The distinguishing characteristic of procedural knowledge is that behavior can be generated by combining the Input-Output behavior of simpler knowledge (constructed via the various kinds of refinement identified in Table 1). In the preferred embodiment, however, behavior is represented by mappings between parent nodes and their children in ASTs as well as by mappings between input output nodes. We shall see below how the first kind of (Parent-Child) mapping provides an explicit basis for declarative behavior and declarative knowledge.

Parent-Child Mappings and Declarative Knowledge.—Input-output behavior associated with operations in procedural ASTs and parent-child behavior associated with mappings in data structures in such ASTs represent two quite different kiwis of knowledge: Input-output mappings represents procedural knowledge; parent-child mappings represent declarative knowledge (Scandura, 2003). Although any AST may include both types of knowledge, these kinds of knowledge are frequently separated in both theory and practice. With the exception of the inventor's Structural Leaning Theory, for example, each type of knowledge is represented quite differently in cognitive and instructional theories. The above analysis clearly shows that both kinds of knowledge may be represented in single internally consistent AST representations.

In particular, Parent-Child mappings in ASTs represent declarative behavior and the associated mappings represent declarative knowledge. Parent-Child mappings, however, are NOT generally decomposed. Unlike procedural knowledge, declarative knowledge is necessarily direct: Parent-child mappings and the corresponding knowledge (for generating that behavior) are essentially the same—although it should be noted that declarative relationships between multiple levels of refinement in an AST may be represented in terms of successive Parent-Child mappings (those associated with each level involved).

Declarative knowledge may include anything from simple declarative knowledge to multi-level relationships in complex models of interacting systems. Knowledge that cats and dogs are animals and that jogging, walking and running are means of movement are simple examples of declarative knowledge. In these cases, the parents would be animals and means of movement, respectively. The children, respectively, would be cats and dogs, and jogging, walking and running.

Model-based Behavior and Knowledge.—To-be-acquired knowledge is frequently classified as being either procedural or declarative in nature. As shown in Scandura (2003), however, knowledge (e.g., domain-specific models) may include both kinds. Specifically, systems of interacting components, often called models, involve both declarative and procedural knowledge.

The Railroad Crossing model below taken from Scandura (2003) illustrates includes both declarative and procedural knowledge. In this case, the top-level refinement defines the Parent-Child mappings between a Crossing and its components, Train, Signal and Gate. These mappings represent declarative knowledge. The behavior of the Train, Signal and Gate, however, which interact in the crossing, is procedural in nature. Indeed, the behavior associated with these independent procedures may be combined to solve more complex problems (i.e., to produce behavior that requires use of more than one procedure).

In order for the crossing system to operate correctly, these components interact as follows: As the train approaches the crossing, the signal detects its proximity and sends a message (SignalColor is red) to the gate. The gate detects the red color and moves the gate down. Conversely, when the train leaves the crossing, the signal detects that fact and tells the gate to go up. FIG. 5 represents the Signal procedure as a Flexform AST. Train and Gate are represented in a similar manner.

The dialog box in FIG. 6 shows the information required to define the declarative knowledge associated with Crossing system. The Crossing as a whole may be 'working' or not-working'. These properties are represented by the Crossing's abstract values. Crossing, in turn, is defined (refined) more precisely in terms of the components (i.e., train, signal and gate) that make up the system.

Specifically, the crossing system is 'working' when the train is 'in' the crossing, signal is 'red' and gate is 'down'. It also is working when the train is 'out' of the crossing, signal is 'green' and gate is 'up'. All other Parent-Child mappings correspond to a Crossing that is 'notworking' (as it should be working). This information is all stored in a Flexform AST as Parent-Child Mappings, and represents declarative knowledge. It should be noted, however, that the list of mappings in FIG. 6 under "Required System Relationships' is only partial. Unlisted combinations of abstract values also result in a system that is not working.

Procedural components (e.g., signal) in the system also may have an (optional) observable interface. In Scandura's SoftBuilder, which is described in various publications (Scandura, 1995, 1997, 1999, 2001), this may be accomplished by simply completing a dialog (see FIG. 7). In the preferred embodiment, such an interface enables a learner to interact with, and hence to simulate the behavior of various components in the system.

Higher Order Behavior and Knowledge.—Ill-defined problem domains (i.e., behavioral ASTs) transcend domain specific knowledge. Specifically, such domains typically require higher order knowledge, knowledge that typically is domain independent (also see Scandura, 2001a).

Higher order knowledge (and behavior) is easily represented. Nodes in ASTs may themselves represent ASTs, in which case the (former) AST represents higher order knowledge (or higher order behavior). In the preferred embodiment, any number of knowledge ASTs may be required in solving problems associated with any one Input-Output Knowledge AST. Details on lower as well as higher order representation issues and the method of Structural Analysis for identifying such higher order knowledge are provided in U.S. Pat. No. 6,275,976, Scandura, 2001).

Parent-child mappings in the 1-0 data structures in higher order knowledge also represent declarative knowledge. Structural analysis, for example, is a higher order process in which the input and output structures are procedural ASTs represented at successive levels of abstraction. That is, each refinement of a parent process results in child processes which collectively generate equivalent behavior. In this case, the parent-child mappings in the data structure ASTs operated on during structural analysis represent declarative knowledge about the process being refined. For example, application of structural analysis in the case of column subtraction results in the AST hierarchy like the successive levels of refinement shown in FIG. 2. Parent-child mappings between these levels represents declarative knowledge, in this case declarative knowledge pertaining to the process of column subtraction.

Input-Output Knowledge ASTs versus Problem ASTs.— In the preferred embodiment, Input-Output Knowledge ASTs correspond to formal parameters in a program and represent the data structures on which procedural knowledge operates. Problem ASTs correspond to actual parameters and are copies of Input-Output Knowledge ASTs in which Input variables have been initialized. The values of output variables in problems represent goals—values to be determined (from available knowledge).

In most cases, initialization simply amounts to assigning a value or other concrete observable (e.g., via a file reference) to the input variable. Prototype variables, on the other hand, are placeholders for (pointers to) any number of other variables. Initialization of prototype variables amounts to assigning particular variables to the prototype. In FIG. 1, for example, 'CurrentColumn' in any given problem can at any point in time represent any one of a fixed number of columns—the 'Ones" column, the 'Tens' column, the 'Hundreds' column, etc. The 'top' digit in each column (e.g., tens), in turn, would be assigned a particular digit.

Semantic Attributes.—The author also may assign any number of semantic attributes to nodes in a behavior and/or knowledge AST. We have seen above that semantic attributes in ASTs are used to define procedural (input-output behavior) and declarative (parent-child behavior) knowledge. Semantic attributes of nodes also are used to define type of refinement (e.g., category, component, selection, case, loop).

In an Input-Output Knowledge AST or a corresponding problem AST, semantic attributes may be associated with problems as a whole, or with individual nodes. In the former case, the preferred use is to convey or represent observable or other important information about the problem as a whole—for example, a verbal statement of the problem or a hint for solving the problem.

Semantic attributes associated with specific nodes in specific problem representations are more aptly called (display) properties. Such properties represent how information is to be presented (made observable) to learners, and/or how responses are to be obtained from learners. The use of observable properties is explained below.

Semantic attributes can also be used to define instruction, questions, positive reinforcement and corrective feedback associated with given nodes. These and other attributes provide almost unlimited latitude in customizing learning or tutorial environments.

Preferably, semantic attributes are assigned by simply filling out a dialog box or equivalent, such as that shown in FIG. 8.

In FIG. 8, INSTRUCTION, QUESTION, FEEDBACK and CORRECTIVE FEEDBACK include both text and a file reference to supporting multimedia. In this example, all referenced files are audio (.wav) files, although Flash (.swf) files are more commonly used because they combine everything from sound to movies and take considerable less memory. Clicking on "Set Default Tutor Fields" automatically creates the above text from the operation name and its parameters.

Clicking on 'Set File References' would automatically add default file references for corresponding Flash (.swf) files. Any number of such references may be included in the preferred embodiment. CONTEXT is essentially an identifier, and in the preferred embodiment is used to automatically name supporting files.

Nodes in an AST also may be given special status. For example, the knowledge (or behavior) associated with a node may be designated to receive special treatment. For example, a non-terminal node may represent knowledge that is so important that it must not only be learned but that it must be mastered (e.g., to a degree consistent with nodes that are atomic in the AST). Conceptually, automation of a node in an AST involves replacing procedural complexity with structural complexity via application of higher order automatization rules (ASTs) to non-automated ones (Scandura, 2001a).

In the preferred embodiment, the author can specify whether the knowledge associated with any given node is to be AUTOMATED. Automation means that the learner must demonstrate mastery to a degree consistent with performance expected if the node were atomic (e.g., terminal). Speed of response is a typical but not the only indicator of automation. To be automated nodes are marked with an "a", meaning that they are to be "automated".

Other semantic attributes play an essential role in defining the learner model. In the preferred embodiment, the learner model is defined by status attributes (of operations and/or mappings) in AST nodes. These nodes may be marked known (+), unknown (−), yet to be undetermined (?) or automated (A). (In the case of automation, the lower case 'a' is converted to upper case.)

Other distinctions (e.g., partial knowledge) obviously could be introduced, either as replacements or enhancements. As we shall se below, the author preferably is given the option of setting the INITIAL LEARNER STATUS, making it possible to customize tutoring for different populations of learners.

Observable Properties.—In the preferred embodiment, the author may assign observable (aka display) properties to semantic attributes and nodes (e.g., operations, problem variables) in ASTs. These properties specify how information is to be presented to and received from the learner. In addition to native display machinery for such properties as text, selections and regions defined by simple figures, properties may include a wide variety of file types, such as (.swf) files for Macromedia popular Flash reader, sound (.wav), picture (.bmp) and animation (.avi). Anyone skilled in the art knows that other file types, as well as ActiveX and other object types, also may be supported.

FIG. 9 shows a problem layout (aka problem type) for column subtraction. In addition to initialized input (Given) and output (Goal) variables, display attributes may be assigned to semantic attributes associated with nodes in knowledge ASTs. In the preferred embodiment, properties may be assigned by clicking on an item and selecting properties in a dialog such as that shown in FIG. 10. These properties include value, location, size, kind of response and other characteristics of to be displayed objects.

Since automation has the effect of 'chunking' subsumed nodes, the author may select nodes that may safely be ignored during testing (and/or instruction). Other nodes may have constant values, which may be used in helping to identify design ASTs that apply to given problems (e.g., see control mechanism in U.S. Pat. No. 6,275,976, Scandura, 2001).

Such properties, including referenced files, objects, etc., can automatically be displayed whenever associated nodes and/or semantic attributes are referenced by a universally applicable tutor operating on said ASTs (see below). In the preferred embodiment, the kind of input required of the learner (e.g., keyboard for text, mouse-click for position, multiple-choice for selection) also may be determined automatically from properties assigned to AST elements. In addition, the author may specify the kind of evaluation to be used in judging learner responses to individual variables (e.g., exact match, area clicked, external evaluation by learner or teacher).

In the preferred embodiment, properties also may be assigned to abstract values (categories of values—e.g., see U.S. Pat. No. 6,275,976; Scandura, 2003). Parent-Child mappings (representing declarative knowledge) may be defined in terms of executable operations (as preferred with Input-Output mappings). Nonetheless, abstract values provide a convenient way to represent such mappings in the preferred embodiment.

In this embodiment, parent-child mappings in a system are defined in terms of abstract values as illustrated above in FIG. 6. This information is saved in a Flexform configuration (.config) file. Because Parent-Child mappings may be defined rather simply in terms of abstract values, displays (i.e., properties) can be defined in an efficient manner. In particular, all combinations of abstract values of the child components in a system can be configured (and represented) in a single Blackboard display. FIG. 11 illustrates the process in the Railroad Crossing system. Possible states of the system are represented in a set of (potentially) overlapping pictures. This display shows a train 'in' the station, the signal 'red' and the gate 'down' (also selected). If one were to select, say, 'out' under train, one would see the picture of a train in the country (hidden under the train in the station). Signal can similarly be changed to 'green'. The bottom line is that test items and all parent-child relationships can be constructed by referencing the display properties associated with the abstract values.

One or more components may be required to solve problems associated with behavior of the Crossing system. FIG. 12 represents a problem, determining the color of Signal based on the location of Train, which can be solved by the Signal component.

The problem shown in FIG. 13 is more complex. No one component is sufficient itself to solve this problem. Standard approaches that would work in cases like this, include forward and backward chaining. Given the status of Train ('out' of Crossing), the Train component send a message to Signal that it has left (is not 'in' the crossing). Signal takes this input and generates a 'green' signal. Gate, then receives the signal and goes (or stays) 'up'. The question is how to decide which component to use and when to use it.

Standard problem solving mechanisms may not work, however, in more complicated situations involving higher order or domain independent knowledge. Although other mechanisms can obviously be used, the universal control mechanism revealed in (U.S. Pat. No. 6,275,976, Scandura, 2001) is the preferred mechanism to be used for this purpose.

Customizing Learning and Instruction.—In the preferred embodiment, the author may customize AST lessons (represented as .dsn or design files) or curricula containing sets of lessons (represented as .prj or project files). In the preferred embodiment, customization consists of setting flags designating particular kinds of learning and/or instruction, such as adaptive, diagnostic, instruction, practice and simulation (see FIG. 14). Delivery Mode is an essential option, designating whether or not to include Diagnosis and/or Tutoring. For example, ADAPTIVE requires both Diagnosis and Tutoring. DIAGNOSIS includes the former and NOT the latter, and vice versa for INSTRUCTION. As noted in FIG. 14, it is possible to devise a wide range of learning and tutoring options by selecting from options, which are easily assigned in behavior and knowledge ASTs. The second note (marked by **), for example, suggests ways to address the needs of a wide range of learners, ranging from those highly knowledgeable in a subject to those entering with minimal prerequisites.

It is also possible, of course, to allow the learner some specified degree of control of the learning and tutoring environment. Such control may be provided in any number of ways. In the preferred embodiment, learner control is allowed by default. It is clear to anyone skilled in the art, however, that allowing learner control of the learning environment may be an option.

Shortcuts.—Specific kinds of knowledge may be represented in a standard way. As a consequence, short cut methods also may be developed for representing specific kinds of knowledge. ASTs representing factual and conceptual learning, for example, take an especially simple form. These kinds of knowledge are so simple and stylized that the author's job can be further simplified to specifying the desired behavior, eliminating the need to specify what is to be learned. Whereas all of the information in FIG. 15 is textual in nature, malice that the input and Output Types may involve any kind of multi-media. The information specified defines the desired factual behavior. Given this information, it is possible to automatically construct an AST knowledge representation that is sufficient for constructing said behavior.

Summary.—To summarize, all knowledge is represented as ASTs in which each level of refinement represents equivalent behavior at a different level of abstraction and wherein application of knowledge ASTs to (initialized) Problem ASTs generates a list of (sub)problems to be solved. Each node in said ASTs has a given or computable value, categories of values (a/k/a abstract values) and other semantic attributes having relevance for learning and instruction, including the learner status. These values, abstract values and semantic attributes, in turn, may be assigned display attributes indicating how they are to be made available to newness.

The above includes methods for: a) creating knowledge ASTs representing both procedural and declarative knowledge, b) assigning semantic attributes to nodes in said ASTs designating important features pertaining to instruction and learner models, such as instruction, questions and feedback and c) assigning display properties designating how nodes and semantic attributes are to be made observable to learners. In addition, we have revealed how customization parameters designating kinds of diagnosis and/or tutoring may be assigned.

As we shall see, the methods revealed dramatically reduce development times and costs because courseware authors do not have to sequence testing and/or tutoring, nor do they have to pre-specify specific problems or tasks or the order in which testing, instruction and/or feedback is to take place. Shortcut methods also may be developed for factual, conceptual and other kinds of knowledge that can be represented in one or more predetermined type of ASTs.

Universal Tutor Based on said Models: Knowledge ASTs of the form described above are both intuitive and executable, and provide a strong foundation for constructing a broad variety of learning and tutoring environments. The methods disclosed below reveal how learning and instructional can be determined based exclusively on such ASTs and the semantic attributes and properties assigned thereto. Specifically, these methods reveal: a) how specific (sub)problems and their solutions can be generated by applying procedures in knowledge AST to problems defined by Input-Output Knowledge ASTs, b) how semantic attributes associated with nodes in the ASTs determine how to sequence learning and/or tutoring and c) how display attributes assigned to problem ASTs determine how to represent problems and learner responses.

Generating and Solving Problem ASTs.—We have learned above that Problem ASTs (specifications) may, but do not necessarily have to be derived from data structures (Input-Output Knowledge ASTs) associated with procedural ASTs. Assigning values to input nodes (initializing variables represented by said nodes) effectively converts generic Input-Output Knowledge ASTs to concrete problems, where given values of input nodes and to-be-determined values of output nodes effectively define problems or tasks to be solved by learners.

Initialization may be as simple as assigning values or abstract values to said input variables. Input variables may also serve as pointer variables or aliases for any number of other variables (e.g., current_column is an alias for some specific number of columns, such as the one's, ten's and hundred's columns in column subtraction). In this case, each problem derived from an Input-Output Knowledge AST (specification) has a fixed number of variables (in each alias variable) as shown in FIG. 9.

Any number of finer grained (sub)problems may be derived from each such problem. The basic idea is as follows: Knowledge ASTs are executables that act on problems (acting as data). Applying a knowledge AST to a data AST generates a list of sub-problems, one for each node in the knowledge AST. Specifically, (top-down depth first) execution of a knowledge AST on values of the input parameters associated with each operation (node) in a knowledge AST, together with the yet-to-be-determined values of the output values of said operation effectively define a sub-problem to be solved (by the learner).

Given a problem AST (possibly but not necessarily derived from data structures, or formal parameters in knowledge ASTs), said knowledge ASTs may be used either individually or in some combination collectively to both generate specific problems and their solutions. For example, the subtraction problem in FIG. 9 above can be solved by applying the column subtraction algorithm of FIG. 2. FIG. 13 illustrates how individual knowledge ASTs may collectively be executed (in this case one after the other) to generate solutions to composite (railroad-crossing) problems.

As above, problems defined in a "Blackboard" (such as that shown in FIG. 9) effectively define sets of sub-problems. These problem types play an especially important role in the preferred embodiment when they are associated with particular knowledge ASTs—as is the case with the GIVEN and GOAL structures in FIG. 9 and the column subtraction Flexform of FIG. 2.

Specifically, each node in a knowledge AST (e.g., column subtraction) determines a unique subproblem. The subproblem is defined by executing the knowledge AST (e.g., using a depth first traversal) on the GIVENS of the initial problem up to the selected node. At this point the problem inputs are fully determined; they are the outputs of the execution up to that point. Furthermore, continuing execution of the AST through the subtree defined by the selected node generates the solution to the problem. For example, FIG. 16 below shows the subproblem defined by applying column subtraction to the sample problem 97-68 up to the point where the learner is asked to find the difference digit in the ones column.

FIG. 17 shows a subproblem defined by a non-terminal node representing borrowing in the process of being solved. Notice that the act of borrowing requires three distinct outputs. Crossing out the 9 and entering 8 (above the 9) have already been entered in FIG. 17. The "borrowed" 10 in the one's column is (yet) not shown. Other nodes in column subtraction define problems involving such things identifying (current and borrow) columns and determining whether the top digit is equal to or larger than the bottom digit. In effect, each node in the execution (i.e., sequence of executed nodes) of a procedural AST on a given problem type defines a unique subproblem.

In the preferred embodiment, each node in the corresponding data structure of a knowledge AST includes a parent-child mapping. This mapping also defines a unique problem and its solution—a problem representing declarative knowledge. In principle, parent-child mappings may be combined to construct problems testing multi-level declarative knowledge. For example, descendent (e.g., abstract) values may be used to determine ancestor values at any (e.g., grandparent) level.

Moreover, the properties assigned to variables in said problem types uniquely determine how those variables are to be made observable to the learner. For example, if a variable has been assigned a text type, it will automatically be displayed as text. If it is a line, rectangle or ellipse, for example, it will be so represented. Files (e.g., as a .swf or .wav file) or objects (e.g., ActiveX) also may assigned to variables, in which case those variables and/or will be visibly represented by applying corresponding "readers" (e.g., Flash reader).

Output variables also may be assigned types based on their properties. In the preferred embodiment, these types designate the kind of learner input required, and currently include keyboard input (i.e., text) and mouse clicks but it will be clear to anyone skilled in the art that any number of other kinds of input (e.g., touch pads, laser beams, etc.) may be obtained from learners.

Traversing ASTs.—Knowledge ASTs clearly may be traversed in any number of ways (e.g., top-down depth first or breadth first, or bottom up). The default method used in the preferred embodiment, as in most interpreters, is top-down depth first. For example, consider the simple AST

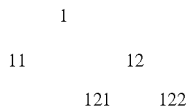

In this case the default traversal is the execution sequence (aka execution):

1, 11, 1, 12, 121, 12, 122, 1

Similarly, the default execution associated with the Flex-form AST shown in FIG. 2 would be:

ColumnSubtraction, Subtract_the_current_column, Click_on_the_next_column, Subtract_the_current_column [back up], Borrow_if_needed_and_subtract_the_current_column, TopGreaterThanBottom, Borrow_if_needed_and_subtract_the_current_column [back up], Subtract_the_current_column, Borrow_if_needed_and_subtract_the_current_column, Borrow_and_subtract_the_current_column [back up], Borrow_as_appropriate, etc. through NoMoreColumns, ColumnSubtraction [back up to end traversal]

It is clear to anyone skilled in the art, however, that the nodes may be visited in any number of orders, wherein that order is based on either the tree representation or the execution. For example, one can start at the top and go through the nodes in the execution sequentially. Alternatively, one might start with the terminal nodes in the AST and work upward, or from the middle of the AST and move alternatively up and down. It also is possible to skip nodes during a traversal. For example, given any traversal order, one may choose to skip non-terminals in the tree, restricting processing to terminals (or conversely). In the above example, the order would then be 11, 121, 122 (or conversely 1, 12 assuming no repeats). One could also choose whether to repeat nodes already visited (e.g., to omit the repeated 1 and 12 in the above sequence).

Instructional Decision Making.—Strategic and initial learner model and other options set during the authoring process (see FIG. 14) define the kind of diagnosis and tutoring available to learners. In the preferred embodiment, learners also may choose from a variety of learning and instructional types specified by the author. For example, while the author may fine tune the available alternatives by setting a variety of supplemental options adaptive learning, diagnosis, instruction, simulation and practice, the learner may be allowed to select from those options provided.

Customizing the initial learner model and options (e.g., as to diagnosis and instruction) further extends the broad range of possible learning environments. A key point is that if AST representations are consistent and complete as defined in Scandura (U.S. Pat. No. 6,275,976; 2003), such a tutor can actually guarantee student learning.

The methods revealed below literally make it possible to customize the learning and/or tutoring environment. With the click of the key, one can define everything from simple practice, simulation, instruction and performance aid to highly efficient diagnostics or highly optimized adaptive tutoring.

Although the options may be used to define an extensible set of options, application of the methods defined by these options are universally applicable during the course of learning. Given an AST representation of the knowledge to be acquired, these methods reveal how problems/tasks and/or solutions may be generated and learner responses may be evaluated automatically. They further reveal how directly targeted questions, feedback and instruction may be presented at precisely the right time in precisely the right context.

This is accomplished by: (a) selecting nodes in the knowledge ASTs, (b) interpreting said knowledge ASTs on initialized data structures (Problem ASTs) up to said selected nodes, (c) making said partially solved problems observable to the learner in accordance with properties assigned to the nodes in said Problem ASTs, (d) optionally presenting questions and/or instruction (corresponding to said nodes) to the learner, (e) optionally soliciting responses from said learner, (f) executing the subtree defined by said selected node in said knowledge AST, thereby generating the solution to said partially solved problem, (g) optionally evaluating said learner's response to said partially solved problem, (h) optionally presenting solutions, positive and corrective feedback to said learner in accordance with properties assigned to the nodes in said Problem ASTs, (i) maintaining a complete up to date learner model by assigning learner status attributes to each node in said knowledge AST and/or Problem AST and (j) repeating the process until some desired learner model has been achieved or the learner decides to stop.

Although there is a natural order of execution defined by knowledge ASTs, nodes in said ASTs may be selected in any number of orders. Each order corresponds to a specific kind of learning and/or instructional environment, ranging from simple simulation or performance aid to highly adaptive testing and/or instruction. Simulation, for example, consists primarily of executing the knowledge AST on the initialized data structures, thereby illustrating a process. A performance aid might supplement such execution with instruction designating how to perform each step in turn. This can be accomplished by initializing the learner model with all nodes unknown (e.g., marked '−'). Practice simply consists of an initialized learner model in which all nodes are assumed mastered (e.g., marked '+'). When problems are presented, the top-level node is marked so the learner is required to solve them.

Diagnostic testing and adaptive instruction involve slightly more sophisticated logic. Assuming the goal is for the learner to master all AST nodes, for example, all such nodes may initially be designated as undetermined (marked '?', meaning that the tutor is unaware of whether or not said node has been mastered). This is a prototypic case for highly adaptive tutoring. The tutor may configure the universal tutor to select and test the learner on nodes at or near the middle of a AST hierarchy. For example, options may be set so that success on the partially solved problem defined by a node implies success on all nodes lower in the AST hierarchy. Conversely, failure may imply failure on higher-level nodes (representing more difficult problems). In effect, single test items provide optimal amounts of information about what the learner does and does not know. Similarly, instruction might be targeted at those nodes for which prerequisites have been mastered, rather than subjecting all learners to the same instructional sequence. The latter is the norm in instructional technology because creating highly adaptive instruction is so difficult and time consuming. (Such inferences are strongly supported by empirical research, e.g., see Scandura, 2001a.)

It is clear to anyone skilled in the art that the range of instructional decisions associated with any given node is almost unlimited. Of particular relevance in the preferred embodiment when visiting any particular node is the learner status on that node, as well as on the node's descendents and ancestors. Deciding whether or not to test on the knowledge associated with a given node, for example, might reasonably depend on the amount of information such testing might provide. For example, empirical results indicate that testing on nodes near the middle of an AST make it possible to infer knowledge of both higher and lower level nodes (e.g., Scandura, 2001a). Thus, failure on a node also implies failure on higher-level nodes, whereas success implies success on lower level prerequisites. This makes it possible, respectively, to mark entire super-trees with a '−' or sub-trees with '+'. Similarly, descendents of given nodes have been shown empirically to act as prerequisites, prerequisites that must be mastered (e.g., marked +) before instruction on the given node is likely to be successful.

The options shown in FIG. 14 provide a wide, although obviously not exhaustive, range of options. These options can be set either during authoring or during instructional delivery, in both cases having direct and powerful impact on the kind of learning delivered. Most importantly in the preferred embodiment, the author can predetermine the choice of instructional modes available to the learner. In particular, the author can specify: a) whether instruction is to include diagnosis and/or tutoring, b) whether to simply simulate the behavior, c) whether to provide practice or d) whether to provide the learner with varying degrees of control over what to present next. In the last case, for example, the learner might determine what node comes next as well as whether the associated events involve testing and/or tutoring.

In the preferred embodiment, the author can predetermine: e) the initial status of learners (e.g., by presetting AST nodes to +, − or ?), f) basic instructional strategies (e.g., which node to start with during instruction and whether to base testing and/or instruction on prerequisite knowledge) and g) the amount of supplemental information (e.g., questions, instruction, corrective and positive feedback) to be presented, and under what conditions. It will apparent to those skilled in the art that any number of other options might be used.

In the preferred embodiment, instructional decisions would be made in accordance with the inventor's Structural Leaning Theory (e.g., Scandura, 2001a). This is a natural and preferred choice because of the direct and central role ASTs play in the theory and because the theory is highly operational in nature. Nonetheless, anyone skilled in the art will recognize that instructional decisions based on any number of other conceptual frameworks can be rationalized in terms of the kinds of options listed above and in FIG. 14.

Anyone skilled in the art understands that the evaluation of learner responses and reaction (feedback) thereto play a critical role in learning and instructional environments. Evaluation consists of matching learner responses with responses that either have been predetermined and/or are generated automatically during the course of instruction. In the preferred embodiment, responses are generated as revealed above either by executing subtrees defined by selected nodes in ASTs and/or by input-output and/or parent-child mappings.

The type of evaluation may vary widely. While anyone skilled in the art can devise any number of alternatives, evaluation in the preferred embodiment includes: h) exact matches between learner responses and responses determined by executing ASTs, i) determining whether learner responses (e.g., mouse clicks) fall in pre-designated regions, j) various kinds of probabilistic matching wherein responses meet prescribed or calculated probabilities and k) evaluation of learner responses by an external agent (e.g., teachers).

The preferred kind of evaluation of behavior may differ depending on the problem involved. In the preferred embodiment, for example, a distinction is made between problems that can be solved via a single knowledge AST and problems whose solutions require more than one (knowledge AST). Subtraction provides an example of the former type, as do those railroad-crossing problems that can be solved individually by the train, signal or gate procedures. In these cases, individual nodes in the requisite AST must be evaluated as above.

On the other hand, finding the position of gate, given the train's location, requires all three crossing procedures. Other problems, such as those described in Scandura (2001a), can only be solved by using higher as well as lower order rules. While there are many defensible (and useful) variations, it is assumed in the preferred embodiment that each knowledge AST required in solving a composite problem is known on all-or-none basis. This means effectively that each AST is tested on only one problem. If the learner solves a composite problem correctly, then it is assumed that each of the AST contributing to that success is known. One could reasonably make alternative assumptions, such as requiring nodes in each such AST to be evaluated as above.

FIG. 18 shows how the learner's status may be represented in the preferred embodiment. In the preferred embodiment, each node is marked with '?', '+' or '−' (and also could be 'a' or 'A'). Notice that binary decision nodes (e.g., TopGreaterThanBottom) are designated by '?(??)', where values inside the parentheses refer to true and false alternatives. Both must be true for the outside '?' to become '+', whereas any one '−' will make it '−'. In addition, each node includes the associated operation or decision, along with supplemental information (questions, instruction, feedback, etc.). In the preferred embodiment, the learner is also given the option of taking control of his environment at any point during the instruction.

Blackboard Windows and Making Problems and Other Information Observable.—Properties assigned to problem nodes (representing Problem Givens and/or Goals) provide a sufficient basis for communicating with learners. For example, such properties may refer to position on a display, kind of text or other observable (e.g., sound, picture, virtual display, animation, video clip). In the preferred embodiment, information is made observable in one or more windows, which by analogy to the classroom is called a Blackboard.

As anyone skilled in the art is aware, support for said properties may be provided in any number of ways. In the preferred embodiment native support is provided in a 'Blackboard' window for text, simple figures (lines, rectangles, ellipses, etc.) and other observables that can easily be generated directly. More complex observables, including sounds, pictures, animations, 3D, virtual reality, etc. are steadily evolving, and typically are the province of specialized developers. In the preferred embodiment, such observables are represented as files, which in turn are made observable using available readers, many of which are freely distributed (Macromedia's Flash).

When a problem type is selected, the values assigned to the initialized variables in said problem type (i.e., the values of nodes in problem Givens/Inputs ASTs) are automatically 'displayed' as dictated by the assigned properties. A full range of properties is supported in the preferred embodiment.

Output variables, which represent problem goals, are not assigned initial values. Success in determining the correct values of these goal variables means that the learner has acquired the specified knowledge. Thus, unlike problem givens, goat variables are initially unassigned. In the preferred embodiment, goal variables are initially displayed as placeholders (e.g., grey rectangles). The learner is required to respond (to problems) using available input devices. The choice of input devices is frequently limited to a keyboard and mouse.

More generally, properties assigned to values of output nodes correspond to the input modes available to the learner (e.g., keyboard, mouse, touch pad, stylus, voice activation, head set, etc.). Accordingly, properties assigned to goal variables designate kind of response.

In the preferred embodiment, making declarative knowledge (i.e., parent-child mappings) operational is often simpler using abstract values than using actual values. In addition to nodes, therefore, in the preferred embodiment, 'display' properties also are assigned to abstract values associated with nodes. (Abstract values, recall, represent different categories of values that may be distinguished and serve a useful role in learning and instruction) Since the number of abstract values assigned to a node is finite, possible abstract values (categories of values) may be presented as a choice from which the learner selects.

Semantic attributes are also assigned display properties specifying where and how such things as instruction, questions and feedback are to be made observable to a learner.

Finally, it must be emphasized that display properties apply at all stages in the solution of any problem, and independently of the instructional process. That is, the 'display' machinery is completely separate from diagnostic, tutoring and solution processes. Variables, abstract values, semantic attributes, etc. are all displayed (i.e., made observable) based solely on assigned properties, irrespective of the state of the system itself.

Summary.—In summary, knowledge ASTs, including both the processes to be acquired and represented at multiple levels of abstraction, and the data structures on which they operate, represent what is to be acquired. Semantic attributes assigned to nodes in said ASTs provide supplemental information useful in diagnosis and instruction (e.g., questions, instruction, feedback). Semantic attributes also make it possible to define the learner model, indicating what individual learners do and do not know both initially and at any subsequent point in time.

Display properties assigned to nodes in problem type ASTs (possibly but not necessarily derived from data ASTs associated with knowledge to be acquired) define how information is to be represented in an observable interface (aka 'blackboard') to learners and how to receive responses from learners. A wide variety of diagnostic and tutoring options provide constraints on learner and/or automated tutor control of the learning environment. The "Blackboard" environment, supports interactions with learners by representing observables allowing the tutor and learner to communicate. Values, abstract values and semantic attributes, including learner status, are made observable in said blackboard based on the attributes assigned to variables (nodes), abstract values and/or semantic attributes. These 'display' attributes are assigned independently of the content in question. Neither the learner nor the tutor need be concerned with these properties.

The methods described above reveal how to generate and solve all possible problems associated with any given set of knowledge ASTs. Problems are generated either by construction or by applying knowledge ASTs to data ASTs up to predetermined node. Solutions to said problems are generated by executing the operations (values) associated with all nodes below said given node. Learner responses are evaluated by comparing said responses with those so generated.

These methods also reveal how the learning environment may be controlled both by various options (e.g., diagnosis and/or tutoring, presenting feedback), by traversal method (whether under automated or learner control) and various kinds of decision making based on those options and the learner model. Given ASTs represented in this manner, it is clear to anyone skilled in the art that any number of ways can be devised to promote learning based entirely on said ASTs (representing the behavior and/or underlying processes to be acquired).

Although the preferred embodiment is based on the Structural Learning Theory, it is clear to anyone skilled in the art that the revealed options, and others that may easily be added, provide a sound foundation for delivering a wide variety instructional models. Furthermore, the few examples presented clearly are only prototypes. It is clear to anyone skilled in the art that the methods revealed might be applied to essentially any type of content. The above examples are all highly structured, in which case the knowledge ASTs are sufficient for solving all problems in a domain. The methods revealed above, however, also apply to less well defined problem domains. For example, in broad based problem solving domains it may not be possible to construct knowledge ASTs that are adequate for solving all potential problems (in the domain). However, such ASTs still provide a useful, albeit incomplete basis for diagnosis and instruction. The only difference is that incomplete and/or inconsistent knowledge representations cannot guarantee learning. Any limitations as to content are solely a function of the ingenuity and resourcefulness of the author.

Knowledge ASTs also make it possible to define almost any kind of learning and/or tutorial environment. For example, while not detailed herein, it is clear that the learner might be allowed to construct problems of his own, wherein said problems may be solved by application of the available knowledge ASTs. The result would serve the learner as automated performance aid. More generally, the learner and/or tutor may generate problems defined by said ASTs, generate solutions to said problems, evaluate learner responses to said problems and provide varying degrees of information during the course of testing (e.g., for diagnosis) and instruction (including, e.g., context, instruction, questions, and feedback).

Range of Application: The methods revealed in U.S. Pat. No. 6,275,976 (Scandura, 2001) and Scandura (2003) are illustrated with sample procedural content. The example, of Column Subtraction can obviously be extended to other arithmetic and algebraic tasks, including basic (e.g., arithmetic) facts and concepts, which are special cases of procedural knowledge. (As above, the latter because of their simplicity require even less input from the author.) The simple Railroad Crossing Model illustrates declarative as well as procedural knowledge. It also illustrates how these methods may be used to model simple problem solving (forward chaining) in well-defined domains.

While these examples are illustrative of the AST models that can be constructed, these examples barely scratch the surface. As illustrated above, it will be clear to anyone skilled in the art how these methods can be extended to ill-defined domains (e.g., U.S. Pat. No. 6,275,976), which include domain independent knowledge.

It also will be clear to those skilled in the art how the methods revealed complement recent emphases on learning objects (e.g., SCORM), including those built with powerful multi-media authoring systems, such as Macromedia's Flash. While reusable learning objects open new opportunities in instructional technology, deciding how to combine these learning objects to achieve given purposes remains the major problem. The methods revealed herein show how individual learning objects (e.g., produced by tools such as Macromedia Flash) may be organized and represented as ASTs. They also reveal how ASTs provide a sound foundation for automatically guiding interaction with learners.

Preferred Embodiment. The preferred embodiment was implemented using the dialogs shown in FIGS. 1-10 and involves the following:

Knowledge Representation.—Knowledge Representation is based patented processes to create internally consistent specifications and designs represented as ASTs. The preferred embodiment consists of AutoBuilder, a Blackboard Editor and associated display system and a General Purpose Intelligent Tutor (GPIT). AutoBuilder is a software system, which makes it possible to represent arbitrary content as ASTs at multiple levels of abstraction. As any one skilled in the art knows, ASTs may be represented in any number of formally equivalent ways. Whereas any number of other methods may be used for this purpose, the preferred AutoBuilder embodiment makes it possible to create content ASTs in an unambiguous manner so that each level represents equivalent content. This AutoBuilder representation makes it possible to represent both specifications (i.e., behavior) for the input-output behavior and the underlying design processes (i.e., knowledge) associated with that behavior. Content may be represented either by single specification and design ASTs or by any finite number of such ASTs. AutoBuilder is based on methods revealed in U.S. Pat. No. 6,275,976 (Scandura, 2001) and associated theory further elaborated in Scandura (2003).

Although ASTs make it possible to represent both procedural and declarative knowledge, they may be used to represent either kind without the other. In the preferred embodiment, for example, specifying parent-child mappings is not required in representing procedural knowledge—because parent-child mappings are not needed by the General Purpose Tutor (see below) in this case. Hierarchies of Input-Output data structures are still useful, however, because they provide valuable help in suggesting corresponding procedural refinements (as per Table 1). Data structures also are useful in constructing problems (e.g., prototype refinements, such as CurrentColumn, facilitate constructing copies, such as Ones and Tens columns).

As we have seen above, special cases of procedural knowledge, such as Facts and Concepts, require even less input from the author. Solution procedures in these cases can be constructed automatically given only the specific facts and concepts to be learned (i.e., problems to be solved).

Conversely, representing and executing declarative knowledge depends solely on Parent-Child mappings. For example, knowing the status of train, signal and gate is sufficient to determine whether or not a crossing is working. In the preferred embodiment, declarative behavior (e.g., test problems) can be constructed automatically from these mappings.

As shown above, models include both declarative and procedural knowledge. Model representations are also more general than procedural knowledge. In addition to including declarative knowledge, ASTs representing models make it possible to solve problems requiring the use of more than one procedure. Such problems may be constructed, for example, from inputs associated with one procedure in the model and the outputs associated with another. In the current implementation, forward chaining is the control mechanism used to combine the generative power of individual procedures (e.g., train, signal) in model representations.

In the preferred implementation, this control mechanism is further generalized to the universal control mechanism revealed in U.S. Pat. No. 6,275,976 (e.g., Scandura, 2001). (Scandura, 2001a, provides a simpler overview of the universal control mechanism in the context of the Structural Learning Theory.) Universal control provides explicit support for higher order knowledge ASTs, which operate on and/or generate other knowledge ASTs. Higher order knowledge AST, for example, might provide the connection (i.e., mapping) between arithmetic algorithms (e.g., column subtraction and addition) and their more concrete realizations. The latter, for example, might involve the regrouping and manipulation of concrete objects consisting of single (ones), tens, and larger groupings of dowels or Dienes blocks.

In this example, Parent-Child mappings between different levels of abstraction in the subtraction algorithm represent declarative knowledge about the process of column subtraction. Higher order procedural knowledge maps (input) operations in column subtraction to corresponding (output) concrete operations—or vice versa.

Blackboard Editor.—The Blackboard Editor used to create/specify schemata depicting the layout and "display" properties indicating how problems and solution processes, including supplemental information specified by semantic attributes, are to be represented and displayed to the learner. These schemata are essentially instantiations of input-output specifications created with AutoBuilder with specified input values, and intermediate steps in the solution process—together with various "display" properties. These "display" properties are used to specify how information (e.g., instruction and feedback from learners) is to be exchanged between learner and tutor, for example, how said problems and intermediate steps in solving such problems are to be displayed or otherwise made observable for purposes of communication between tutor and learner. Problems and instruction may be associated with individual design ASTs or with sets of design ASTs.

Learner Model.—The Learner Model is defined by assigning a status to each problem type and to each node in the knowledge (i.e., design) ASTs. In the preferred embodiment, each said problem type and each said node is designated as unknown (−), undetermined (?), known (+) and automated (A). Not all nodes need be automated (only those which are specified). In the preferred embodiment, to be automated nodes are designated with a lower case 'a'. This is converted to upper case once said node has been automated.

General Purpose Intelligent Tutor (GPIT).—The present disclosure also reveals a General Purpose Intelligent Tutor (GPIT), which controls interactions between GPIT and the learner via the Blackboard. Said interactions are based on the content ASTs, the learner model and preset tutor/learner control options. In the preferred embodiment, the latter (control options) make it possible to customize the GPIT to provide a variety of kinds of instruction—ranging from highly adaptive instruction to simulation and performance aid, and variations in between (e.g., progressive instruction beginning with the simplest tasks and with increasing complexity).

The GPIT determines what problems, solution steps, instructions, questions and feedback to present to the learner and when to present them, as well as how to evaluate and react to learner feedback, based entirely on said ASTs, Learner Model and control options.

Decision Making and Built in Interpreter.—In the preferred embodiment, the GPIT is an event handler (a/k/a server) with persistent AST data representing the content to be learned, the learner model (which is superimposed on said content AST) and said control options. The GPIT also has a built in interpreter that can be used to generate both input-output and parent-child behavior as specified in a knowledge AST. The GPIT has complete access to the ASTs, Learner Model and control options. This access is used by GPIT both for purposes of execution and to make diagnostic, tutorial and related decisions. The learner has access to that portion of said information that has been authorized by the author.

In adaptive mode, for example, the GPIT presents at each stage of learning a test item, which determines a maximal amount of information about what the learner already knows and does not know about the content. The GPITs knowledge of the learner's status is updated each time it receives feedback from the learner. In one configuration, the GPIT presents instruction only when the learner's response indicates that he or she has mastered all necessary prerequisites.

Display Independence.—In all cases, tire 'display' properties operate completely independently in the preferred embodiment. Whereas the GPIT determines what is to be presented at each point in the process, the display properties determine where and the manner in which they are made observable.

Preferred Implementation.—In the preferred embodiment, the Blackboard display is either a web browser or an Event Handler, with its own interface (e.g., Window). The Blackboard displays outputs generated by the GPIT and receives responses from the learner. The Blackboard's callback logic makes it possible for the GPIT and learner to automatically exchange information between themselves. The General Purpose Intelligent Tutor (GPIT) also is an event handler, whose callback logic presents information to and receives information from the Learner based solely on the content ASTs, the Learner Model and Customization options determined by the author and/or learner.

Atomic versus Refined Designs.—Solving problems in the preferred embodiment may involve any number of designs. In the preferred embodiment, when multiple designs are required to solve given problems, the designs are viewed as atomic—meaning that the author is not concerned with distinguishing partial knowledge. This is often the case in complex problem solving where the emphasis is on knowing whether learners know individual designs "well enough" to combine them effectively to solve given problems. Although a variety of means may be used to combine multiple designs in problem solving (e.g., forward or backward chaining), solving such problems in the preferred embodiment is in accordance with a universal control mechanism (e.g., U.S. Pat. No. 6,275,976, Scandura, 2001), and may involve both domain specific and domain independent knowledge in accordance with the Structural Learning Theory (Scandura, 2001a).

In contrast, problems used in conjunction with design specific problems typically put emphasis on detailed diagnosis and tutoring. Given any problem (i.e., an initialized specification for the design), individual nodes in said design ASTs define both specific sub-problems to be solved and the associated requisite knowledge to be learned. The operations (designated by nodes) and their parameters represent to be learned behavior and knowledge at various levels of abstraction. The parameters represent the data associated with (sub) problems solvable by the corresponding operation. Mastery of the knowledge associated with any given node, is demonstrated by the learner's the ability to perform ALL steps in the subtree defined by said node. Initial problems are 'displayed' automatically based on properties assigned to parameters. The values of output variables generated during the course of execution (in solving the problems) are displayed similarly. Corresponding goal variables associated with sub-problems are 'displayed' in accordance with specified response properties (e.g., typed keys).

Nodes may also be specified as to-be-automated. In this case, once the corresponding operation has been learned, the learner is tested only on specified output (or input-output) variables within optional time limits. In effect, automation nodes correspond to operations that are so important that being able to solve them step by step (using prerequisite knowledge) is not sufficient. The learner must demonstrate the ability to generate required results without going through intermediate steps in some acceptable time. In the preferred embodiment, output variables associated with automation nodes may be suppressed (i.e., not displayed). Suppressing an output variable in this manner forces the learner to perform corresponding steps in his or her head, something inherent with the notion of automation.

Semantic Attributes.—Semantic attributes assigned to problems and/or design nodes in the preferred embodiment include supplemental instruction, questions, positive and corrective feedback. These attributes are used to determine what supplemental information to present (questions, instruction, feedback) in addition to the problems and/or solutions themselves. As above, properties assigned to these attributes determine how the semantic attributes are to be 'displayed' (e.g., as text, audio, video, etc.) in the learning-tutoring environment. Alternatively, instruction, questions and even feedback can often be generated automatically from the specified operations themselves. For example, in the preferred embodiment, the name of the operation in a node may be used to provide default instruction. This works quite well in practice when operation names accurately describe the operation at an appropriate level of abstraction.

Display, Response and Evaluation Properties.—Problem variables represent observables used in communication between tutor and learner. Input variables are displayed on a Blackboard in accordance with specified properties (e.g., positions, type of object, selections). These properties determine specifics as to: a) what (e.g., values, sounds, video, etc.) to present, b) where (position), when and how long, c) the kind of feedback to be obtained (e.g., values, positions, selections) and d) the method to be used in evaluating the user responses (e.g., exact, region, probabilistic, "fuzzy", external).

For example, output variables are assigned 'display' properties. In the preferred embodiment, for purposes of simplicity, the properties assigned to display, response and evaluation types have direct parallels: a) display type (e.g., text, shape, selection), b) response or answer type (e.g., edit box [for text], click [for shape] or combo box [for conditions]) and c) evaluation type (e.g., exact [for text], within [for shape], exact match [for selection]) or even external (or self) evaluation.

There is, however, no direct connection. In the preferred embodiment, for example, an external agent also may evaluate answers. Anyone skilled in the art can easily devise the following and other means. Thus, display types might include headsets; response type might include touching the screen or voice; evaluation might include probabilities, Bayesian logic or "fuzzy" sets.

Control Options.—In the preferred embodiment, control of interactive processes (selection of problem AST and/or node in knowledge AST) can be distributed between the automated GPIT and the learner according to pre-specified options. Nonetheless, it is clear that such options might be allocated dynamically.

Because the GPIT is specified independently of specific semantics, only on the AST structure of the to-be-learned content—there are any number of methods that might be used to guide learning, testing and/or instruction. As detailed above, the mode of learning and instruction may be fully customized in the preferred embodiment. For example, instruction may be highly adaptive and designed to insure specified learning in the least possible time. Alternatively, it might be configured as a purely diagnostic instrument. Or, instruction might systematically progress from simplest knowledge (e.g., corresponding to prerequisites) to increasingly complex knowledge. It might also be configured for practice, or to act a simple performance aid assisting the learner to perform on some specified set of tasks. At the other extreme the system might be configured to allow the learner to guide his or her own instruction and/or self-directed exploration of the content.

Part 3

As summarized in BACKGROUND OF INVENTION, it is well known to those skilled in the art that instructional systems include one or more learners, to be acquired content, some means of presenting information to and receiving responses from learners and a tutor capable of making decisions as to what to test or teach. In Intelligent Tutoring Systems (ITS) these decisions are based on what the ITS knows about what the learner knows.

This background also includes a summary of recent discoveries having direct implications for the present disclosure. Specifically, the applicant's Structural Learning Theory (SLT) provides a comprehensive and rigorous theoretical framework for explaining, predicting and controlling problem solving behavior, with particular attention to interactions between teachers and learners (e.g., Scandura, 1971, 1973, 1977, 2001a, 2003, contemporaneously updated and further refined in Scandura, 2005, 2007. 2009). Structural (Cognitive Task) Analysis (SA) comprises an essential part of the SLT and is used to construct finite sets of higher and lower order SLT rules. Each SLT rule is comprised of a hierarchical Abstract Syntax Tree (AST) representing procedural knowledge at multiple levels of abstraction. Each node in a procedural AST consists of an operation or decision operating on hierarchical data structures also based on ASTs (often called declarative knowledge) on which the procedural node operates (e.g., Scandura, 2003). Because an SLT rule consists of both a procedural AST and the structural AST on which it operates, the terms "SLT rule", "ASTs", "AST based knowledge representation", etc. are used interchangeably both herein and in the literature (e.g., Scandura, 2001, 2003, 2005, 2007, 2009).

The present disclosure builds on this knowledge base and teaches both how to more efficiently create highly adaptive and configurable tutoring systems, and how such tutoring systems operate to deliver effective highly individualized and easily configurable tutoring.

Authoring instructional software is well known to require both a human and a computer implemented system, in the contemporaneous literature and the preferred embodiment referred to as the AuthorIT authoring system. Delivery of the completed tutorial is accomplished by a tutoring system, in the contemporaneous literature and the preferred embodiment known as TutorIT. To facilitate understanding, PART 1 of this specification is original and pulls provides an up to date teaching. PART 2 of this specification is largely a repeat of the original patent application Ser. No. 10/249,355 for which this specification is a continuation in part.

This concluding section, PART 3, calls attention to specific reference to paragraphs in the original patent application Ser. No. 10/249,355. A human author:
a) Specifies, selects or is given a finite set of problems in some problem domain representing the content to be learned, wherein said problems are representative of the kinds of problems students are to learn how to solve. (See paragraphs 0039-0042.)
b) Paragraphs 0041-42 show the close relationship between problems and data structures, including higher order knowledge; paragraphs 0043-44, the notion of behavioral equivalence in hierarchical representations; paragraphs 0045-56 show how the process of Structural Analysis makes it possible to systematically represent knowledge at multiple levels of behaviorally equivalent refinement based on small number of basic structural and corresponding procedural refinement types: component, prototype, category, dynamic and their procedural counterparts: parallel, selection, abstract operation or interaction plus sequence; see Paragraphs 0045-54. This refinement process is continued until all terminal nodes are judged by the author to be atomic, Paragraph 0043, although not necessarily executable, Paragraph 0046). In the preferred embodiment, AuthorIT's AutoBuilder component is used to create SLT rules at multiple levels of refinement (see paragraphs represented as Flexforms (see a specification data AST in FIG. 1; procedural ASTs in FIGS. 2-4). It should be noted that atomic nodes correspond to knowledge that all learners either know on entry (as prerequisites) or for which they have sufficient background and are capable of learning without more detailed analysis,
c) When a terminal node in a said SLT rule is not executable on a computer, using AuthorIT's AutoBuilder/Softbuilder component to make each said terminal node in the procedural AST in each SLT rule specification executable on a computer, implementing each terminal node in AuthorIT's High Level Design (HLD) language (i.e., as described in Paragraphs 0061-67, esp. see 0064 for HLD),
d) Using AuthorIT's Blackboard Editor and/or AutoBuilder component to construct and/or specify means for constructing a set of problem schemas, wherein this is accomplished in Blackboard Editor in a visual environment and in AutoBuilder by editing nodes in the Flexform itself, acting as a database or repository for all information associated with said Flexform. Irrespective of how entered, each problem schema corresponds to an AST-based data structure on which said SLT rule operates, including input, output and intermediate variables necessary for representing subproblems at each stage of execution (e.g., see FIGS. 9 and 10). Each prototype refinement in a data structure, for example, represents any number of elements having the same structure in the corresponding problem (e.g., paragraph 0048).
e) Using AuthorIT's Blackboard Editor to lay out said problem schemas (see data AST on the left side of FIG. 9). Similar information is shown for other problems (on the left side of FIGS. 11, 12, 13). Properties may be assigned to individual display elements as illustrated in FIG. 10. Solution to problems (e.g., shown in FIG. 13) may require more than one SLT rule—in this case, chaining two SLT rules (ASTs). Given such a problem the Author must:
1. Define an interface specifying where elements in said problem data are to be displayed to learners using AuthorIT's Blackboard. The right side (FIG. 9) shows where problem elements are to appear. Grey boxes represent where learner responses in the form of text/keyboard entry, mouse click, etc, are required (e.g., see FIGS. 9, 12, 13). Also shown are where the Questions, Instruction, Feedback and Corrective Feedback in f) are to be displayed (FIG. 9). (FIGS. 9, 11, 12, 13 illustrate other displayed elements.)
2. Define properties specifying how elements are to "appear". The value of the variable Bottom is to be displayed as text (see FIG. 9), but it could just as easily be displayed as a Flash file, line, rectangle, sound, etc.

(see FIG. 10. Other properties specify kind of output (text, sound, animation, picture, etc.) and kind of learner response (text, click, etc.)., (FIG. 15 shows both input and output or response types.) In effect, variables can be "displayed" in many different ways. (FIGS. 10, 15 show that elements may be text, Flash files, lines, etc.). Different types of responses may be required (text, click within a region, etc.) [e.g., see Paragraph 0106]. Type of response indirectly but necessarily determines the kind of evaluation required—text responses require matching, clicks require a target area or location, etc.

f) AuthorIT AutoBuilder's "Edit Tutor Fields" dialog (see FIG. 8) shows how to assign text and media to instruction, questions, feedback and corrective feedback to nodes in SLT rules (e.g., see data in FIG. 8 as they are to be "displayed" on the Blackboard interface (FIG. 9) and g) AuthorIT's Options Tool component is used to specify parameters defining the tutoring process, how TutorIT is to make testing, instructional and feedback decisions based on structure of an SLT rule, independently of semantics of the problem domain (e.g., see FIG. 14). Any number of options may be made available in TutorIT allowing users to customize TutorIT delivery.

TutorIT is used in the preferred embodiment referred to:

a) Receive authoring output, including SLT rules representing to-be-learned knowledge with instructions, questions and feedback media associated with individual nodes, a set of problems or means for generating problems with associated Blackboard layout information, specifications for displaying problems and media, for receiving learner responses (on blackboard interface), how learner responses are to be evaluated and TutorIT delivery options for defining how pedagogical decisions are to take place. TutorIT may also allow teachers or students to customize delivery by choosing from Options received from the authoring system.

b) Define a Learner Model as an overlay on a SLT rule, wherein labels attached to nodes designate what TutorIT knows about the current status of the student: marked '+' in the preferred embodiment when TutorIT knows knowledge on a node is known to the student, '−' when unknown, '?' when yet to be determined. (FIG. 18 shows a sample Learner model with all nodes marked ?)

c) Select a given problem (see FIG. 9, also FIGS. 16 & 17, and Paragraphs 0115-127), d) Select a SLT rule or rules which may be used individually or collectively (see paragraphs 0087-88) to solve said problem (see FIG. 2). In the latter case, one generates a SLT solution rule from other SLT rules via chaining, or other control mechanisms used in expert systems or in the preferred embodiment SLT's universal control mechanism (e.g., see paragraphs. 0109-111, 0180-181. 0191, 0087-89), e) Select a node in SLT rule traversed when solving a selected problem of step d) during the course of executing said SLT rule of step c) in accordance with said options in step a), said selection being made in accordance with said TutorIT delivery options in step a) (e.g., paragraphs 0128-141 & esp. 0124), f) Generate a partially solved (sub) problem and its solution by executing the AST-based SLT rule.
1. Execution up to said selected node in step e) generates a partially solved (sub) problem. (See FIGS. 16, 17; also see paragraph 00168 which summarizes the process.) Said execution on said problem defines an unique sub-problem of said selected problem corresponding to said selected node (e.g., paragraphs 0119-0127, esp. 0124), said execution may be in a depth first or otherwise (Paragraphs 0128-0141).
2. The solution is generated by continuing said execution on the AST subtree defined by said node in step e). The result of execution gives the solution to the {sub} problem (e.g., para. 0119-127, esp. 0124).

g) Displaying said (sub) problem, including given values, to be determined outputs, intermediate variables, and supporting questions, instruction, positive and corrective feedback on said Blackboard interface (e.g., FIGS. 9, 12, 13; also paragraphs 0158-0165), h) Present a question or provide instruction on said (sub) problem.

i) When instruction is given, update the Learner model. Because it is impossible to know for sure whether the learner has actually learned, for example, the learners status might reasonably be set to "?". (see paragraphs 0142-0157, esp. 0151-152), j) When (sub)problem is displayed on the Blackboard, receiving the learner's response (e.g., paragraphs 0148, 0149-0153) for variables displayed as response placeholders (shown in grey in FIGS. 16 & 17) whose values have been generated in step g) (see paragraphs 0119-127), k) Evaluate the learner's response by comparing learner responses with solutions generated via TutorIT by execution of step g) (see paragraphs 0142-157, especially 0146), l) Update the learner's status in the Learner Model. When evaluation satisfies options defining criteria for success, update Learner Model (e.g., by setting said node in step e) in the Learner Model to known "+") and provide positive feedback to the learner (e.g., See FIG. 14 used to define delivery options; paragraphs 0142-157; also compare FIGS. 16, 17 showing questions and FIG. 9 showing where feedback is to appear). When evaluation does not satisfy success criteria (See FIG. 14), update Learner Model by setting the node status to unknown "−" and provide corrective feedback (e.g., paragraphs 0142-157; also compare FIGS. 16, 17 showing questions and FIG. 9 showing where corrective feedback is to appear).

EXAMPLE BASED ON SPECIFICATION: A typical scenario in steps h) through l) might go as follows:

1. When a node status in the Learner Model is unknown "−", provide instruction associated with said node and change the status in said Learner Model to ? as it is impossible to know without testing whether the learner has actually teamed (paragraphs 0142-157, esp. 0146 & 0151),
2. When a node status is yet to be determined (i.e., is marked "?"), display the (sub)problem on TutorIT's Blackboard, wherein values of those variables in step f) that have been determined on entry to said selected node represent the givens in said (sub)problem. Given a correct response, change the status of the node to +; otherwise to "−" (FIGS. 16, 17; also see summary in paragraph 0146, also see 0142-157).
3. When the status of the node is marked known "+", skip except where the node has been selected for special treatment (e.g., automation requiring faster response) (e.g., see paragraph 0157).
4. The Options Tool might also be used to give learners the choice on given test or question items to either respond with an answer if they think they know the answer, or to ask for varying degrees of help.

m) Make inferences as to the status of other nodes in the Learner Model based on options set in the Options Tool. For example, when the status of a node is known (+), mark as known (+) all lower level nodes traversed in generating a solution. Conversely, mark all higher level nodes unknown (e.g. see paragraphs 0142-157, esp. paragraphs 0148-149).

n) The above steps c) through m) are repeated as necessary until a learner demonstrates a specified level of mastery. TutorIT makes decisions as to what node in what SLT rule is selected next based on the learner status (FIG. 18) and specifications in the Options Tool (FIG. 14). A typical scenario would be to select a higher level node on success and a lower level node on failure.

In general, TutorIT starts with an SLT rule and selects a problem. TutorIT then selects an eligible node, generates a (sub)problem defined by said node along with its solution. Depending on the status of said node in the Learner Model, a partially solved (sub)problem is displayed on said Blackboard as a question or instruction. When displayed as a problem, learner responses are obtained and compared with solutions generated by TutorIT. Feedback is provided, and node status in the Learner Model is updated. Based on options preset by the author, inferences are made about the status of other nodes and the Learner Model is updated accordingly (e.g., see FIG. 18). Finally, decisions are made as to what nodes in given SLT rules are to be tested next and the process is repeated (e.g., see Paragraphs 0143-0158).

For example, nodes marked unknown (−), essentially demand instruction. Once instruction is given, however, one cannot be sure instruction has been effective. Hence, node status might reasonably be marked unknown (?) until its true status is determined by subsequent testing. (See para. 0142-0157)

The specification also reveals multiple variations, as well as generalization to ill-defined domains involving higher order knowledge, special cases involving simple kinds of lower order knowledge and intermediate kinds of model based knowledge involving both structural and procedural knowledge. We specifically showed how solving a problem in ill-defined domains might require more than one SLT rule (e.g., paragraph 0181). Applicant's earlier patent (U.S. Pat. No. 6,275,976) formalizes the Universal Control Mechanism (UCM) which has played a central role SLT for many years [e.g., see paragraph 0111].

Given a complex domain containing problems for which no one SLT solution rule is sufficient for solution, TutorIT selects a problem, and displays said problem on the blackboard as defined during authoring. When more than one SLT rule is required, these rules are used to collectively to generate a new SLT solution rule for said problem. As above, UCM may also be used in conjunction with SLT rules and higher order rules to generate a SLT solution rule for any problem. In each case, TutorIT receives the learner's response. Depending on what options are set, TutorIT may determine the status of nodes in the derived SLT rule or treat the SLT rules used in its derivation individually (i.e., provide diagnosis and remediation/instruction on each individually).

Chaining represents a particularly simple but limited case of a control mechanism, sufficient in model based knowledge as illustrated in (FIG. 5, which shows how two rules may be used to generate solutions both individually and via chaining; also see FIGS. 1, 12 and 13). This example also illustrates how so-called declarative knowledge may be taught explicitly by requiring learners to make decisions explicitly (e.g., train in or out of the crossing). Simple associative knowledge represents the simplest case in which case the SLT rules (ASTs) effectively involve sets of simple input-output pairs (see FIG. 15).

To summarize, this disclosure shows how the knowledge needed for success in any given problem domain can be represented in terms of SLT rules, how a learner model and pedagogical decisions as to what and when to test, instruct and provide positive and negative feedback can be defined with respect to the structure of those SLT rules—and how those pedagogical decisions can be made independently of content semantics. We also disclosed how these methods can be used or adapted for use with content domains ranging from the simplest to the most complex.

I claim:

1. A computer implemented method comprising one of selecting and receiving a problem domain, said problem domain containing problems defining behavior to-be-learned by at least one student, wherein said method includes a knowledge representation tool, wherein said knowledge representation tool enables at least one author to specify to-be-learned knowledge in sufficient detail to enable said student to solve problems in said problem domain and an interface creation tool, wherein said interface creation tool enables said author to define at least one medium through which to interact with said student, said computer implemented authoring method comprising the steps of:
   a) Constructing a SLT rule for solving problems in said problem domain, wherein said SLT rule consists of at least one data node and one procedure node,
   b) Constructing said SLT rule further consists of constructing an AST data structure and a procedure AST that operates on said AST data structure; wherein said AST data structure and said AST procedure are constructed by successive refinement of nodes,
   c) For each terminal node in said procedure AST, making said terminal node executable on a computer by providing said terminal node with means for specifying outputs of said terminal node,
   d) Assigning information, including associated media, to nodes in said SLT rule, to convey at least one of instruction, question, positive feedback and corrective feedback,
   e) Constructing at least one AST-based problem, each said problem being a data structure AST serving as data for said SLT rule, and
   f) Using said interface creation tool to assign attributes to nodes in each said AST based problem, including attributes defining at least one of location, how problem nodes are to be displayed on said interface, kinds of responses students are to provide and how student responses are to be evaluated, and
   g) Defining at least one method for interacting with said student, wherein said method includes at least one of mastery options, delivery options and interference methods specifying how tutoring decisions are to be made.

2. A computer implemented method in accordance with claim 1, wherein problems in said problem domain and said SLT rule for solving problems in said problem domain serve as inputs to a computer implemented automated general purpose tutor delivery system for delivering said content specified to at least one said student, wherein said automated general purpose tutor delivery system makes diagnostic, remedial and mastery decisions independently of the semantics of said to-be-learned SLT rule, wherein said automated general purpose tutor delivery system interacts with each said student using the interface created with said interface creation tool, said delivery method comprising the steps of:
   a) Receiving the output of said authoring in claim 1 as input, wherein said input includes an SLT rule, at least one problem that can be solved by said SLT rule, attributes for displaying problems on said interface, and a method of interacting with said student, wherein said method includes at least one of and mastery options, delivery options and inferencing methods specifying how tutoring decisions are to be made, b) Selecting a problem and a node in said SLT rule, c) Generating a sub-problem of said problem, wherein said sub-problem is generated by executing said SLT rule up to one of said node in said SLT rule and the top level node in said SLT rule, d) Generating a solution to said sub-problem by completing execution of said SLT rule on said sub-problem, e) Displaying said sub-problem on said interface in accordance with values and attributes assigned to input nodes in said sub-problem and response types of goal nodes in said sub-problem as specified in step e) of claim 1, f) One of asking a question and presenting instruction on said sub-problem, g) When instruction on said sub-problem is given on said interface, adjusting the mastery status of said student on said node defining said sub-problem as specified in step f) of claim 1, h) When a question on said sub-problem is displayed on said interface, receiving a response from said student, i) Evaluating said student response by comparing said student response with said solution and one of providing feedback to said student and not providing said feedback, j) Updating said student's status on said node based on said mastery and delivery options and the results of said evaluation of step i), k) One of making and not making inferences as to student status on other nodes based on said updating in accordance with said mastery and delivery options, and l) Repeating steps b) through k) until the student has demonstrated said level of mastery specified in said mastery options received in step a).

3. A computer implemented method in accordance with claim 1 wherein constructing the AST data structure and the AST procedure in any given SLT rule further comprises the steps of:

a) Defining the input-output behavior said SLT rule is to account for, wherein said behavior may be defined by selecting a name for each input and each output variable of said procedure AST, wherein said variables comprise the top level in said SLT rule's AST data structure, b) Selecting a name for the top-level operation in said AST procedure that generates said input-output behavior, wherein said operation comprises the top level in said SLT rule's procedure AST, c) Selecting an input variable in said AST data structure and refining said input variable into one of a component refinement and a category refinement and a prototype refinement and a dynamic refinement and a terminal refinement, wherein said terminal refinement has no child nodes, d) Selecting an operation in the procedural AST of said SLT rule and refining said operation into one of a sequence refinement, a parallel refinement, a selection refinement, a loop refinement and an interaction refinement, wherein each said procedural refinement consists of said operation and one or more child operations, and a terminal refinement wherein said operation is terminal and has no child nodes and e) Repeating said steps c) through d) until all terminal nodes in said AST data structure and in said procedure AST are represented in sufficient detail that one of said author cannot or decides not to attempt further refinement and said author decides that all students in said target student population are able to understand instruction directed at solving problems associated with said terminal operations.

4. A computer implemented method in accordance with claim 1 wherein making said terminal operation in said step c) executable is implemented using a type-less language, wherein data structures are hierarchies of elements.

5. A computer implemented method in accordance with claim 1 wherein problems in said problem domain are constructed from AST-data structures further comprises:

a) Receiving an AST Data Structure, b) Selecting a node in said AST Data Structure, c) When said node is a terminal input node, assigning a value to said input node, d) When said input node is the parent of an AST data structure with a fixed number of child nodes, assigning values to each said child node, e) When said input node is the parent of an AST data structure of a variable number of child nodes, each said child node having the same AST sub-structure, wherein said AST data structure is called a prototype AST, creating a finite number of child AST data structures and assigning values to nodes in each said child AST data structure, f) When said node is an output node in said AST Data Structure, making said node a Goal node of said problem and g) Repeating said steps b) through f) until all nodes are terminal nodes.

6. A computer implemented method in accordance with claim 1 wherein terminal operations in said procedure AST of said SLT rule constitute prerequisites that are assumed to be one of mastered by students prior to entry and learnable as a whole without further decomposition.

7. A computer implemented method in accordance with claim 1 wherein the method in said step g) for interacting with said student includes at least one of the following steps:

a) defining a delivery mode, wherein each said delivery mode consists of some variant of at least one of adaptive, instructional, diagnostic, simulation, practice and student controlled, b) specifying assumptions regarding the initial status of students on individual nodes of said SLT rules, c) specifying how the structure of said SLT rule is to be used in deciding at least one of what is to be presented next, the criteria to be used to update student status and criteria for selecting nodes in said SLT rules.

8. A computer implemented method in accordance with in claim 2 wherein the status on entry of each said student on each said node in said SLT rule is one of undetermined, known to have been mastered and known to be unknown.

9. A computer implemented method in accordance with claim 2, wherein nodes in said SLT rule of step b) are selected at each step at levels that maximize the amount of information concerning the status of each said student.

10. A computer implemented method in accordance with claim 2 wherein step c) comprises the following steps:

a) Generating a sub-problem of said problem in step c) by executing said SLT rule on said problem in a depth first traversal up to entry to said selected node of step b) including given and generated values of said node variables and place holders for said node variables whose values have not been generated and b) Generating values for said placeholders by continuing said execution on the sub-tree defined by said selected node of step b), wherein said values constitute the solution to said sub-problem.

11. A computer implemented method in accordance with claim 2 wherein step f) of asking a question or presenting instruction on a problem further comprises:
   a) When said automated general purpose tutor delivery system has determined the status of said node to be unknown, one of presenting instruction on said sub-problem and not presenting instruction on said node,
   b) When said automated general purpose tutor delivery system of has determined the status of said node is undetermined, one of asking a question on said sub-problem and not asking said question, and
   c) When said automated general purpose tutor delivery system has determined the status of said node to be known, one of skipping and imposing more specialized automation requirements on said node.

12. A computer implemented method in accordance with claim 2 wherein step j) of updating said student's status further comprises:
   a) When said student's response on a node is correct, one of providing positive feedback to said student and not providing said feedback,
   b) When said mastery options have been met, setting the student's status to known,
   c) When said student's response for a node is incorrect, setting the Student's status on said node to unknown and one of providing corrective feedback to said student and not providing said feedback to said student.

13. A computer implemented method in accordance with claim 2 wherein step k) further comprises:
   a) When a student's status on said node in step j) has been determined to be mastered, marking as mastered said node and all lower level nodes in said SLT rule that must be traversed in generating a solution to said problem, and
   b) When a student's status on said node in step j) has been determined to be unknown, marking as unknown said node and all higher level nodes for which said node is a descendent.

14. A computer implemented method in accordance with claim 2 wherein said selected SLT rule is refined into at least two categories, wherein each said category is terminal, said SLT rule is said to represent declarative knowledge.

15. A computer implemented method in accordance with claim 2 wherein each said SLT rule is terminal, wherein each said terminal SLT rule consists of a given input and corresponding output, said knowledge is said to represent factual knowledge.

16. A computer implemented method in accordance with claim 1 when said problem domain received by said author contains more than one problem domain, wherein said method comprises performing all steps in claim 1 to construct one SLT solution rule in turn for each said problem domain.

17. A computer implemented method in accordance with claim 16 wherein said problem domain received contains at least one problem that cannot be solved by any one of said finite number of SLT rules, wherein said authoring requires constructing a finite set of SLT rules and higher order rules sufficient for generating solutions to a sufficiently large subset of problems in said problem domain, further comprises the steps of:
   a) Selecting a finite number of problems in said problem domain wherein each said selected problem can be solved by one SLT rule,
   b) For each said problem domain, using all of the steps in claim 1 to construct one SLT rule for solving problems in each said domain,
   c) For each said SLT rule, constructing a new higher order problem domain in which said SLT rule is an output,
   d) For each said higher order problem domain, using the method of claim 1 to construct a higher order SLT rule for solving problems in said higher order problem domain, and
   e) When said author desires to reduce the number of SLT rules associated with said higher order problem domain, eliminating SLT rules that can be generated by applying said higher order SLT rule to other said SLT rules, wherein said eliminated SLT rules can be generated by applying said higher order SLT rule to other said SLT rules.

18. A computer implemented method in accordance with claim 17 wherein said problem domain received contains at least one problem that cannot be solved by one of any one SLT rule and any one higher order SLT rule individually, but wherein a higher order SLT rule constructed in step d) can be used to generate a new SLT rule that can be used to solve said problem, wherein said problem is referred to as a novel problem and whereas said problem domain is referred to as an ill-defined problem domain.

19. A computer implemented method in accordance with claim 2 wherein said method further comprises the steps of:
   a) Receiving said ill-defined problem domain of claim 18, a set of SLT rules and higher order SLT rules derived from said ill-defined domain, wherein each said SLT rule has been made executable on a computer, and a set of problems, wherein said problem domain includes problems that cannot be solved by any one said higher or lower order SLT rule,
   b) Selecting a problem in said problem domain in step a),
   c) When said problem selected in step b) is solvable by one said SLT rule, providing tutoring on said problem in accordance with steps b) through l) in claim 2,
   d) When said problem is solvable by exactly one of no said SLT rule and more than one said SLT rule, selecting one said higher order SLT rule in step a), wherein the range of said higher order SLT rule contains exactly one SLT rule that does solve said problem, and applying said higher order SLT rule to available SLT rules to generate a new SLT rule in said range,
   e) When said new SLT rule solves said problem, executing said new SLT rule on said problem.

20. A computer implemented method in accordance with claim 19 wherein said higher order rules are domain specific instances of learning mechanisms commonly used in expert systems, wherein one commonly used learning mechanism is known as chaining, wherein outputs of successive rules serve as inputs for the next rule.

21. A computer implemented method in accordance with step d) in claim 19, wherein new SLT rules are generated from available SLT rules and higher order SLT rules, wherein said higher order SLT rules operate on other SLT rules as data, and wherein said new SLT rule and said SLT rules and higher order SLT rules are formally equivalent and have the same structures, further comprises:
   a) Receiving an AST based problem and a set of SLT rules,
   b) Checking each said SLT rule to determine whether the domain and range of said SLT rule matches the data structure AST of said given problem,
   c) Unless exactly one SLT rule matches, checking each said SLT rule to determine if the range of said SLT rule contains exactly one SLT rule that does match said problem,
   d) When exactly one SLT rule matches, applying said SLT rule, e) When the output of said SLT rule is a new SLT rule, adding said new SLT rule to said set of SLT rules in step a) and repeating steps b) through e).

* * * * *